US010694106B2

(12) United States Patent
John Archibald et al.

(10) Patent No.: US 10,694,106 B2
(45) Date of Patent: Jun. 23, 2020

(54) COMPUTER VISION APPLICATION PROCESSING

(71) Applicant: QUALCOMM Incorporated, San Diego, CA (US)

(72) Inventors: Fitzgerald John Archibald, North York (CA); Khosro Mohammad Rabii, San Diego, CA (US); Hima Bindu Damecharla, San Diego, CA (US); Tadeusz Jarosinski, San Diego, CA (US); Ashwin Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 802 days.

(21) Appl. No.: 14/303,490

(22) Filed: Jun. 12, 2014

(65) Prior Publication Data

US 2014/0368626 A1   Dec. 18, 2014

Related U.S. Application Data

(60) Provisional application No. 61/835,400, filed on Jun. 14, 2013, provisional application No. 61/871,678, filed on Aug. 29, 2013.

(51) Int. Cl.
*H04N 5/232* (2006.01)
*H04N 7/18* (2006.01)
(Continued)

(52) U.S. Cl.
CPC ......... *H04N 5/23241* (2013.01); *G06F 1/325* (2013.01); *G06F 1/3215* (2013.01);
(Continued)

(58) Field of Classification Search
None
See application file for complete search history.

(56) References Cited

U.S. PATENT DOCUMENTS

| 5,418,714 A | 5/1995 | Sarver |
| 5,713,055 A * | 1/1998 | Lawther ............ G03B 7/16 |
| | | 396/165 |

(Continued)

FOREIGN PATENT DOCUMENTS

| CN | 100517374 C | 7/2009 |
| CN | 100553286 C | 10/2009 |

(Continued)

OTHER PUBLICATIONS

Pasini, M., "Triggertrap—Computer-Aided Remote Release", The Imaging Resource Digital Photography Newsletter, Retrieved from the Internet: URL:http://www.imaging-resource.com/ACCS/triggertrap/, Nov. 2012, Imaging Resource, pp. 1-6.

(Continued)

*Primary Examiner* — Lindsay J Uhl
(74) *Attorney, Agent, or Firm* — QUALCOMM Incorporated

(57) ABSTRACT

Methods, systems, and techniques to enhance computer vision application processing are disclosed. In particular, the methods, systems, and techniques may reduce power consumption for computer vision applications and improve processing efficiency for computer vision applications.

27 Claims, 38 Drawing Sheets

(51) Int. Cl.
   *G06K 9/00* (2006.01)
   *G06F 1/3215* (2019.01)
   *G06F 1/3234* (2019.01)
   *G06K 9/62* (2006.01)

(52) U.S. Cl.
   CPC ..... *G06K 9/00261* (2013.01); *G06K 9/00993* (2013.01); *G06K 9/6212* (2013.01); *G06K 9/6218* (2013.01); *H04N 5/23219* (2013.01); *H04N 5/23229* (2013.01); *H04N 5/23245* (2013.01); *H04N 7/18* (2013.01)

(56) References Cited

U.S. PATENT DOCUMENTS

| | | | |
|---|---|---|---|
| 6,539,055 | B1 | 3/2003 | Hazra |
| 6,847,686 | B2* | 1/2005 | Morad ............... H04N 19/423 375/240.16 |
| 7,813,554 | B2 | 10/2010 | Wang et al. |
| 8,254,685 | B2 | 8/2012 | Greene et al. |
| 8,538,082 | B2 | 9/2013 | Zhao et al. |
| 8,599,934 | B2 | 12/2013 | Tian et al. |
| 9,063,574 | B1* | 6/2015 | Ivanchenko ............ G06F 3/017 |
| 9,183,460 | B2 | 11/2015 | Zhang et al. |
| 9,418,313 | B2 | 8/2016 | Valente et al. |
| 9,443,134 | B2 | 9/2016 | Gupta et al. |
| 9,600,744 | B2 | 3/2017 | Pau et al. |
| 2001/0001614 | A1 | 5/2001 | Boice et al. |
| 2004/0190752 | A1 | 9/2004 | Higaki et al. |
| 2006/0008151 | A1 | 1/2006 | Lin et al. |
| 2006/0056656 | A1 | 3/2006 | Shibao |
| 2006/0126938 | A1 | 6/2006 | Lee et al. |
| 2006/0255986 | A1 | 11/2006 | Takanezawa et al. |
| 2007/0165257 | A1 | 7/2007 | Owaku |
| 2007/0229488 | A1 | 10/2007 | Lin et al. |
| 2007/0253699 | A1 | 11/2007 | Yen et al. |
| 2008/0174695 | A1 | 7/2008 | Gau |
| 2008/0292193 | A1* | 11/2008 | Bigioi ............... G03B 19/02 382/203 |
| 2009/0084943 | A1* | 4/2009 | Solhusvik ............ G01J 1/02 250/214 AL |
| 2010/0027663 | A1 | 2/2010 | Dai et al. |
| 2010/0135553 | A1 | 6/2010 | Joglekar |
| 2010/0142619 | A1 | 6/2010 | Suzuki et al. |
| 2010/0325458 | A1* | 12/2010 | Yamaguchi ........ G03G 15/5004 713/323 |
| 2011/0063403 | A1 | 3/2011 | Zhang et al. |
| 2011/0134250 | A1* | 6/2011 | Kim .................. G06K 9/00355 348/164 |
| 2011/0134251 | A1 | 6/2011 | Kim et al. |
| 2011/0194779 | A1 | 8/2011 | Zhong et al. |
| 2012/0019683 | A1 | 1/2012 | Susanu et al. |
| 2012/0027290 | A1 | 2/2012 | Baheti et al. |
| 2012/0033040 | A1 | 2/2012 | Pahalawatta et al. |
| 2012/0148157 | A1 | 6/2012 | Kumar et al. |
| 2012/0275648 | A1 | 11/2012 | Guan |
| 2013/0243241 | A1 | 9/2013 | Shaick |
| 2013/0287305 | A1 | 10/2013 | Dhanda et al. |
| 2013/0322763 | A1 | 12/2013 | Heu et al. |
| 2014/0013141 | A1* | 1/2014 | Heo ................ G06F 1/3293 713/323 |
| 2014/0078395 | A1 | 3/2014 | Dhillon |
| 2014/0099026 | A1 | 4/2014 | Krishnaswamy et al. |
| 2014/0139670 | A1 | 5/2014 | Kesavan et al. |
| 2014/0157209 | A1 | 6/2014 | Dalal et al. |
| 2014/0161316 | A1* | 6/2014 | Golan ............... G06Q 30/0201 382/103 |
| 2014/0211991 | A1 | 7/2014 | Stoppa et al. |
| 2014/0233854 | A1 | 8/2014 | Zhong et al. |
| 2014/0267799 | A1 | 9/2014 | Sadasivam et al. |
| 2014/0270344 | A1 | 9/2014 | Krishnamoorthi et al. |
| 2014/0368688 | A1 | 12/2014 | Archibald et al. |
| 2015/0049943 | A1 | 2/2015 | Hamsici |
| 2016/0171198 | A1 | 6/2016 | Archibald et al. |
| 2017/0236033 | A1 | 8/2017 | Benhimane et al. |

FOREIGN PATENT DOCUMENTS

| | | | |
|---|---|---|---|
| CN | 102147851 | A | 8/2011 |
| CN | 102640081 | A | 8/2012 |
| CN | 103049733 | A | 4/2013 |
| EP | 1638038 | A1 | 3/2006 |
| EP | 2538394 | A1 | 12/2012 |
| GB | 2553105 | A | 2/2018 |
| JP | 2004086540 | A | 3/2004 |
| JP | 2005176301 | A | 6/2005 |
| JP | 2006079387 | A | 3/2006 |
| JP | 2009015672 | A * | 1/2009 |
| JP | 2009124578 | A | 6/2009 |
| JP | 2010128947 | A | 6/2010 |
| JP | 2013117772 | A | 6/2013 |
| WO | 9403014 | A1 | 2/1994 |

OTHER PUBLICATIONS

International Search Report and Written Opinion for International Application No. PCT/US2014/042353, ISA/EPO, dated Sep. 29, 2014, 8 pages.

Viola, P., et al., "Rapid object detection using a boosted cascade of simple features," IEEE conference on computer vision and pattern recognition, 2001, vol. 1, IEEE, Piscataway, NJ, pp. I-511-I-518.

* cited by examiner

COMPUTER VISION APPLICATION PROCESSING

I. CLAIM OF PRIORITY

The present application claims priority from U.S. Provisional Patent Application No. 61/835,400, entitled "IMAGE-STATISTIC PROCESSING TO REDUCE COMPUTER VISION POWER USAGE," filed Jun. 14, 2013, and from U.S. Provisional Patent Application No. 61/871,678, entitled "SYSTEM AND METHOD TO IDENTIFY A CONTEXT OF AN IMAGE," filed Aug. 29, 2013, the contents of which are incorporated by reference in their entirety.

II. FIELD

The present disclosure is generally related to computer vision application processing.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless electronic devices (e.g., a wireless telephone) may have an image sensor that captures images at a given data sampling frequency. The image sensor may capture images in response to internal or external triggers. An example of an external trigger is proximity of a user to the communication device. To illustrate, a wireless electronic device may trigger the image sensor in response to detecting a sound associated with the user. An example of an internal trigger is availability of resources of the wireless electronic device. To illustrate, the wireless electronic device may trigger the image sensor in response to determining that more than a threshold amount of battery power is available.

Additionally, wireless electronic devices may utilize computer vision techniques to carry out a variety of computer vision applications. For example, computer vision techniques may be used for security applications (e.g., surveillance, intrusion detection, object detection, facial recognition, etc.), environmental-use applications (e.g., lighting control), object detection and tracking applications, etc. Computer vision techniques may also be used for edge detection, optical character recognition (OCR), facial detection, etc.

Computer vision applications may consume a large amount of power. For example, computer vision applications may apply application-specific processing to each frame in a video stream to determine whether an alert event is present. To illustrate, if the computer vision application is designed to detect whether an object is in a field of view (e.g., the alert event), each frame may undergo application-specific processing to determine whether the object is in the frame. Performing application-specific processing on each frame may consume a large amount of power.

For some computer vision applications, the wireless electronic device may compute visual descriptors of the images or frames. The visual descriptors may be used for life-logging, gesture identification/recognition, indoor-outdoor inference, and more. Computing the visual descriptors of all images or frames may be resource intensive and the wireless electronic device may have limited resources. Moreover, many images captured by the camera may have little or no value. For example, images periodically captured by the camera may be identical or nearly identical.

IV. SUMMARY

Methods and systems are disclosed for reducing power usage of computer vision applications. A video stream (e.g., a set of time-sequenced still images) may be captured via a camera and individual frames of the video stream may undergo processing (e.g., statistics processing). For example, a statistics generator may determine image statistics for each frame of the video stream. The image statistics may include an intensity histogram for each frame, a color histogram for each frame, a summation of pixel values for particular pixels (e.g., a particular row of pixels or a particular column of pixels) in each frame, or a combination thereof. A change detection circuit may determine whether a difference between first image statistics of a first frame and second image statistics of a second frame satisfy a threshold. If the difference does not satisfy the threshold, computer vision application-specific processing on the second frame may be omitted or bypassed to conserve power. If the difference satisfies the threshold, the change detection circuit may provide a feedback signal to a selection circuit to activate (e.g., wake up) a "high power" processing path. For example, the high power processing path may include an application processor (e.g., a processor used to execute computer vision applications) to perform computer vision application-specific processing on the second frame. In some examples, different processing paths, or portions thereof, may be enabled at different times based on different conditions.

As a non-limiting example of computer vision application-specific processing, the application processor may extract a feature (e.g., a visual descriptor) or a set of features as needed, instead of all at once. For example, the application processor may extract a first subset of features (e.g., visual descriptors) of the second frame to identify the context (e.g., a location) of the second frame. For example, the application processor may extract edge information related to the second frame. The application processor may determine that confidence level(s) associated with the first subset of features do not satisfy a threshold confidence level. Based on the determination, the application processor may extract more features (e.g., a second subset of features) of the second frame. For example, the application processor may extract edge information from a higher resolution copy of the second frame. As another example, the application processor may extract color information of the second frame. The application processor may determine that confidence level(s) associated with the additional extracted features of the second frame satisfy the threshold confidence level and may use the additional extracted features to determine the context of the frame.

The application processor may have a hierarchy of processing resources (e.g., processing cores) to perform computer vision application-specific processing on the second frame. For example, a first processing resource (e.g., a "low power" processing resource) may perform first computer vision application-specific processing on the second frame. If the first processing resource determines that the second frame calls for additional computer vision application-specific processing (e.g., second computer vision application-specific processing) outside the capabilities of the first processing resource, the first processing resource may request that a second processing resource (e.g., a "high power" processing resource) perform the second computer vision application-specific processing on the second frame (e.g., wake up the second processing resource). In certain embodiments, the second processing resource may perform the first and second computer vision application-specific processing on the second frame so that the first processing resource may be deactivated (e.g., enter a "sleep" state) to conserve power. In other embodiments, the second processing resource may "decline" to perform the second computer vision application-specific processing on the second frame, inform/program the first processing resource to perform the second computer vision application-specific processing, and enter into a sleep state to conserve power.

In a particular embodiment, a method includes generating, at a change detection circuit, a control signal based on a change amount between first sensor data captured by a sensor and second sensor data captured by the sensor, where the change detection circuit is included in a first processing path. The method also includes providing the second sensor data to a second processing path for computer vision application-specific processing based on the control signal.

In another particular embodiment, an apparatus includes a change detection circuit configured to generate a control signal based on a change amount between first sensor data captured by a sensor and second sensor data captured by the sensor, where the change detection circuit is included in a first processing path. The apparatus also includes a second processing path configured to perform computer vision application-specific processing on the second sensor data based on the control signal.

In another particular embodiment, an apparatus includes means for generating a control signal based on a change amount between first sensor data captured by a sensor and second sensor data captured by the sensor, where the means for generating the control signal is included in a first processing path. The apparatus also includes means for performing computer vision application-specific processing on the second sensor data based on the control signal, where the means for performing the computer vision application-specific processing is included in a second processing path.

In another particular embodiment, a non-transitory computer-readable medium includes instructions that, when executed by a processing unit, cause the processing unit to generate, at a change detection circuit, a control signal based on a change amount between first sensor data captured by a sensor and second sensor data captured by the sensor, where the change detection circuit is included in a first processing path. The instructions are also executable to cause the processing unit to provide the second sensor data to a second processing path for computer vision application-specific processing based on the control signal.

In another particular embodiment, a method includes receiving, at a mobile device, sensory data from an image sensor, where the sensory data is related to an image. The method also includes extracting a first subset of features of the image from the sensory data and extracting a second subset of features of the image from the sensory data based on the first subset of features satisfying an analysis criterion. The method further includes generating context data indicating a context of the image based at least in part on the second subset of features.

In another particular embodiment, an apparatus includes a processor configured to receive sensory data from an image sensor, where the sensory data is related to an image. The processor is also configured to extract a first subset of features from the sensory data, the first subset of features selected based on a selection criterion. The processor is further configured to generate context data indicating a context of the image based at least in part on the first subset of features.

In another particular embodiment, an apparatus includes means for receiving sensory data from an image sensor, where the sensory data is related to an image. The apparatus also includes means for extracting a first subset of features from the sensory data, the first subset of features selected based on a selection criterion. The apparatus further includes means for generating context data indicating a context of the image based at least in part on the first subset of features.

In another particular embodiment, a computer-readable storage medium includes instructions that, when executed by a processor, cause the processor to perform operations. The operations include receiving first sensory data from a first image sensor, where the first sensory data is related to a first image. The operations also include extracting a first subset of features of the first image from the first sensory data and requesting second sensory data from a second image sensor based on the first subset of features satisfying an analysis criterion, where the second sensory data is related to a second image. The operations further include receiving the second sensory data from the second image sensor, extracting a second subset of features of the second image from the second sensory data, and generating context data indicating a context of the first image based at least in part on the second subset of features.

One particular advantage provided by at least one of the disclosed embodiments is reducing an amount of power consumed by an application processor used to execute computer vision applications. For example, application-specific processing of a particular frame may be bypassed in response to a determination that the particular frame and a previous frame are substantially similar (e.g., based on a comparison of image statistics of the frames). Bypassing the application-specific processing may conserve battery power.

Another particular advantage provided by at least one of the disclosed embodiments is enabling identification of image contexts. For example, a context of an image may be identified by extracting fewer than all features of the image. Significant reduction in computational costs and a corresponding reduction of power usage may be achieved. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
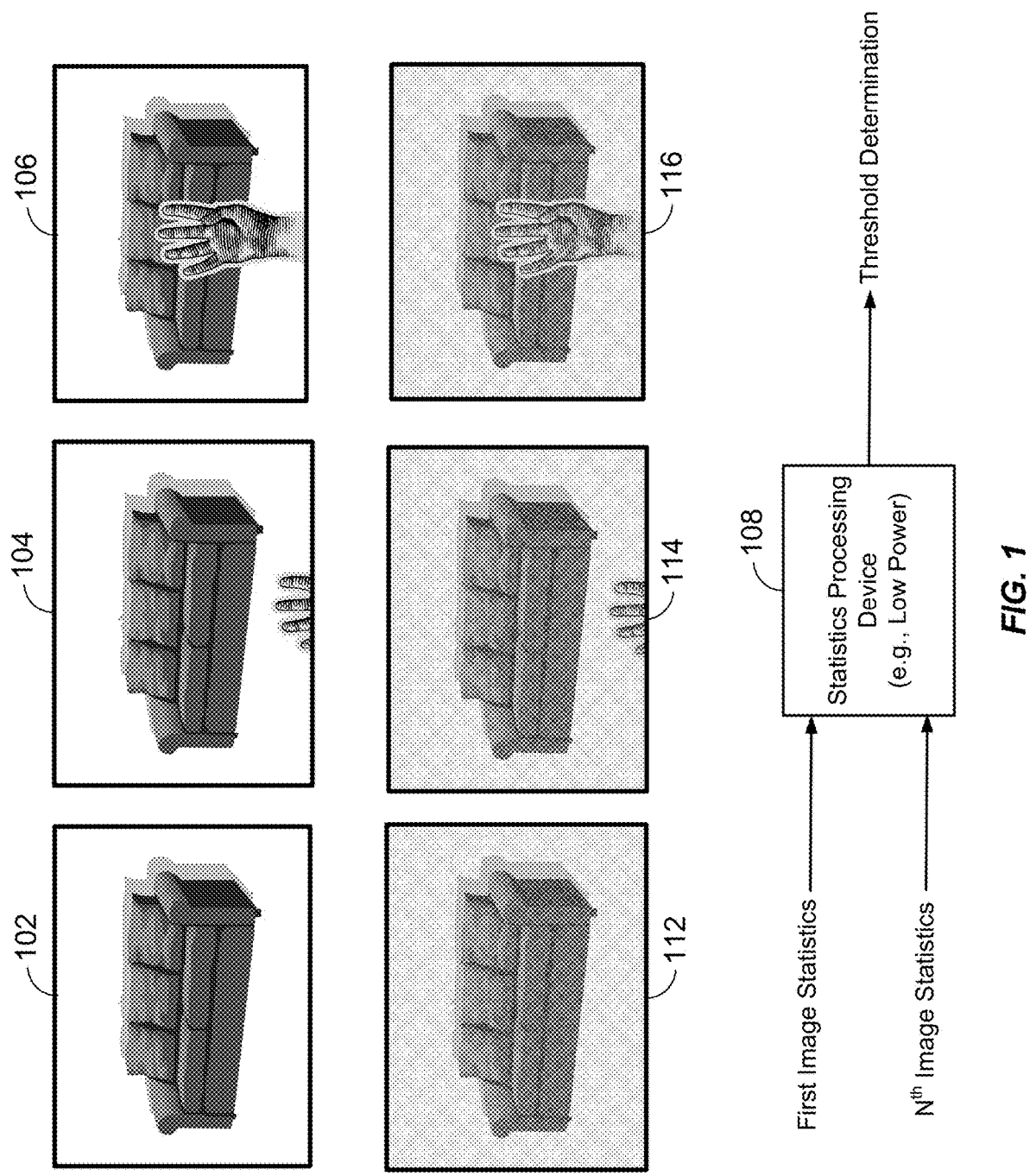
FIG. 1 is a diagram of a particular illustrative embodiment of image frames of a video stream and corresponding pixel representations of the image frames.

Referring to FIG. 1, a particular illustrative embodiment of images frames of a video stream and corresponding pixel representations of the image frames are shown. For example, the video stream may include a first frame 102 of image data, a second frame 104 of image data, and a third frame 106 of image data. In a particular embodiment, the first frame 102, the second frame 104, and the third frame 106 may be consecutive image frames in the video stream.

The video stream may be subject to application-specific processing (e.g., computer vision application processing). For example, in the particular illustrative embodiment, the video stream may be subject to a hand recognition application (e.g., subject to processing that detects whether a hand is in a field of view). However, in other embodiments, the video stream may be subject to other computer vision applications. For example, the video stream may be subject to security applications (e.g., surveillance, intrusion detection, object detection, facial recognition, etc.), environmental-use applications (e.g., lighting control), object detection and tracking applications, etc.

In the frames illustrated in FIG. 1, a hand is not present (e.g., visible) in the field of view of the first frame 102, a portion of the hand is visible in the field of view of the second frame 104, and the hand is fully visible in the field of view of the third frame 106. The first frame 102 may be characterized by pixels in a first pixel representation 112, the second frame 104 may be characterized by pixels in a second pixel representation 114, and the third frame 106 may be characterized by pixels in a third pixel representation 116.

A low-power device (not shown in FIG. 1) within a processing system may generate image statistics for each frame 102-106 in the video stream after each frame 102-106 is captured. For example, the low-power device may generate image statistics for each frame 102-106 based on the corresponding pixel representations 112-116. For grayscale image frames, each pixel in the pixel representations 112-116 may correspond to an intensity value between zero (0) and two-hundred fifty five (255). An intensity value of zero may correspond to a white pixel and an intensity value of two-hundred fifty five may correspond to a black pixel. The low-power device may determine the intensity value for each pixel in a particular frame 102-106 and generate an intensity histogram for the particular frame 102-106 based on counts for each intensity value. For example, the low-power device may generate a first intensity histogram for the first frame 102, a second intensity histogram for the second frame 104, and a third intensity histogram for the third frame 106.

For multi-spectral image frames, each pixel in the pixel representations 112-116 may correspond to a particular color value. The color values may be based on a concentration of red (R), green (G), and blue (B) in the pixel. The low-power device may determine the color value for each pixel in a particular frame 102-106 and generate a color histogram for the particular frame 102-106 based on counts for each color value. For example, the low-power device may generate a first color histogram for the first frame 102, a second color histogram for the second frame 104, and a third color histogram for the third frame 106.

A high-power device (not shown in FIG. 1) within the processing system may perform application-specific processing on particular frames in the video stream. For example, in the particular illustrative embodiment, the application-specific processing may include determining whether a particular object (e.g., a hand) is in the selected frame. In other embodiments, the application-specific processing may include determining whether an alert event is triggered. An alert event may correspond to a change in condition between frames. As illustrative, non-limiting examples, an alert event may correspond to a patient falling out of a bed, a house intrusion, a car pulling into a driveway, a person walking through a door, etc. Generating the image statistics at the low-power device may consume less power than performing the application-specific processing at the high-power device. For example, generating the second image statistics may consume less power than performing the application-specific processing on the second frame 104.

During operation, a camera (e.g., a video camera) may capture the first frame 102 at a first time and the processing system may perform image processing on the first frame 102. For example, the low-power device may generate the first image statistics (e.g., the first intensity histogram and/or the first color histogram) for the first frame 102, and the high-power device may perform application-specific processing on the first frame 102 to determine whether the hand is visible in the first frame 102. After processing the first frame 102, the camera may capture the second frame 104 at a second time. The low-power device may generate the second image statistics for the second frame 104. If the high-power device determined that the hand was not visible in the first frame 102, a statistics processing device 108 within the processing system may compare the second image statistics to the first image statistics to determine whether to perform application-specific processing on the second frame 104 (e.g., to determine whether the hand is visible in the second frame 104). In another particular embodiment, performing application-specific processing may include determining whether an alert event has been triggered. For example, the alert event may correspond to a change in condition between the first frame 102 and the second frame 104.

For example, the statistics processing device 108 may receive the first image statistics and the second image statistics (e.g., $N^{th}$ image statistics). The statistics processing device 108 may determine whether a first change amount between the second image statistics and the first image statistics satisfies a threshold. If the change amount does not satisfy the threshold, the processing system may only perform partial-processing of the second frame 104 (e.g., to generate the second image statistics of the second frame 104) and may bypass or forgo the application-specific processing of the second frame 104. If the change amount satisfies the threshold, the processing system may perform more complete processing on the second frame 104 by generating the second image statistics as well as performing application-specific processing on the second frame 104.

For grayscale images, the first change amount may satisfy the threshold when a difference between a first count of pixels for a particular intensity value in the first intensity histogram and a second count of pixels for the particular intensity value in the second intensity histogram is greater than a particular value. The threshold may be a user-selected threshold. As a non-limiting example, the first pixel representation 112 and the second pixel representation 114 may each include twenty million (20,000,000) pixels (e.g., the first and second frames 102, 104 are 20 megapixel images). The first pixel representation 112 may include eleven million (11,000,000) white pixels (e.g., eleven million pixels having an intensity value of zero) and the second pixel representation 114 may include ten and a half million (10,500,000) white pixels (e.g., a difference of five hundred thousand pixels). If the threshold is one hundred thousand pixels, then the first change amount (e.g., the difference) satisfies the threshold and the processing system may perform application-specific processing on the second frame 104 to determine whether a hand is visible in the second frame 104. If the threshold is one million pixels, then the first change amount fails to satisfy the threshold and the processing system may bypass application-specific processing on the second frame 104 to conserve power.

For multi-spectral image frames, the first change amount may satisfy the threshold when a difference between a first count of pixels for a particular color value in the first color histogram and a second count of pixels for the particular color in the second color histogram is greater than a particular value. As a non-limiting example, the first pixel representation 112 and the second pixel representation 114 may each include twenty million pixels. The first pixel representation 112 may include five million red pixels and the second pixel representation 114 may include eight million red pixels (e.g., a difference of three million pixels). If the threshold is two million pixels, then the first change amount (e.g., the difference) satisfies the threshold and the processing system may perform application-specific processing on the second frame 104 to determine whether a hand is visible in the second frame 104. If the threshold is four million pixels, then the first change amount fails to satisfy the threshold and the processing system may bypass application-specific processing on the second frame 104 to conserve power. A particular range of values may be used for the threshold based on a particular computer vision application. For example, a computer vision application associated with hand detection (or facial detection) may focus on colors associated with skin tones.

After processing the second frame 104, the processing system may process the third frame 106. For example, the low-power device may generate the third image statistics (e.g., the third intensity histogram and/or the third color histogram) for the third frame 106. If application-specific processing on the second frame 104 was bypassed, the statistics processing device 108 may determine whether a second change amount between the third image statistics and the second image statistics satisfies the threshold. If the second change amount satisfies the threshold, then the high-power device may perform application-specific processing on the third frame 106 to determine whether a hand is visible in the third frame 106. If the second change amount does not satisfy the threshold, then the high-power device may bypass application-specific processing on the third frame 106 to conserve energy.

In a particular embodiment, the statistics processing device 108 may determine whether a third change amount between the third image statistics and the first image statistics satisfies the threshold. Application-specific processing may be performed on the third frame 106 if the third change amount satisfies the threshold and application-specific processing on the third frame 106 may be bypassed if the third change amount fails to satisfy the threshold. Performing application-specific processing based on the third change amount may reduce a likelihood of missing an alert event (e.g., a visible hand) due to nominal changes occurring between frames (e.g., small changes in image statistics) that eventually lead to large changes. Additionally, full-processing of an indeterminate number of frames may be skipped (e.g., bypassed) based on a determination that the threshold is not satisfied. In a particular embodiment, image statistics may be periodically refreshed and full-processing may be performed on any $N^{th}$ frame even if the threshold is not satisfied by the $N^{th}$ frame.

Bypassing application-specific processing on a particular frame that has similar image statistics to a previous frame may conserve power in electronic devices. For example, application-specific processing may utilize high-power devices within a processing system. By using low-power devices, such as the statistics processing device 108, to generate and/or evaluate statistics of each frame, a determination may be made that particular frames are substantially identical and that application-specific processing need only be performed on one of the identical frames. As a result, power may be conserved by forgoing application-specific processing on identical frames.

Figure 2:
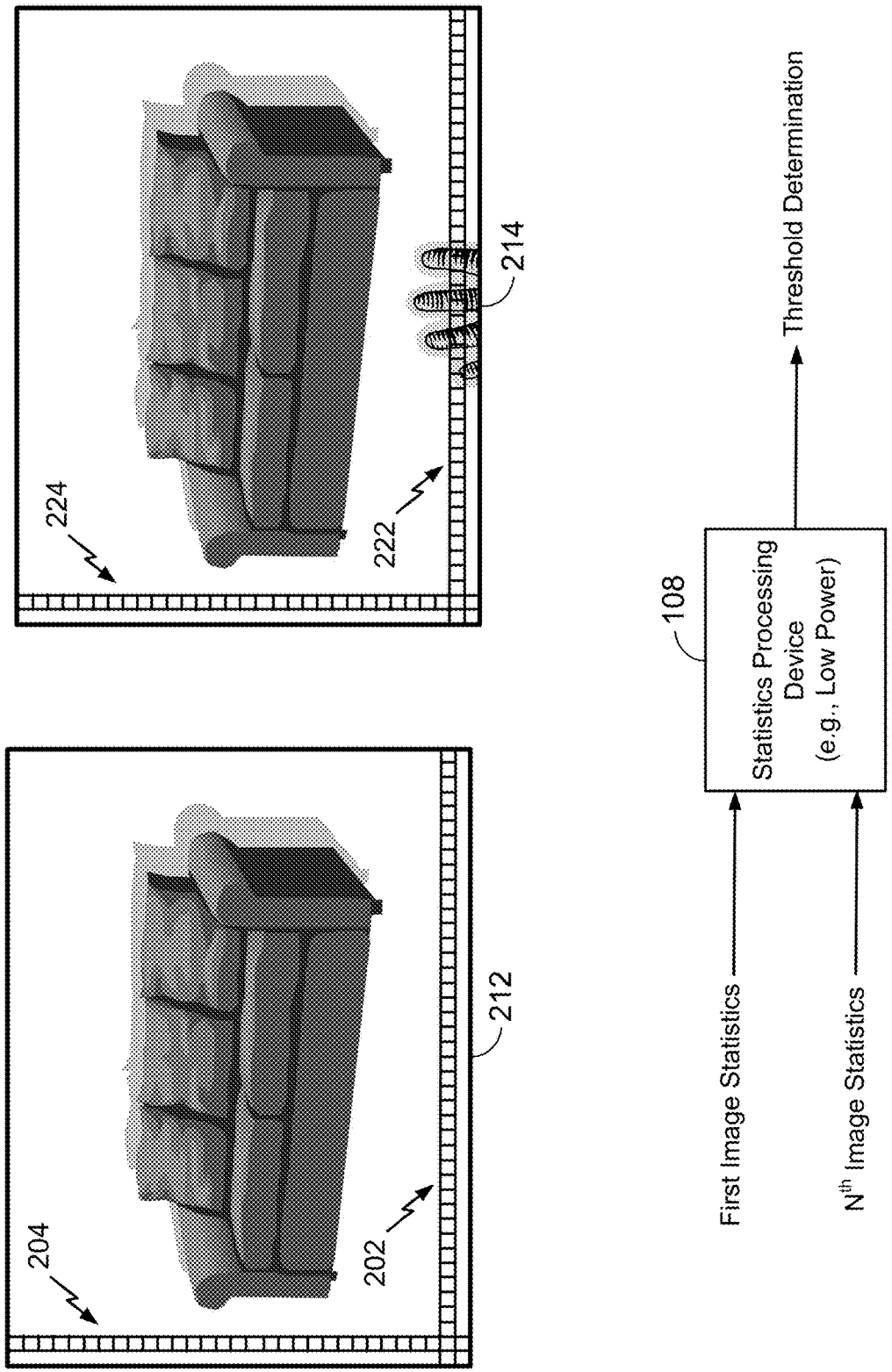
FIG. 2 is a diagram of a particular illustrative embodiment of partial pixel representations of image frames of a video stream.

Referring to FIG. 2, a particular illustrative embodiment of partial pixel representations of image frames of a video stream is shown. For example, the first frame 102 of FIG. 1 may be characterized by a first partial pixel representation 212 and the second frame 104 of FIG. 1 may be characterized by a second partial pixel representation 214.

The first partial pixel representation 212 may include a first row 202 of pixels, a first column 204 of pixels, or both. The first row 202 of pixels and the first column 204 of pixels may be select pixels that are included in the first pixel representation 112 of FIG. 1. The second partial pixel representation 214 may include a second row 222 of pixels, a second column 224 of pixels, or both. The second row 222 of pixels and the second column 224 of pixels may be select pixels that are included in the second pixel representation 114 of FIG. 1. In a particular embodiment, the first row 202 of pixels may correspond to pixels representing an area in the first frame 102, and the second row 222 of pixels may correspond to pixels representing the same area in the second frame 104. Additionally, the first column 204 of pixels may correspond to pixels representing an area in first frame 102, and the second column 224 of pixels may correspond to pixels representing the same area in the second frame 104.

The low-power device may generate first image statistics of the first frame 102 based on the first row 202 of pixels, the first column 204 of pixels, or a combination thereof. For example, the first image statistics may correspond to a first summation (e.g., rowsum[ ]) of pixel values for the first row 202 of pixels. Alternatively, or in addition, the first image statistics may correspond to a first summation (e.g., columnsum[ ]) of pixels values for the first column 204 of pixels. The high-power device may perform application-specific processing on the first frame 102 to determine whether the hand is visible in the first frame 102. In a particular embodiment, the first image statistics may correspond to the summation of pixel values in two or more rows of pixels, the summation of two or more columns of pixels, or a summation of one or more rows of pixels and one or more columns of pixels.

After processing the first frame 102, the low-power device may generate second image statistics of the second frame 104 based on the second row 222 of pixels, the second column 224 of pixels, or a combination thereof. For example, the second image statistics may correspond to a second summation of pixels values for the second row 222. Alternatively, or in addition, the second image statistics may correspond to a second summation of pixel values for the second column 224 of pixels. In a particular embodiment, the second image statistics may correspond to the summation of pixel values in two or more rows of pixels, the summation of two or more columns of pixels, or a summation of one or more rows of pixels and one or more columns of pixels.

If the high-power device determined that the hand was not visible in the first frame 102, the statistics processing device 108 may compare the second image statistics to the first image statistics to determine whether to perform application-specific processing on the second frame 104 (e.g., to determine whether the hand is visible in the second frame 104). For example, the statistics processing device 108 may determine whether a first change amount between the second image statistics and the first image statistics satisfies a threshold. If the change amount does not satisfy the threshold, the processing system may only perform partial-processing of the second frame 104 (e.g., to generate the second image statistics of the second frame 104) and may bypass or forgo the application-specific processing of the second frame 104. If the change amount satisfies the threshold, the processing system may perform more complete processing on the second frame 104 by generating the second image statistics as well as performing application-specific processing on the second frame 104.

The first change amount may satisfy the threshold when a difference between the first summation of pixel values and the second summation of pixel values is greater than a particular value. For example, in the illustrative embodiment, when the first image statistics correspond to the summation of pixels values in the first column 204 of pixels and the second image statistics correspond to the summation of pixel values in the second column 224 of pixels, the first change amount may fail to satisfy the threshold. Each pixel in the first column 204 of pixels is a white pixel (e.g., pixel having an intensity value of zero). As a result, the sum of the intensity values for first column 204 of pixels may be equal to zero. Similarly, each pixel in the second column 224 of pixels is a white pixel. As a result, the sum of the intensity values for the second column 224 may be equal to zero. Thus, based on a comparison of the first summation of pixel values and the second summation of pixel values, the first change amount may not satisfy the threshold. As a result, application-specific processing on the second frame 104 may be bypassed.

However, when the first image statistics correspond to the summation of pixels values in the first row 202 of pixels and the second image statistics correspond to the summation of pixel values in the second row 222 of pixels, the first change amount may satisfy the threshold. Each pixel in the first row 202 of pixels is a white pixel. As a result, the sum of the intensity values of the first row 202 of pixels may be equal to zero. However, a number of pixels in the second row 222 of pixels have a greater intensity value (e.g., intensity value closer to 255 based on darker regions). As a result, the sum of the intensity values of the second row 222 of pixels may be greater than zero. Assuming the difference between the first summation of pixel values and the second summation of pixel values satisfies the threshold, the high-power device may perform application-specific processing on the second frame 104.

Power may be conserved by selecting particular rows and/or columns in a frame and generating image statistics on frames based on the selected rows and/or columns as opposed to generating image statistics for an entire frame. For example, the low-power device may utilize less power to generate image statistics for the first row 202 of pixels than to generate image statistics for every pixel in the first frame 102.

Figure 3:
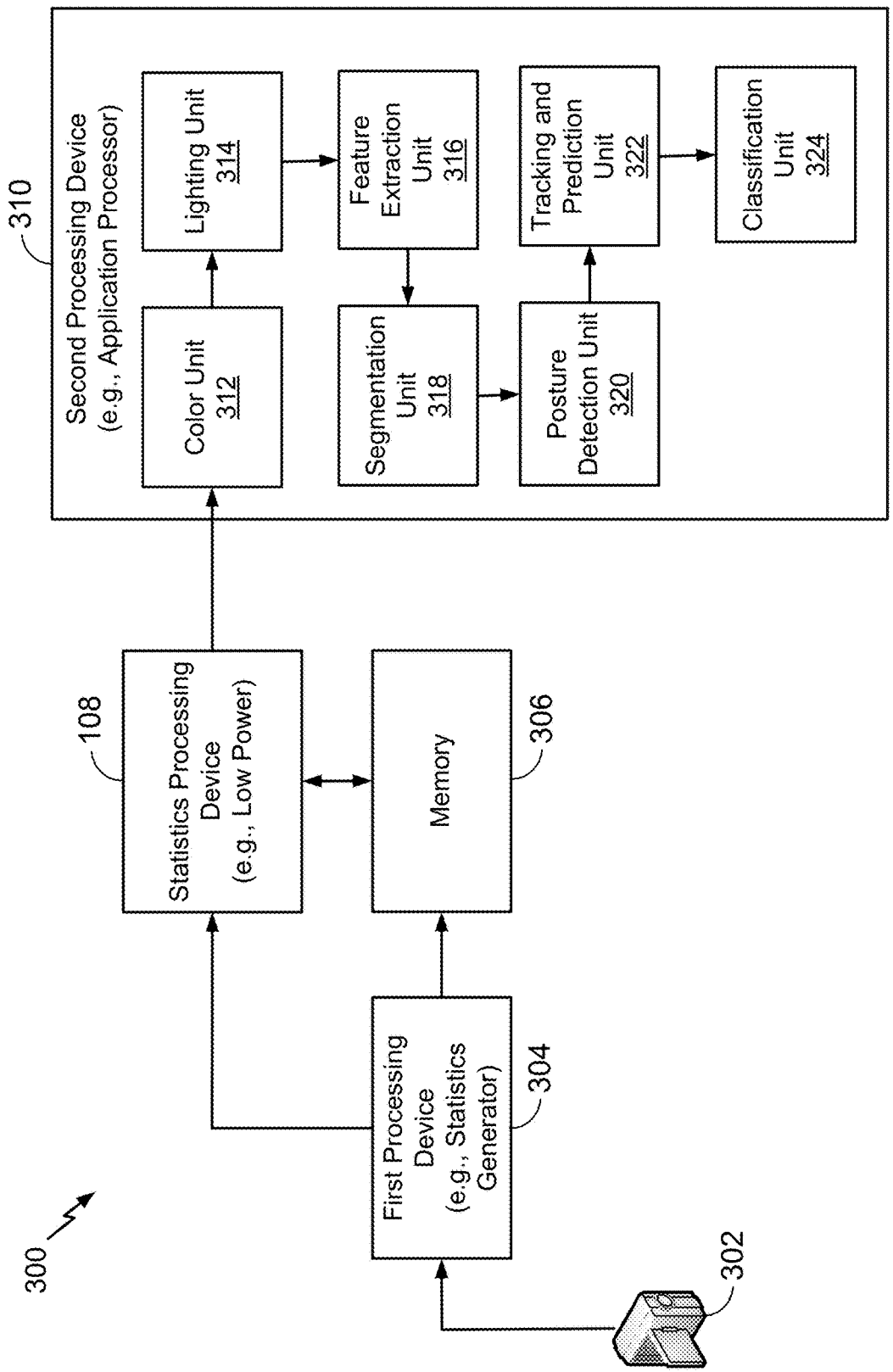
FIG. 3 is a block diagram of a particular illustrative embodiment of a processing system that is operable to reduce power usage associated with computer vision applications based on image statistics.

Referring to FIG. 3, a particular illustrative embodiment of a processing system 300 that is operable to reduce power usage associated with computer vision applications based on image statistics is shown. The processing system 300 includes a camera 302, a first processing device 304, a memory 306, the statistics processing device 108, and a second processing device 310. The second processing device 310 may be a higher power usage device than the first processing device 304. In a particular embodiment, the first processing device 304 may be a statistics generator and the second processing device 310 may an application processor. In a particular embodiment, the functions of the statistics processing device 108 and the first processing device 304 may be included in a single low-power processing device, such as a digital signal processor (DSP).

The camera 302 may capture a plurality of image frames (e.g., a video stream). For example, the camera 302 may capture the first frame 102 of FIG. 1 at the first time, the second frame 104 at the second time, and the third frame 106 at the third time. After a particular frame 102-106 is captured, the particular frame is provided to the first processing device 304.

The first processing device 304 may be configured to generate image statistics for each frame 102-106 in the video stream as the frames 102-106 are captured. For example, the first processing device 304 may generate image statistics for each frame 102-106 based on the corresponding pixel representations 112-116 of FIG. 1 or the partial pixel representations 212, 214 of FIG. 2. After the image statistics are generated, the image statistics are provided to the memory 306 and to the statistics processing device 108. The image statistics may be also be used to identify characteristics of each frame 102-106, a time of capture for each frame 102-106, etc.

The statistics processing device 108 may be configured to receive image statistics for a current frame 102-106 (e.g., a most recent frame) from the first processing device 304. In a particular embodiment, the statistics processing device 108 is another low-power device. For example, the statistics processing device 108 may consume less power than the second processing device 310. The statistics processing device 108 may be configured to cause the current frame 102-106 to be provided to the second processing device 310 for application-specific processing. For example, the statistics processing device 108 may provide the current frame 102-106 to the second processing device 310 in response to a determination that there are no previous frames.

If a previous frame has been processed, the statistics processing device 108 may determine whether a change amount between the image statistics of the current frame and the image statistics of the previous frame satisfy a threshold. For example, the statistics processing device 108 may retrieve the image statistics for the previous frame from the memory 306. If the change amount satisfies the threshold, the statistics processing device 108 may provide the current frame to the second processing device 310 for application-specific processing. Otherwise, the statistics processing device 108 may determine to conserve power and bypass application-specific processing on the current frame.

The second processing device 310 may be operable to perform computer vision applications and operations on the current frame. For example, the second processing device 310 may be configured to perform security applications (e.g., surveillance, intrusion detection, object detection, facial recognition, etc.), environmental-use applications (e.g., lighting control), object detection and tracking applications, etc. The second processing device 310 may include a color unit 312, a lighting unit 314, a feature extraction unit 316, a segmentation unit 318, a posture detection unit 320, a tracking and prediction unit 322, a classification unit 324, or a combination thereof. The color unit 312 may enhance the color, exposure, and focus of the current frame. The lighting unit 314 may enhance environmental lighting of the frame. The feature extraction unit 316 may extract particular features from the current frame. The segmentation unit 318 may partition the current frame into multiple segments (e.g., multiple sets of pixels). The posture detection unit 320 may detect postures of particular features located in the current frame. The tracking and prediction unit 322 may determine a relative position of features in the current frame and predict where features may be in a next frame. The classification unit 324 may classify the current frame and/or detect an alert event. The second processing device 310 may include any combination of processing units for processing computer vision applications. For example, the high-power device may include additional units or fewer units.

During operation, the camera 302 may capture the first frame 102 at the first time, and the first processing device 304 may generate the first image statistics for the first frame 102. The first processing device 304 may provide the first image statistics to the memory 306. Additionally, the first processing device 304 may provide the first frame 102 and the first image statistics to the statistics processing device 108. The statistics processing device 108 may poll the memory 306 to determine whether image statistics for other previous frames are stored in the memory 306 for comparison. In response determining that no image statistics for previous frames are stored in the memory 306 for comparison, the statistics processing device 108 may cause the first frame 102 to be provided to the second processing device 310, and the second processing device 310 may perform application-specific processing on the first frame 102 to determine whether a hand is visible in the first frame 102.

After capturing the first frame 102, the camera 302 may capture the second frame 104 at the second time, and the first processing device 304 may generate the second image statistics for the second frame 104. The first processing device 304 may provide the second image statistics to the memory 306. Additionally, the first processing device 304 may provide the second frame 104 and the second image statistics to the statistics processing device 108.

The statistics processing device 108 may poll the memory 306 and retrieve the first image statistics. After retrieving the first image statistics, the statistics processing device 108 may compare the second image statistics to the first image statistics to determine whether to provide the second frame 104 to the second processing device 310 for application-specific processing on the second frame 104. In the illustrative embodiment, application-specific processing may be used to determine whether the hand is visible in the second frame 104. For example, the statistics processing device 108 may determine whether a first change amount between the second image statistics and the first image statistics satisfies a threshold. If the change amount does not satisfy the threshold, the statistics processing device 108 may determine to conserve power and bypass application-specific processing of the second frame 104. If the change amount satisfies the threshold, the statistics processing device 108 may provide the second frame 104 to the second processing device 310 for application-specific processing on the second frame 104.

After capturing the second frame 104, the camera 302 may capture the third frame 106 at the third time, and the first processing device 304 may generate the third image statistics for the third frame 106. The first processing device 304 may provide the third image statistics to the memory 306. Additionally, the first processing device 304 may provide the third frame 106 and the third image statistics to the statistics processing device 108.

The statistics processing device 108 may poll the memory 306 and retrieve the first image statistics, the second image statistics, or a combination thereof. If the statistics processing device 108 determined to bypass application-specific processing on the second frame 104, the statistics processing device 108 may compare the third image statistics to the second image statistics to determine whether to perform application-specific processing on the third frame 106. Alternatively, the statistics processing device 108 may compare the third image statistics to the first image statistics or a combination of the first and second image statistics.

Bypassing application-specific processing on a particular frame that has similar image statistics to a previous frame may conserve power in electronic devices. For example, application-specific processing may utilize high-power devices (e.g., a general purpose processor or a graphics processor) within a processing system, such as computer vision application devices. By using low-power devices (e.g., a digital signal processor, an application-specific integrated circuit, a field programmable gate array, etc.), such as the statistics processing device 108, to generate and/or evaluate statistics of each frame, a determination may be made that particular frames are substantially identical and that application-specific processing need only be performed on one of the identical frames. As a result, power may be conserved by forgoing application-specific processing on identical or similar frames.

Figure 4:
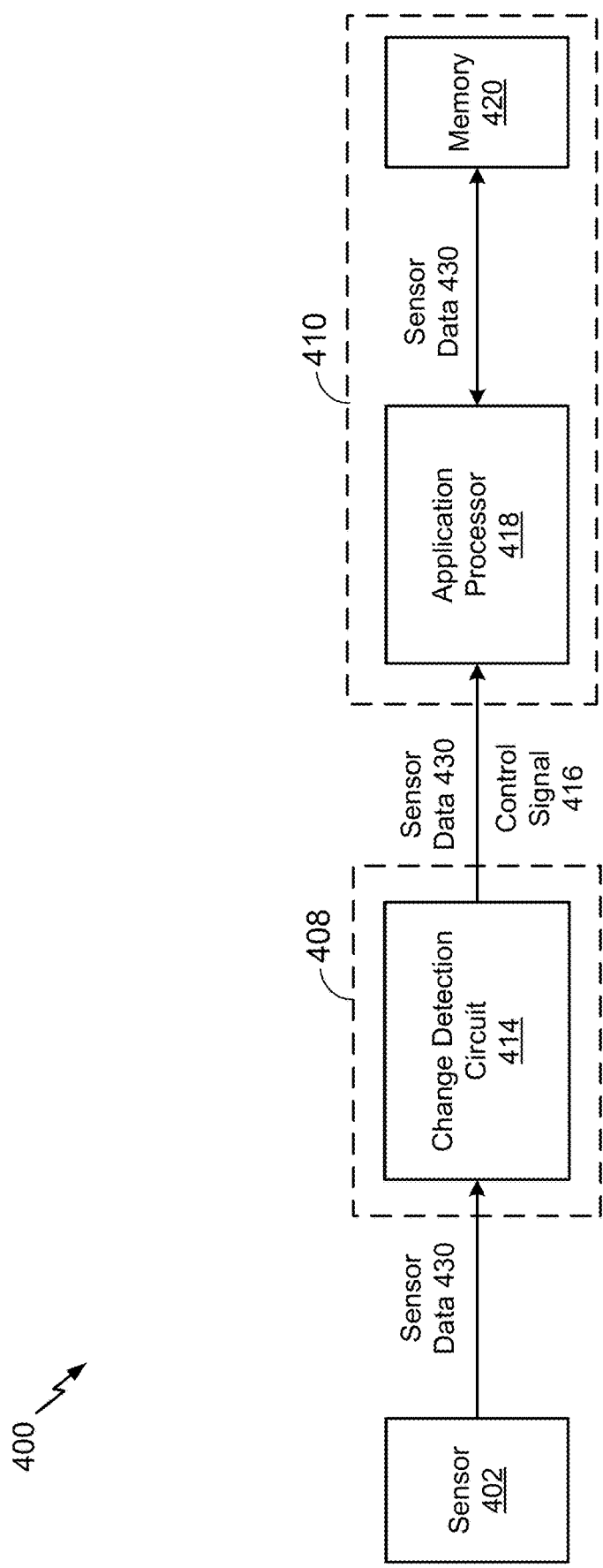
FIG. 4 is a diagram of a particular illustrative embodiment of a processing system that is operable to reduce power usage associated with computer vision applications.

Referring to FIG. 4, a particular illustrative embodiment of a processing system 400 that is operable to reduce power usage associated with computer vision applications is shown. The processing system 400 includes a sensor 402, a change detection circuit 414, an application processor 418, and a memory 420. In a particular embodiment, the change detection circuit 414 may be included in a first processing path 408 (e.g., a low power processing path and/or low data rate processing path). The application processor 418 and the memory 420 may be included in a second processing path 410 (e.g., a high power processing path and/or high data rate processing path).

The sensor 402 may be configured to capture sensor data 430 (e.g., a plurality of image frames or a video stream). In a particular embodiment, the sensor 402 may correspond to the camera 302 of FIG. 3. In another particular embodiment, the sensor 402 may be an ambient light sensor, such as an ambient light sensor 840 as described with respect to FIG. 8, or another type of sensor. The sensor data 430 may include first sensor data (e.g., the first frame 102 of FIG. 1), second sensor data (e.g., the second frame 104 of FIG. 1), third sensor data (e.g., the third frame 106 of FIG. 1), etc. The sensor data 430 may be provided to the change detection circuit 414 of the first processing path 408.

The change detection circuit 414 may compare the first frame 102 of the sensor data 430 to the second frame 104 (or another frame) of the sensor data 430 to detect a change amount between the frames 102, 104. For simplicity of illustration, the change detection circuit 414 will be described as comparing the first frame 102 to the second frame 104. However, because relatively minor changes may occur between the first frame 102 and the second frame 104, it will be appreciated that the change detection circuit 414 may compare the first frame 102 to frames spaced further apart to detect changes between the frames.

The change detection circuit 414 may include an "on-board" memory to store the first frame 102. When the second frame 104 (or another frame) of the sensor data 430 is received from the sensor 402, the change detection circuit 414 may retrieve the first frame 102 from the on-board memory, compare the frames 102, 104, and generate a control signal 416 based on the comparison. For example, the change detection circuit 414 may determine whether to wake up the application processor 418 based on the comparison (e.g., based on similarities between the first frame 102 and the second frame 104). In a particular embodiment, the change detection circuit 414 may compare first image statistics of the first frame 102 to second image statistics of the second frame 104 as described with respect to FIGS. 1-3. For example, the change detection circuit 414 may correspond to the statistics processing device 108 of FIGS. 1-3, and the on-board memory may correspond to the memory 306 of FIG. 3.

The control signal 416 may be provided to the application processor 418. The control signal 416 may indicate whether to "wake up" the application processor 418 to perform application-specific processing (e.g., computer vision application-specific processing) on the second frame 104. For example, if the change detection circuit 414 determines that the change amount between the first frame 102 and the second frame 104 does not satisfy a threshold, the control signal 416 may keep the application processor 418 in a "sleep" state to conserve power. If the change detection circuit 414 determines that the change amount between the first frame 102 and the second frame 104 satisfies the threshold, the control signal 416 may wake up the application processor 418 to perform application-specific processing on the second frame 104. Thus, the change detection circuit 414 may also provide sensor data 430 (e.g., the second frame 104) to the application processor 418 for computer vision application-specific processing.

The application processor 418 may be configured to perform computer vision application-specific processing on the second frame 104. As a non-limiting example, the application processor 418 may determine whether a particular object (e.g., a hand) is in the second frame 104. Thus, the application processor 418 may perform object detection/object recognition computer vision application-specific processing. Other examples of computer vision application-specific processing may include security applications (e.g. surveillance, intrusion detection, object detection, facial recognition, etc.), environmental-use applications (e.g., lighting control), object detection and tracking applications, etc. As used herein, "computer vision application" and/or "computer vision application-specific processing" may correspond to, or include, a limitless number of applications based on video/image data. The examples used herein are not intended to be limiting.

In a particular embodiment, the application processor 418 may perform computer vision application-specific processing as described with respect to FIGS. 13-27. For example, the application processor 418 may extract a first subset of features of the second frame 104, extract a second subset of features of the second frame 104 based on the first subset of features satisfying an analysis criterion, and generate context data indicating a context of the second frame 104 based at least in part on the second subset of features.

The application processor 418 may also provide the sensor data 430 (e.g., the frames that undergo computer vision application-specific processing) to the memory 420. Thus, the application processor 418 (and additional processors/processing resources) may access the sensor data 430 from the memory 420 during computer vision-application specific processing. In a particular embodiment, the memory 420 may be a double data rate (DDR) memory. For example, the memory 420 may be a DDR synchronous dynamic random-access memory (DDR SDRAM).

The processing system 400 of FIG. 4 may reduce power consumption by bypassing computer vision application-specific processing on a particular frame that is similar to a previous frame. For example, the change detection circuit 414 may indicate (via the control signal 416) whether to activate (e.g., wake up) the application processor 418 based on a comparison between a current frame and a previous frame. If the change detection circuit 414 determines that differences between the current frame and the previous frame do not satisfy a threshold (e.g., a change threshold), the change detection circuit 414 may determine to deactivate the application processor 418 (e.g., keep the application processor 418 in the sleep state) to conserve power.

Figure 5:
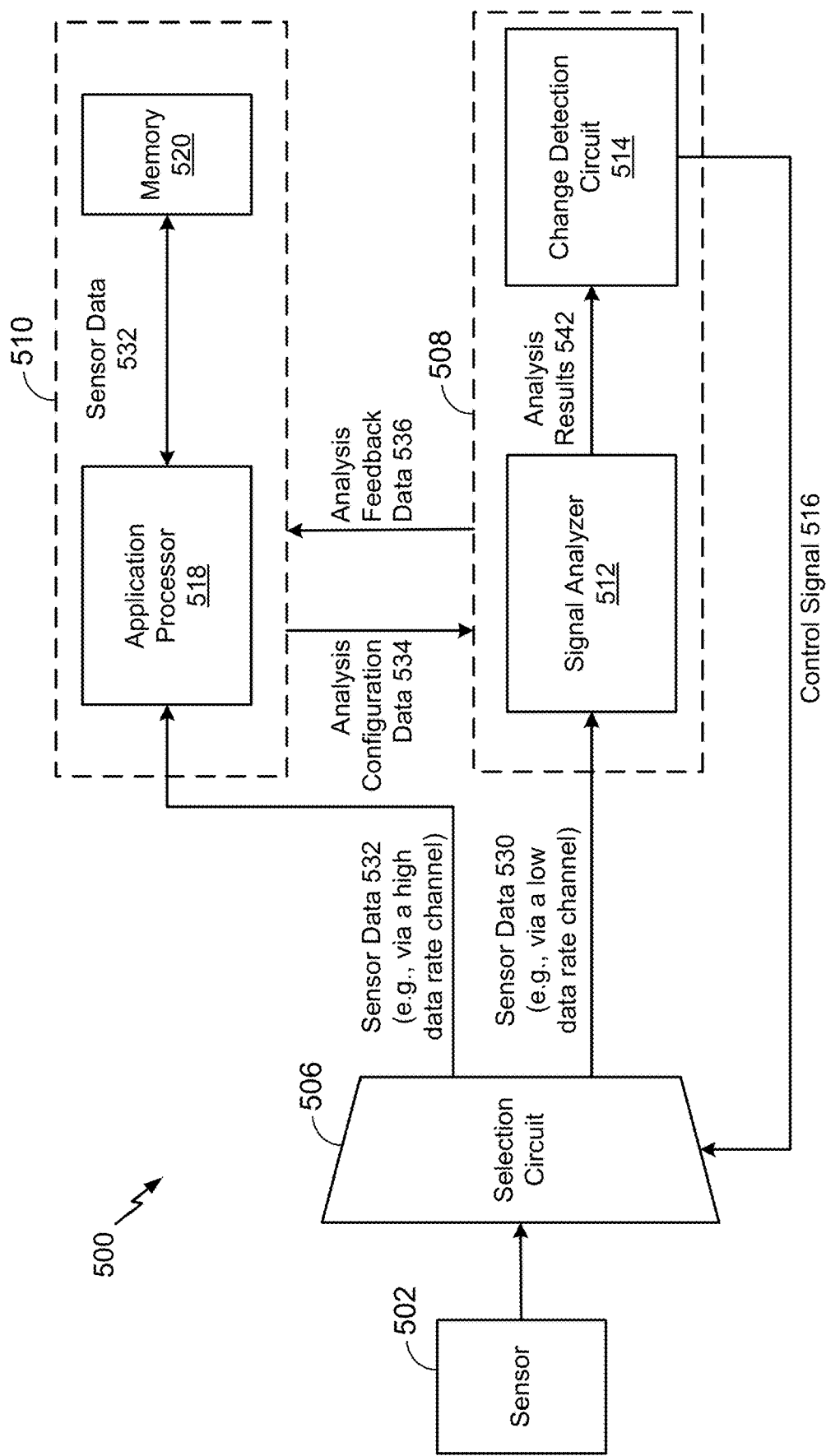
FIG. 5 is a diagram of another particular illustrative embodiment of a processing system that is operable to reduce power usage associated with computer vision applications.

Referring to FIG. 5, a particular illustrative embodiment of a processing system 500 that is operable to reduce power usage associated with computer vision applications is shown. The processing system 500 includes a sensor 502, a selection circuit 506, a first processing path 508, and a second processing path 510.

The first processing path 508 may include a signal analyzer 512 and a change detection circuit 514. The second processing path 510 may include an application processor 518 and a memory 520. In a particular embodiment, the first processing path 508 may be a low power processing path and/or a low data rate processing path, and the second processing path 510 may be a high power processing path and/or high data rate processing path. For example, components in the first processing path 508 may consume less power than components in the second processing path 510.

The sensor 502 may be configured to capture sensor data (e.g., a plurality of image frames or a video stream). In a particular embodiment, the sensor 502 may correspond to the camera 302 of FIG. 3 or the sensor 402 of FIG. 4. The sensor data may include first sensor data (e.g., the first frame 102 of FIG. 1), second sensor data (e.g., the second frame 104 of FIG. 1), third sensor data (e.g., the third frame 106 of FIG. 1), etc. The sensor data may be provided to the selection circuit 506.

The selection circuit 506 may be configured to provide incoming frames (e.g., sensor data) to the first processing path 508 and/or provide the incoming frames to the second processing path 510 based on a control signal 516 (e.g., a feedback signal). In a particular embodiment, the selection circuit 506 may be implemented as a multiplexer responsive to the control signal 516. The selection circuit 506 may initially provide sensor data 530 (e.g., provide incoming frames via a low data rate channel) to the signal analyzer 512 for processing. To illustrate, the selection circuit 506 may provide the first frame 102 to the signal analyzer 512, and the selection circuit 506 may provide the second frame 104 to the signal analyzer 512.

Upon receiving the first frame 102, the signal analyzer 512 may analyze the first frame 102 and provide first analysis results 542 of the analysis to the change detection circuit 514. In a particular embodiment, the signal analyzer 512 may correspond to the first processing device 304 of FIG. 3 and operate in a substantially similar manner. The change detection circuit 514 may include an "on-board" memory to store the first analysis results 542. In a particular embodiment, the change detection circuit 514 may operate in a substantially similar manner as the change detection circuit 414 of FIG. 4. Upon receiving the second frame 104, the signal analyzer 512 may analyze the second frame 104 and provide second analysis results 542 of the analysis to the change detection circuit 514.

In a particular embodiment, the application processor 518 may generate and provide analysis configuration data 534 to the signal analyzer 512 and/or to the change detection circuit 514. The analysis configuration data 534 may indicate a particular type of features to be analyzed (e.g., a particular type of image statistics to be generated) by the signal analyzer 512 and/or the change detection circuit 514. The particular type of features to be analyzed may be based on a particular computer vision application to be performed by the application processor 518. As a non-limiting example, if the application processor 518 is to perform an object detection/recognition computer vision application to detect a "hand" in an image frame, the application processor 518 may provide analysis configuration data 534 such that the signal analyzer 512 generates image data for pixels having "skin tone" colors.

The change detection circuit 514 may be configured to determine a change amount between the first frame 102 and the second frame 104 (e.g., a change amount between the first analysis results 542 (or first sensor data) and the second analysis results 542 (or second sensor data)). When the change amount fails to satisfy a threshold (e.g., a change threshold), the change detection circuit 514 may generate a control signal 516 having a first value. When the change amount satisfies the threshold, the change detection circuit 514 may generate a control signal 516 having a second value. As a non-limiting example, the change amount may satisfy the threshold when a difference between a first count of pixels for a particular color value (e.g., brown) in a first color histogram (generated by the signal analyzer 512) and a second count of pixels for the particular color value in a second color histogram (generated by the signal analyzer 512) is greater than a threshold value.

If the control signal 516 has the first value (e.g., indicating that the change amount failed to satisfy the threshold), the selection circuit 506 may provide additional frames (e.g., sensor data 530) to the first processing path 508 so that the signal analyzer 512 may generate data for the additional frames and the change detection circuit 514 may determine whether a change amount associated with the additional frames satisfy the threshold. If the control signal 516 has the second value (e.g., indicating that the change amount satisfies the threshold), the selection circuit 506 may provide sensor data 532 (e.g., the second frame 104 and/or subsequent frames 106) to the second processing path 510 for application-specific processing (e.g., computer vision application-specific processing). For example, the selection circuit 506 may provide the sensor data 532 to the application processor 518 via a high data rate channel.

The application processor 518 may be configured to perform computer vision application-specific processing on the second frame 104. As a non-limiting example, the application processor 518 may determine whether a particular object (e.g., the hand) is in the second frame 104.

In a particular embodiment, the application processor 518 may perform computer vision application-specific processing as described with respect to FIGS. 13-27. For example, the application processor 518 may extract a first subset of features of the second frame 104, extract a second subset of features of the second frame 104 based on the first subset of features satisfying an analysis criterion, and generate context data indicating a context of the second frame 104 based at least in part on the second subset of features. In a particular embodiment, components of the first processing path 508 (e.g., the signal analyzer 512 and/or the change detection circuit 514) may provide analysis feedback data 536 to the application processor 518. The analysis feedback data 536 may include the analysis results 542 of the sensor data 530, an indication of an accuracy level of the analysis results, the first and second subset of features, etc. For example, the change detection circuit 514 may extract the first and second subset of features of the second frame 104 and provide the extracted features to the application processor 518 (via the analysis feedback data 536) so that the application processor 518 may generate the context data.

The application processor 518 may also provide the sensor data 532 (e.g., the frames that undergo computer vision application-specific processing) to the memory 520. Thus, the application processor 518 (and additional processors/processing resources) may access the sensor data 532 from the memory 520 during computer vision-application specific processing. In a particular embodiment, the memory 520 may be a DDR memory (e.g., a DDR SDRAM).

The processing system 500 of FIG. 5 may reduce power consumption by bypassing computer vision application-specific processing on a particular frame that is similar to a previous frame. For example, the change detection circuit 514 may indicate, via the control signal 516, whether to activate (e.g., wake up) the application processor 518 based on a comparison between image statistics of a current frame and image statistics of a previous frame. If the change detection circuit 514 determines that differences between the current frame and the previous frame do not satisfy a threshold (e.g., a change threshold), the change detection circuit 514 may determine to deactivate the application processor 518 (e.g., keep the application processor 518 in the sleep state) to conserve power.

Because the application processor 518 may indicate (to components of the first processing path 508) the type of statistics that are "relevant" to the computer vision application via the analysis configuration data 534, a number of false positives generated by the change detection circuit 514 may be reduced. For example, the signal analyzer 512 and the change detection circuit 514 may determine whether to wake up the application processor 518 based on image statistics tailored to a particular computer vision application as opposed to making the determination based on "any" change between frames. Reducing the number of false positives (e.g., reducing the number of times the second processing path 510 is activated based on image statistics that are irrelevant to the computer vision application) may also conserve power.

Figure 6:
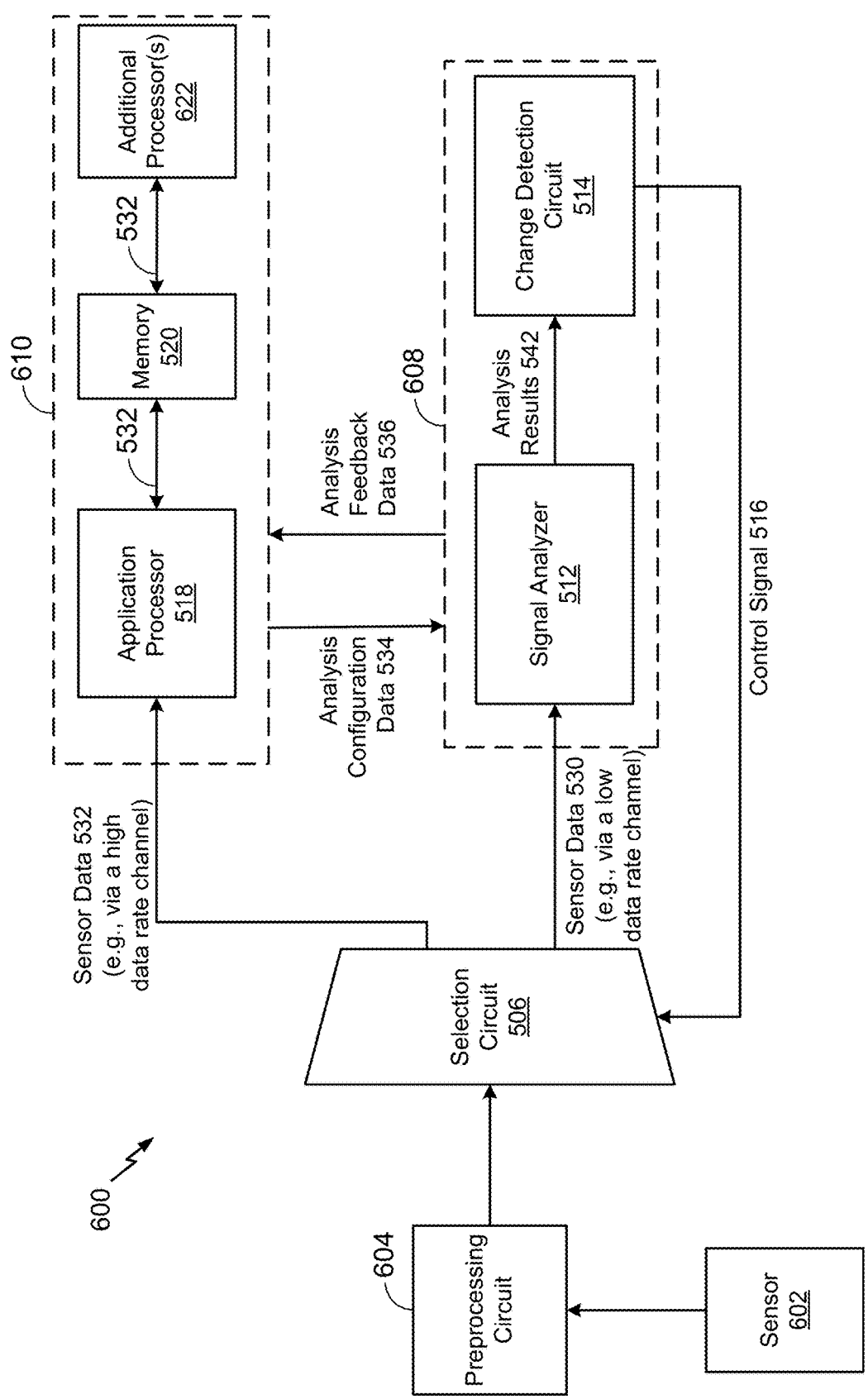
FIG. 6 is a diagram of another particular illustrative embodiment of a processing system that is operable to reduce power usage associated with computer vision applications.

Referring to FIG. 6, another particular illustrative embodiment of a processing system 600 that is operable to reduce power usage associated with computer vision applications is shown. The processing system 600 includes a sensor 602, preprocessing circuit 604, the selection circuit 506, a first processing path 608, and a second processing path 610.

The first processing path 608 may include the signal analyzer 512 and the change detection circuit 514. The second processing path 610 may include the application processor 518, the memory 520, and one or more additional processors 622. In a particular embodiment, the first processing path 608 may be a low power processing path, and the second processing path 610 may be a high power processing path. For example, components in the first processing path 608 may consume less power than components in the second processing path 610.

The sensor 602 may be configured to capture a plurality of image frames (e.g., a video stream). In a particular embodiment, the sensor 602 may correspond to the camera 302 of FIG. 3. The video stream captured by the sensor 602 may be provided to the preprocessing circuit 604. The preprocessing circuit 604 may be configured to sample the video stream to generate a set of frames (e.g., the first frame 102 of FIG. 1, the second frame 104, and the third frame 106) from the video stream. For example, the preprocessing circuit 604 may sample the video stream at sample rate such that the first frame 102 is generated at the first time, the second frame 104 is generated at the second time, and the third frame 106 is generated at the third time. Each frame 102-106 may be provided to the selection circuit 506.

The selection circuit 506, the signal analyzer 512, the change detection circuit 514, and the application processor 518 may operate in a similar manner as described with respect to FIG. 5. The one or more additional processors 622 may access the sensor data 532 from the memory 520 to perform additional processing (e.g., additional computer vision application-specific processing) on the sensor data 532, as described with respect to FIG. 7. In a particular embodiment, at least one of the one or more additional processor 422 may correspond to, or include, a second application processor or a digital signal processor (DSP).

Figure 7:
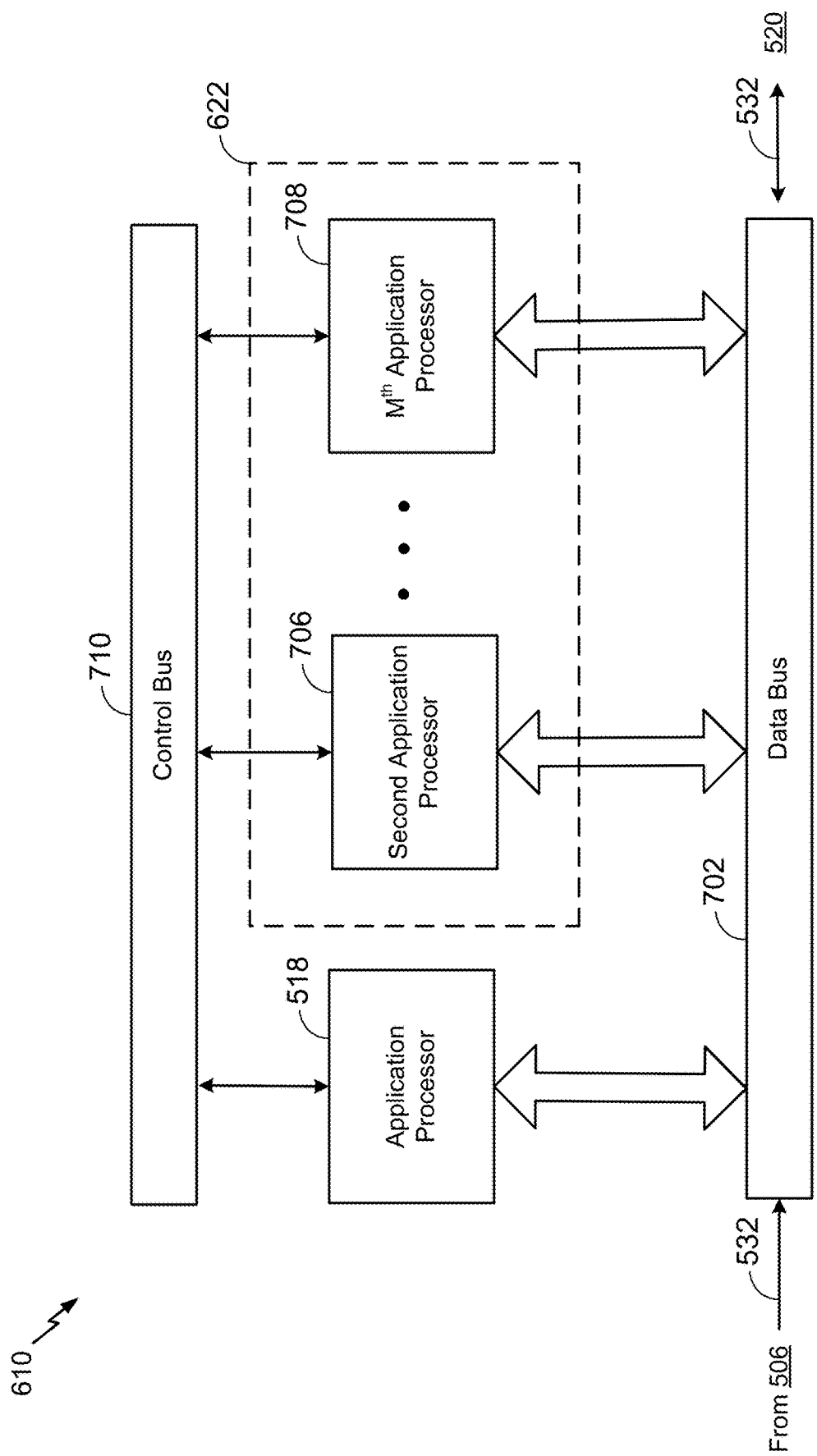
FIG. 7 is a diagram of the second processing path of FIG. 6.

Referring to FIG. 7, a particular illustrative embodiment of the second processing path 610 is shown. The second processing path 610 includes a data bus 702, the application processor 518, the one or more additional processors 622, and a control bus 710. The one or more additional processors 622 may include a second application processor 706 and an $M^{th}$ application processor 708. In a particular embodiment, M may be any integer value that is greater than or equal to one. For example, if M is equal to five, then the second processing path 610 may include five application processors.

Each application processor 518, 706, 708 may correspond to a processing core, an application processor subsystem, a processing resource, etc. Each application processor 518, 706, 708 may consume a different amount of power. For example, the application processor 518 may consume a first amount of power, the second application processor 706 may consume a second amount of power, and the $M^{th}$ application processor 708 may consume an $M^{th}$ amount of power. The first amount of power may be less than the second amount of power, and the second amount of power may be less than the $M^{th}$ amount of power.

The selection circuit 506 may provide the sensor data 532 (e.g., the second frame 104) to the memory 520 via the data bus 702. Each application processor 518, 706, 708 may be able to access the sensor data 532 from the memory 520 via the data bus 702. For example, each application processor 518, 706, 708 may be coupled to the data bus 702 to receive the second frame 104 (or processed versions of the second frame 104) from the memory 520.

The application processor 518 may be configured to perform first computer vision application-specific processing on the sensor data 532. As a non-limiting example, the application processor 518 may be configured to scan pixels of the second frame 104 for a particular color (e.g., a color associated with a human skin tone for hand detection/recognition). While the application processor 518 is performing the first computer vision application-specific processing on the second frame 104, the second application processor 706 and the $M^{th}$ application processor 708 may be in a "sleep" state to conserve power.

If the application processor 518 detects a particular event, the application processor 518 may request that the second application processor 706 perform second computer vision application-specific processing on the second frame 104 (e.g., request that the second application processor 706 "wake up" from the sleep state). As a non-limiting example, if the application processor 518 detects determines that a particular pixel of the second frame 104 has the particular color, the application processor 518 may request that second application processor 706 perform the second computer vision application-specific processing (e.g., object detection processing, object recognition processing, or any combination thereof) on the second frame 104. The application processor 518 may communicate with the second application processor 706 via the control bus 710. For example, the application processor 518 may send an instruction to the second application processor 706 via the control bus 710 to alert the second application processor 706 of the particular event.

The second application processor 706 may determine whether to perform the second computer vision application-specific processing on the sensor data 532 (e.g., the second frame 104). The determination may be based on processing capabilities of the second application processor 706, the relevance of the particular event, etc. If the second application processor 706 determines to perform the second computer-vision application-specific processing on the second frame 104, the second application processor 706 may also determine whether to discontinue computer vision application-specific processing on the second frame 104 at the application processor 518.

For example, the second application processor 706 may be able to perform the first and second computer vision application-specific processing on the second frame 104. Computer vision application-specific processing on the second frame 104 may be discontinued at the application processor 518 based on the determination at the second application processor 706. In this embodiment, the second application processor 706 may send an instruction to the application processor 518 (via the control bus 710) to enter in to a sleep state, and the second application processor 706 may perform the first computer vision application-specific processing on the second frame 104. For example, if the second application processor 706 is capable of performing the first computer vision application-specific processing on the second frame 104, the application processor 518 may be deactivated to the conserve power.

If the second application processor 706 determines to forgo the second computer vision application-specific processing on the second frame 104, the second application processor 706 may send an indication of a refusal to perform the second computer vision application-specific processing. For example, the second application processor 706 may send the indication via the control bus 710 to the application processor 518. In a particular embodiment, the second application processor 706 may send an instruction to cause the application processor 518 to refrain from requesting the second application processor 706 to perform the second computer vision application-specific processing based on the particular event. Additionally, the second application processor 706 may "program" the application processor 518 to troubleshoot the particular event so that the application processor 518 does not wake up the second application processor 706 upon the occurrence of the particular event. Thus, the second application processor 706 may control the state (e.g., sleep state or activate state) of the application processor 518, and the second application processor 706 may also program the application processor 518 to function in a more efficient manner.

The $M^{th}$ application processor 708 may operate in a substantially similar manner with respect to the second application processor 706 and the application processor 518 as the second application processor 706 operates with respect to the application processor 518. For example, the $M^{th}$ application processor 708 may be configured to perform $M^{th}$ computer vision application-specific processing on the second frame 104, the second computer vision application-specific processing, and the first computer vision application-specific processing. In a similar manner as the second application processor 706, the $M^{th}$ application processor 708 may decline to perform the $M^{th}$ computer vision application-specific processing, control the state of the other application processors 518, 706, program the other application processors 518, 706 to operate in a more efficient manner, etc.

The second processing path 610 may reduce power consumption by selectively deactivating one or more application processors 518, 706, 708 to increase processing efficiency. For example, the application processors that are more complex (e.g., capable of performing more computer vision application-specific processing functions) and consume more power may control the state of the application processors that are less complex and consume less power. Thus, if an active application processor is able to perform the computer vision application-specific processing functions of a lower power application processor, the active application processor may instruct the lower power application processor to enter into a sleep state to conserve power.

Figure 8:
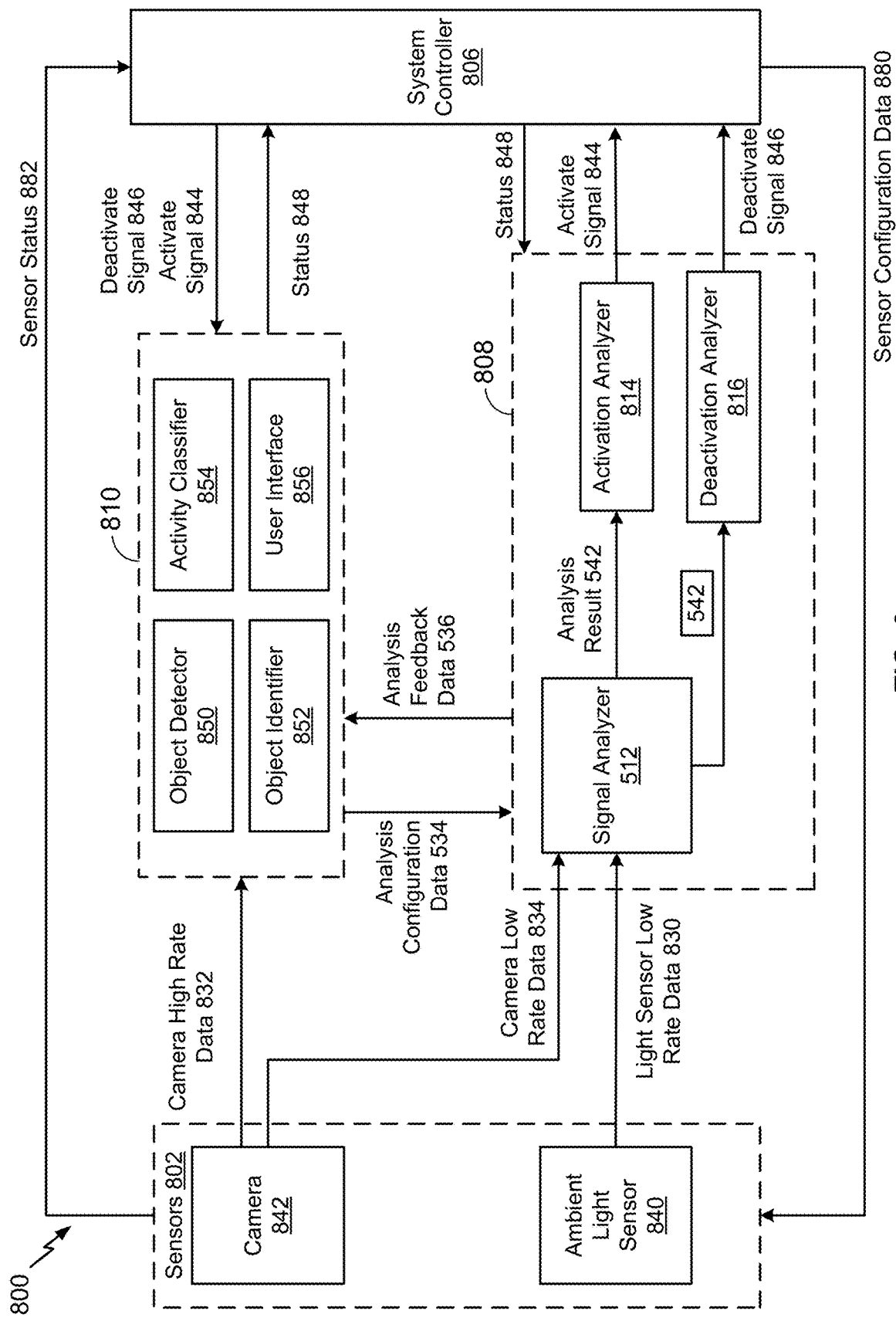
FIG. 8 is diagram of another particular illustrative embodiment of a processing system operable to reduce power usage associated with computer vision applications.

Referring to FIG. 8, another particular illustrative embodiment of a processing system 800 that is operable to reduce power usage associated with computer vision applications is shown. The processing system 800 includes sensors 802, a system controller 806, a first processing path 808, and a second processing path 810. In FIG. 8, the sensors 802 include an ambient light sensor 840 and a camera 842. In alternate embodiments, different numbers and/or types of sensors may be included. The first processing path 808 may include the signal analyzer 512, an activation analyzer 814, and a deactivation analyzer 816. The second processing path 810 may include an object detector 850, an object identifier 852, an activity classifier 854, and a user interface 856.

The ambient light sensor 840 may be configured to detect light and/or motion in a field of view. For example, the ambient light sensor 840 may be a micro-electrical-mechanical system (MEMS) based camera that is of low-power and low-resolution to determine whether light or motion is present in the field of view. If the ambient light sensor 840 detects motion and/or light in the field of view, the ambient light sensor 840 may provide a first value (e.g., a logical high voltage value) to the system controller 806 as a sensor status 882. Alternatively, if the ambient light sensor 840 does not detect motion and/or light in the field of view, the ambient light sensor 840 may provide a second value (e.g., a logical low voltage value) to the system controller 806 as a sensor status 882.

Based on the sensor status 882, the system controller 806 may selectively activate or deactivate the camera 842. For example, the system controller 806 may provide sensor configuration data 880 to activate the camera 842 when the ambient light sensor 840 detects light and/or motion in the field of view. When the camera 842 is activated, the camera 842 may provide low rate data 834 (e.g., the sensor data 530) to the signal analyzer 512. Alternatively, the system controller 806 may provide sensor configuration data 880 to deactivate the camera 842 when the ambient light sensor 840 does not detect light and/or motion in the field of view. Deactivating the camera 842 when light and/or motion are not detected in the field of view may conserve power. In a particular embodiment, the sensor configuration data 880 may also indicate the portion (e.g., the location) in the field of view where the light and/or motion was detected.

Although the sensors 802 in FIG. 8 depict the ambient light sensor 840 and the camera 842, in other embodiments, a single camera that is configured to operate in a first mode (e.g., a low-power mode) and a second mode (e.g., a high power mode) may be used. For example, in the low-power mode, the camera may be configured to detect light and/or motion in a field of view. Upon detecting the light and/or motion, the camera may enter into the high-power mode and provide low rate data 834 (e.g., the sensor data 530) to the signal analyzer 512.

The signal analyzer 512 may provide the analysis results 542 to the activation analyzer 814 and the deactivation analyzer 816. In a particular embodiment, the activation analyzer 814 and the deactivation analyzer 816 may correspond to the change detection circuit 414 of FIG. 4 or the change detection circuit 514 of FIG. 5. For example, the activation analyzer 814 may generate an activate signal 844 based on the analysis results 542 (e.g., if the change amount between the first sensor data and the second sensor data satisfies a change threshold). The system controller 806 may provide the activate signal 844 to the second processing path 810 to activate (e.g., wake up) components in the second processing path 810. Alternatively, the deactivation analyzer 816 may generate a deactivate signal 846 based on the analysis results 542 (e.g., if the change amount between the first sensor data and the second sensor data fails to satisfy the threshold). The system controller 806 may provide the deactivation signal to the second processing path 810 to deactivate components in the second processing path 810.

If the second processing path 810 is activated, the camera 842 may provide high rate data 832 to the components in the second processing path 810 for computer vision application-specific processing. For example, the object detector 850 may detect objects in a frame of the high rate data 832, the object identifier 852 may indentify the object, the activity classifier 854 may classify the identified object, etc. In a particular embodiment, the object detector 850 may correspond to the application processor 518 of FIG. 7, the object identifier 852 may correspond to the second application processor 706 of FIG. 7, and the activity classifier 854 may correspond to the $M^{th}$ application processor 708 of FIG. 7. Although the second processing path 810 in FIG. 8 includes the object detector 850, the object identifier 852, and the activity classifier 854, in other embodiments, the second processing path 810 may include additional or different components. For example, the components in the second processing path 810 may be based on the computer vision application. The user interface 856 may be configured to display outputs of the object detector 850, the object identifier 852, the activity classifier, or any combination thereof, to a user (e.g., at a display device).

In a particular embodiment, the second processing path 810 may provide a status indication 848 to the first processing path 808 via the system controller 806. The status indication 848 may indicate to the first processing path 808 whether particular components in the second processing path 810 are active or idle.

Figure 9:
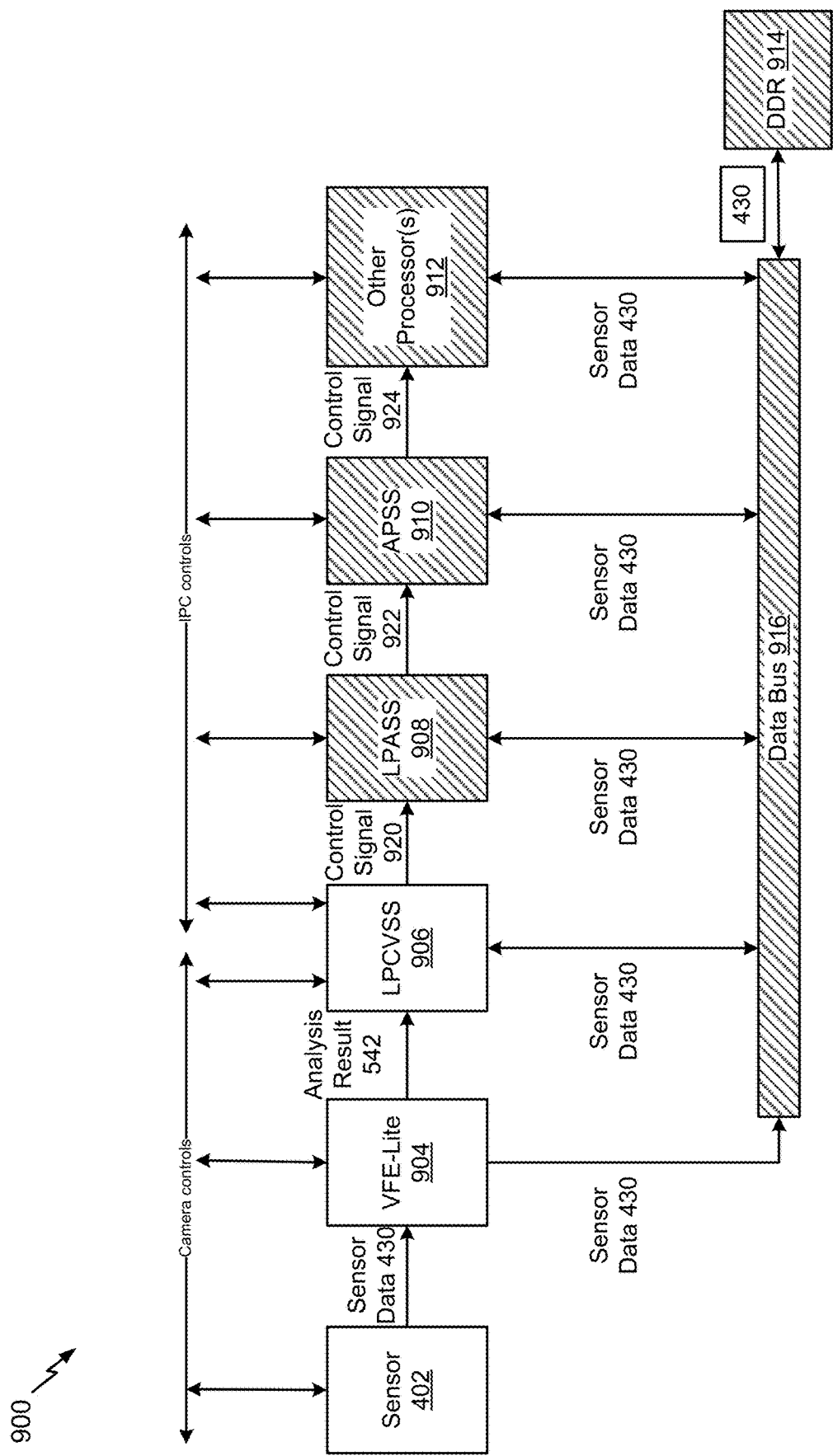
FIG. 9 is diagram of another particular illustrative embodiment of a processing system that is operable to reduce power usage associated with computer vision applications.

Referring to FIG. 9, another particular illustrative embodiment of a processing system 900 that is operable to reduce power usage associated with computer vision applications is shown. The processing system 900 includes the sensor 402, a video front-end (VFE) Lite subsystem 904, a low power computer vision subsystem (LPCVSS) 906, a low power application subsystem (LPASS) 908, an application processor subsystem (APSS) 910, one or more other processors 912, and a data bus 916. In a particular embodiment, the LPASS 908 may correspond to the application processor 518 of FIG. 7 and may operate in a substantially similar manner, the APSS 910 may correspond to the second application processor 706 of FIG. 7 and may operate in a substantially similar manner, and the one or more other processors 912 may correspond to the $M^{th}$ application processor 708 of FIG. 7 and may operate in a substantially similar manner.

The LPASS 908, the APSS 910, and the one or more other processors 912 may each correspond to a processing core, an application processor subsystem, a processing resource, etc. The LPASS 908 may consume a first amount of power, the APSS 910 may consume a second amount of power, and the additional processors 912 may consume third amount of power. The first amount of power may be less than the second amount of power, and the second amount of power may be less than the third amount of power.

The sensor 402 may provide the sensor data 430 (e.g., the first frame 102, the second frame 104, the third frame 106, etc.) to the VFE-Lite 904. Upon receiving the first frame 102, the VFE-Lite 904 may analyze the first frame 102 and provide first analysis results 542 of the analysis to the LPCVSS 906. In a particular embodiment, the VFE-Lite 904 may correspond to the first processing device 304 of FIG. 3 or the signal analyzer 512 of FIG. 5 and operate in a substantially similar manner. The LPCVSS 906 may include an "on-board" memory to store the first analysis results 542. In a particular embodiment, the LPCVSS 906 may operate in a substantially similar manner as the change detection circuit 414 of FIG. 4 or the change detection circuit 514 of FIG. 5. Upon receiving the second frame 104, the VFE-Lite 904 may analyze the second frame 104 and provide second analysis results 542 of the analysis to the LPCVSS 906.

Additionally, the VFE-Lite 904 may provide the sensor data 430 (e.g., the second frame 104) to a DDR 914 via the data bus 916. The LPCVSS 906, the LPASS 908, the APSS 910, and the additional processors 912 may be able to access the sensor data 430 from the DDR 914 via the data bus 916. For example, the LPCVSS 906, the LPASS 908, the APSS 910, and the additional processors 912 may be coupled to the data bus 916 to receive the second frame 104 (or processed versions of the second frame 104) from the DDR 914.

The LPCVSS 906 may be configured to determine a change amount between the first frame 102 and the second frame 104 (e.g., a change amount between the first analysis results 542 (or first sensor data) and the second analysis results 542 (or second sensor data)). When the change amount fails to satisfy a threshold (e.g., a change threshold), the LPCVSS 906 may generate a control signal 920 having a first value. When the change amount satisfies the threshold, the LPCVSS 906 may generate a control signal 516 having a second value.

In the illustrated embodiment of FIG. 9, the control signal 920 has the first value indicating that the change amount failed to satisfy the threshold. As a result, the LPASS 908, the APSS 910, and the one or more additional processors 912 are in a sleep state, as indicated via hatching pattern. For example, the LPCVSS 906 may indicate to the LPASS 908 (via the control signal 920) to remain in the sleep state based on the change amount. Thus, in the illustrated embodiment of FIG. 9, the power may be conserved turning off the LPASS 908, the APSS 910, and the one or more additional processors 912 because the computer vision application-specific processing on the current frame may be bypassed.

Figure 10:
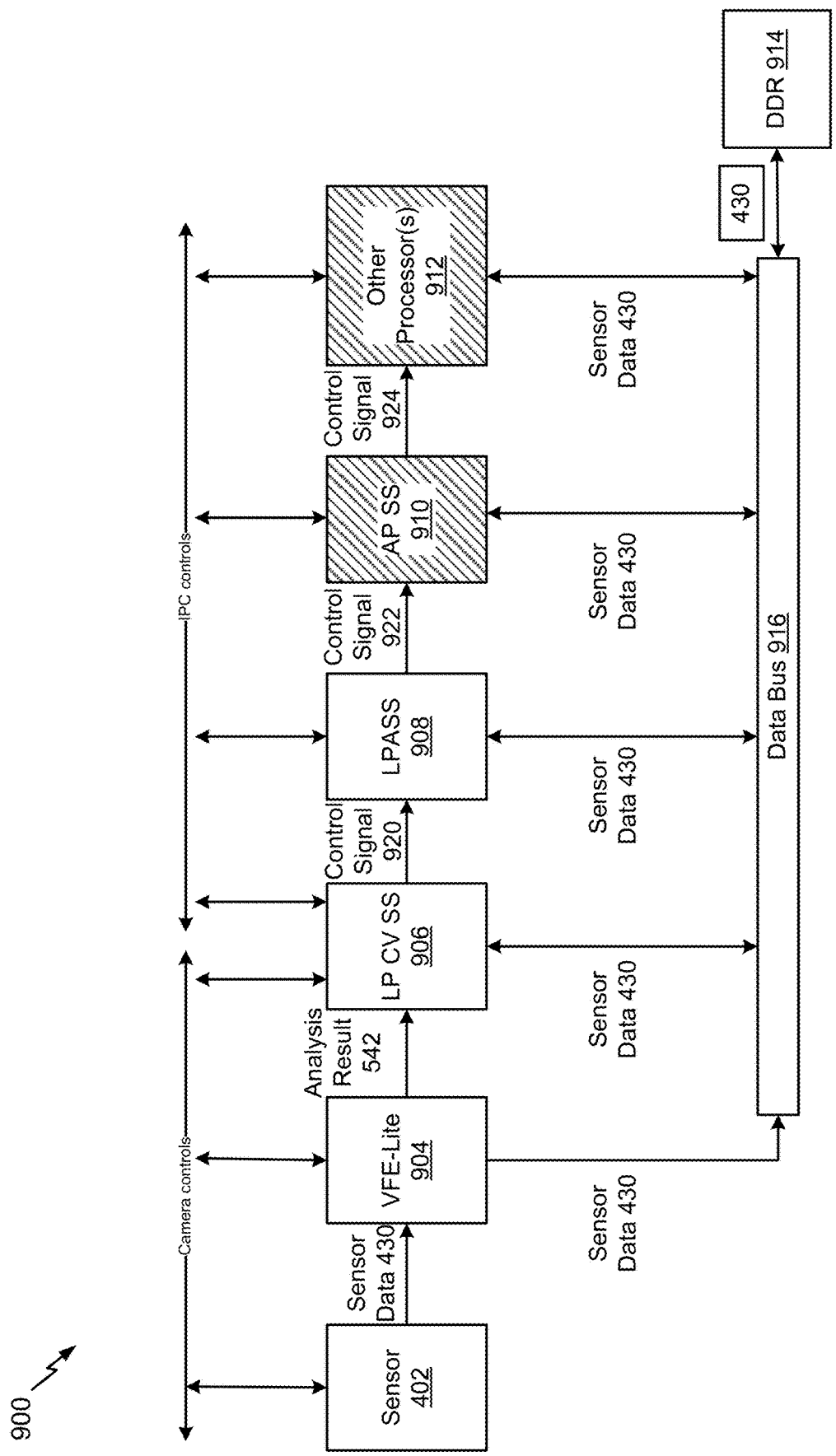
FIG. 10 is a diagram illustrating the processing system of FIG. 9 in a partial power mode.

In the illustrated embodiment of FIG. 10, the processing system 900 may be in a partial power mode. To illustrate, the control signal 920 may have the second value indicating that the change amount satisfies the threshold. For example, the LPCVSS 906 may detect "activity" (e.g., a change between the current frame and the previous frame) and signal to the LPASS 908 to perform computer vision application-specific processing on the current frame. When the LPASS 908 receives the control signal 920, the LPASS 908 may "wake up" and perform first computer vision application-specific processing on the sensor data 430. As a non-limiting example, the LPASS 908 may be configured to scan pixels of the second frame 104 for a particular color (e.g., a color associated with a human skin tone for hand detection/recognition). As another non-limiting example, the LPASS 908 may generate a localized "region of interest" (ROI) to determine whether the activity in the ROI satisfies a threshold. If the activity in the ROI does not satisfy the threshold, the LPASS 908 may "turn off" the APSS 910 and the other processors 912 and may "drop" the current frame. Turning off the APSS 910 and the other processors 912 may reduce power consumption.

Figure 11:
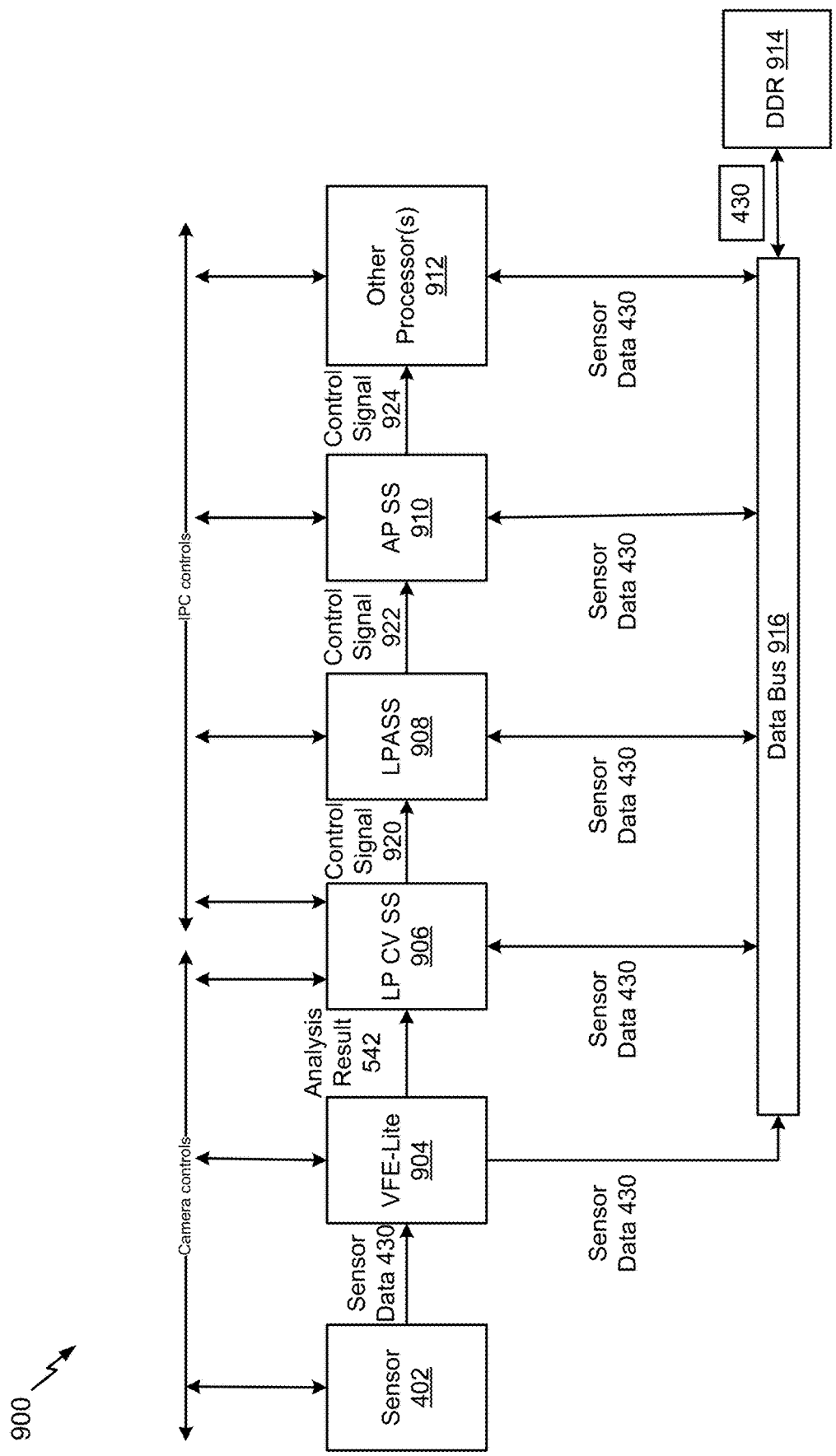
FIG. 11 is a diagram illustrating the processing system of FIG. 9 in a full power mode.

In the illustrated embodiment of FIG. 11, the processing system 900 may be in a full power mode. For example, if the activity in the ROI satisfies the threshold, the LPASS 908 may request, via a control signal 922, that the APSS 910 perform second computer vision application-specific processing on the second frame 104 (e.g., request that the APSS 910 "wake up" from the sleep state). As a non-limiting example, if the LPASS 908 detects determines that a particular pixel of the second frame 104 has the particular color, the LPASS 908 may request that APSS 910 perform the second computer vision application-specific processing (e.g., object detection processing, object recognition processing, or any combination thereof) on the second frame 104. The LPASS 908 may communicate with the APSS 910 via IPC controls.

Similarly, the APSS 910 may request, via a control signal 924, that the additional processors 912 perform third computer vision application-specific processing on the second frame 104 (e.g., request that the additional processors 912 "wake up" from the sleep state). The APSS 910 may communicate with the additional processors 912 via IPC controls.

Thus, the embodiments described with respect to FIGS. 9-11 may reduce power consumption by selectively deactivating one or more processors/subsystems to increase processing efficiency.

Figure 12:
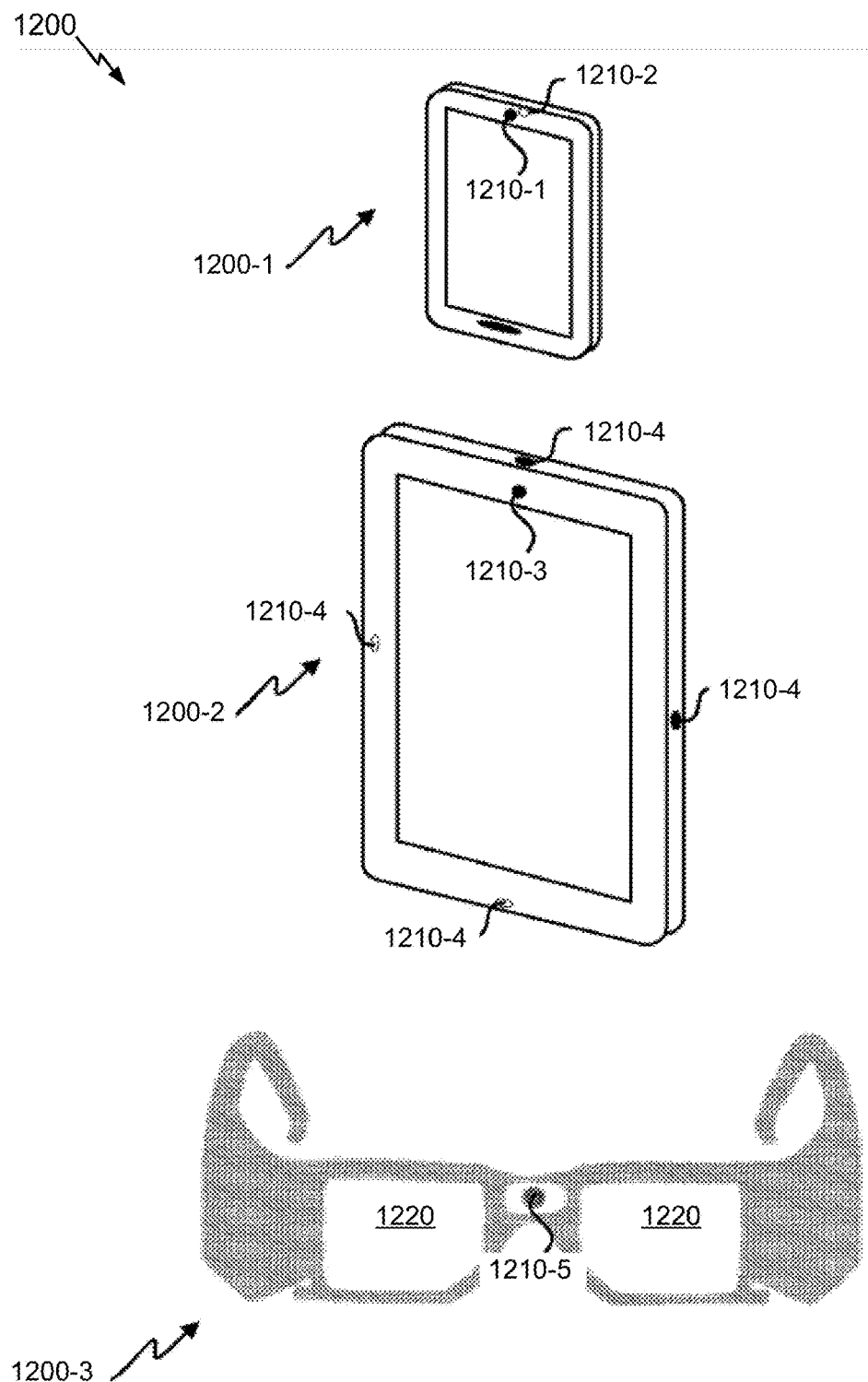
FIG. 12 is a block diagram of a particular illustrative embodiment of mobile devices that may utilize an always-on camera to identify a context of an image.

An example of a sensor (e.g., the sensor 402 of FIG. 4) that may provide input to a computer vision application processor includes an always-on camera. The always-on camera may be included in and/or communicatively coupled with any of a variety of mobile devices. FIG. 12, for example, is an illustration of embodiments of mobile devices 1200 that may utilize an always-on camera. The mobile devices 1200 include a mobile phone 1200-1, a tablet 1200-2, and a head-mounted display (HMD) 1200-3. Although not shown in FIG. 12, the mobile devices 1200 may include personal digital assistants (PDAs), notebook computers, personal media players, gaming devices, cameras, video recorders, and the like. The mobile devices 1200 may include one or more wearable devices (e.g., helmet cameras, sports cameras, etc.), which may be distributed across a user's body. Multiple devices (e.g., wearable devices) may be communicatively connected with and/or managed by a contextual determination engine, as further described in reference to FIG. 13.

Furthermore, style, size, functionality, and/or other features of a mobile device may vary between different mobile devices of the same type. Mobile devices 1200 may include one or more cameras 1210 (e.g., the camera 302 of FIG. 3, the camera 842 of FIG. 8) positioned at any of a variety of locations on the mobile device 1200. The mobile phone 100-1, for instance, may include a front-facing camera 1210-1 and/or a rear-facing camera 1210-2. The tablet 1200-2 may include a front-facing camera 1210-3 and/or additional cameras 1210-4 on other surfaces (e.g., sides and/or back), which may face other directions. The HMD 100-3 may have an outward-facing camera 1210-5 located between the displays 1220 of the HMD 1200-3, as shown, and/or at another location of the HMD 1200-3.

Any or all of the cameras 1210 of a mobile device may be utilized as an always-on camera, depending on desired functionality. Although some embodiments may utilize a particular camera dedicated for always-on functionality with particular features that accommodate always-on functionality (e.g., a wide-angle, fisheye, low-power, low resolution, etc.), embodiments may additionally or alternatively utilize any of a variety of camera types (e.g., infrared, ultraviolet, spectrometer, high resolution, front-facing, etc.) for always-on functionality. Embodiments in which a mobile device includes a plurality of cameras may enable a user to select a camera to use as an always-on camera and/or the mobile device may toggle between different cameras in certain situations.

Embodiments of a mobile device may vary from the mobile devices 1200 shown in FIG. 12. For example, in addition or as an alternative to cameras embedded within a mobile device, a particular embodiment may include a mobile device physically separate from a camera, but communicatively coupled therewith (e.g., via wireless or wired technologies). Other sensors may also be physically separate from a mobile device, yet in communication therewith, such that cameras and/or other sensors may be distributed, for example, at various locations on and/or around the body of a user.

Figure 13:
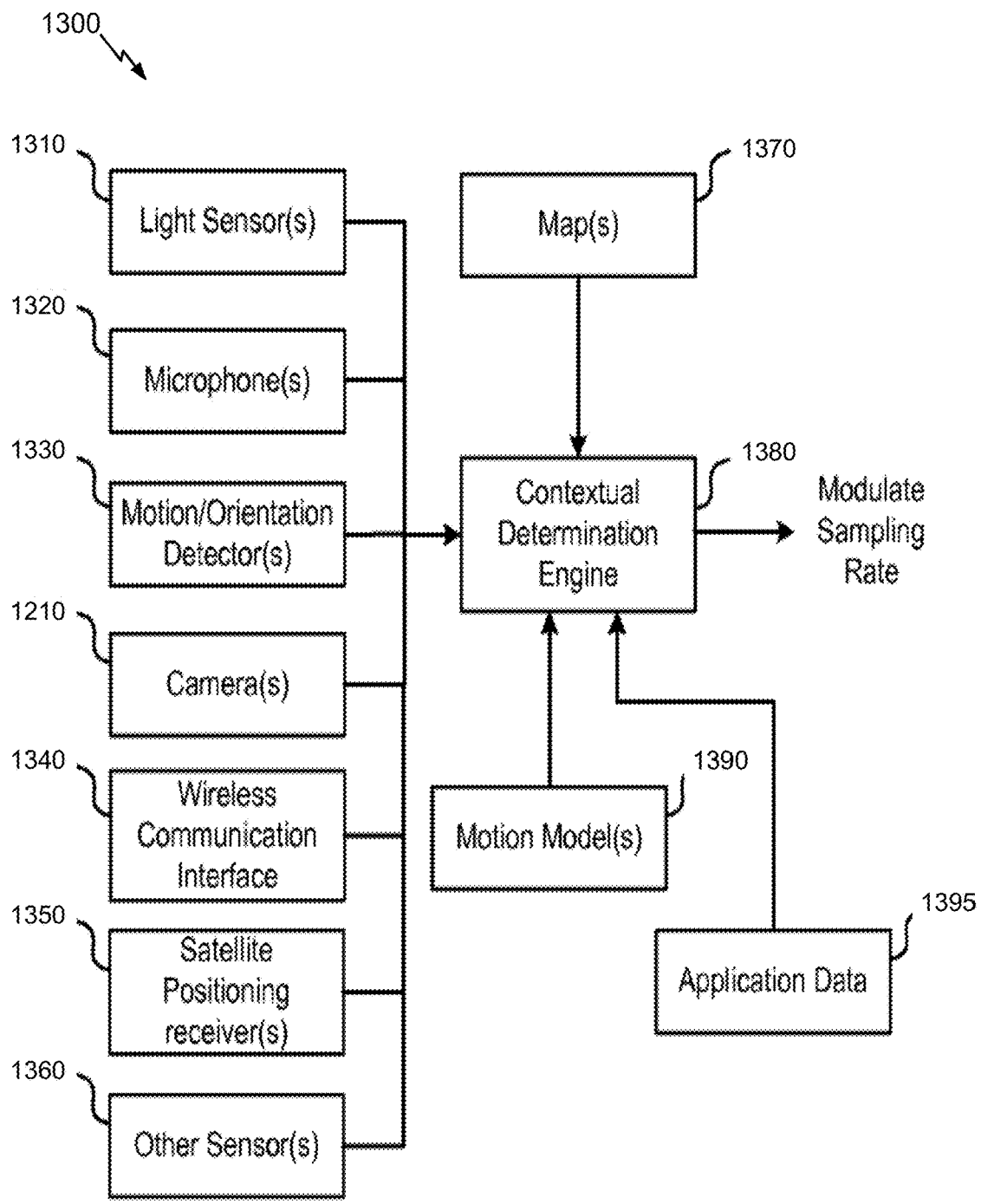
FIG. 13 is a diagram of an input/output diagram illustrating how embodiments of devices may utilize a sensor and other information in contextual determinations, which may influence modulation of a sampling rate of an always-on camera.

FIG. 13 is an input/output diagram illustrating how embodiments of devices may utilize a sensor and other information in contextual determinations, which may influence modulation of a sampling rate of an always-on camera. These contextual determinations may be made by a contextual determination engine 1380 executed, for example, by software and/or hardware of one or more of the mobile devices 1200. The contextual determination engine 1380 may be part of or integrated into a larger software and/or hardware application of the one or more of the mobile devices 1200. For example, one or more components of the contextual determination engine 1380 may be part of or integrated into an application processor (e.g., the second processing device 310 of FIG. 3, the application processor 418 of FIG. 4, the application processor 518 of FIGS. 5-7, the one or more additional processors 622, the second application processor 706, and/or the $M^{th}$ application processor 708 of FIG. 7), the object detector 850, the object identifier 852, the activity classifier 854, the activation analyzer 814, the deactivation analyzer 816, the system controller 806 of FIG. 8, the VFE-Lite 904, the LPCVSS 906, the LPASS 908, the APSS 910, the one or more other processors 912 of FIGS. 9-11, a change detection circuit (e.g., the change detection circuit 414 of FIG. 4 and/or the change detection circuit 514 of FIG. 5), the signal analyzer 512 of FIG. 5, or a combination thereof. The contextual determination engine 1380 may receive data from various components in order to make the contextual determination, including light sensor(s) 1310 (which may include, for example, the ambient light sensor 840 of FIG. 8, ultra violet (UV) sensor(s), UV-A sensor(s), UV-B sensor(s), red-green-blue (RGB) sensor(s), and the like), microphone(s) 1320, motion/orientation detector(s) 1330 (which may include, for example, one or more gyroscopes, magnetometers (and/or other types of compasses), accelerometer(s), and the like), camera(s) 1210 (e.g., the camera 302 of FIG. 3 and/or the camera 842 of FIG. 8), a wireless communication interface 1340 (which may include, for example, a second generation (2G) modem, a third generation (3G) modem, a fourth generation (4G) modem, a wireless fidelity (WiFi) interface, a worldwide interoperability for microwave access (WiMax) interface, and/or another wireless interface such as a Bluetooth® (a registered trademark of Bluetooth SIG, Inc.) interface or a Bluetooth® (a registered trademark of Bluetooth SIG, Inc.) low energy (LE) interface), satellite positioning receiver(s) 1350, and/or other sensor(s) 1360 (e.g., the sensor 402 of FIG. 4, the sensor 502 of FIG. 5, the sensor 602 of FIG. 6, altimeter(s), proximity sensor(s), compressive imaging sensor(s), temperature sensor(s), pressure sensor(s), touch sensor(s), fingerprint sensor(s), and the like).

In a particular embodiment, the contextual determination engine 1380 may receive data from map(s) 1370, motion model(s) 1390, and/or application data 1395 (e.g., computer vision application data). Depending on desired functionality, one or more of the components may be integrated into one or more of the mobile devices 1200 and/or separate from the one or more of the mobile devices 1200 (communicating, for example, via a wired and/or wireless connection, as previously described).

The one or more cameras 1210 may be integrated into and/or communicatively coupled with one or more of the mobile devices 1200. Furthermore, any or all of the camera(s) 1210 may be designated as an always-on camera. The contextual determination engine 1380 may make this designation. Not only may the sample rate of an always-on camera be impacted by a contextual determination of the contextual determination engine 1380, but images from an always-on camera (and/or other camera(s) 1210) may be processed for further contextual determinations.

Contextual determinations may result in modulating a sampling rate of an always-on camera (which may be an initial sampling rate chosen by a software application anchor hardware default). The sampling rate may be modulated to any of a wide variety of sampling rates. For example, an initial sampling rate may be one sample every 4-5 seconds. However, certain contextual determinations may cause the sampling rate to be increased to 30 samples per second (i.e., 30 frames per second (FPS)) or more. Other determinations may result in reducing the sampling rate to, for example, once every 5 minutes and/or suppressing samples altogether. Contextual determinations may result in sampling rates from zero (i.e., no sampling) to the highest rate feasible under the hardware and/or software constraints of the always-on camera. Additionally or alternatively, as described in more detail below, embodiments may provide for selectively triggering an always-on camera and/or selectively activating certain sensors (e.g., cameras, light sensors, motion detectors, microphones, etc.) in a multi-sensor system based on contextual determinations.

Light sensor(s) 1310 may include any of a variety of photo-sensitive sensors such as active light sensor(s), RGB sensor(s), ultra violet (UV) sensor(s), and the like. Such light sensor(s) 1310 typically consume(s) far less power than an always-on camera and may be used in determining the context of one or more of the mobile devices 1200. For example, one or more light sensors 1310 may be positioned to determine the light intensity to which an always-one camera is exposed. If detected light intensity is below a certain threshold, the contextual determination engine 1380 may determine that an always-on camera is in a pocket or purse or in a darkened room, in which case a sampling rate of the always-on camera may be reduced or suspended.

Some embodiments may have multiple cameras 1210 that may be utilized as an always-on camera. Where lighting conditions could vary by camera location, and one or more light sensors 1310 are positioned to correspond with each camera, the contextual determination engine 1380 may determine which of the multiple cameras 1210 to utilize as an always-on camera based on light intensity data from the light sensor(s) 1310.

Additionally or alternatively, the contextual determination engine 1380 may use motion/orientation detector(s) 1330, motion model(s) 1390, and/or light sensor(s) 1310 to determine the position of a mobile device and/or always-on camera position relative to a user (such as on a desk or in the user's hand, bag, shirt pocket, pant pocket, holster, etc.), and modulate a sampling rate of the always-on camera accordingly. For example, if the mobile device is detected in a pocket, bag, purse, or holster and/or is exposed to light below a certain threshold, the view to the always-on camera is likely obstructed, and the sampling rate of the always-on camera may be reduced. In a particular embodiment, the sampling rate of the always-on camera may be reduced to zero, suspending image capturing. In a scenario in which captured images of an always-on camera are used by a life-logging application to automatically collect a photo log of a user's life, this functionality could result in avoiding unnecessary image capture and provide significant power savings when the photos provide little or no useful information, such as during night time, when the always-on camera is in a pocket, bag, and so forth. The motion/orientation detector(s) 1330 and/or motion model(s) 1390 may also enable the contextual determination engine 1380 to determine a state of a user who is carrying and/or associated with one or more of the mobile devices 1200. Examples include walking, running, exercising, in transit, and other such activities that may involve detectable movement and/or orientation. Furthermore, the user state may impact how an always-on camera is modulated. For example, an always-on camera may be configured to increase a sampling rate where the user state is indicative of movement outdoors (e.g., where a user's environment is likely to frequently change). On the other hand, a user state indicative of a relatively inactive state indoors may cause the contextual determination engine 1380 to reduce the sampling frequency of an always-on camera.

A contextual determination engine 1380 may also utilize data from the microphone(s) 1320 to detect certain audio activity and direction. The data from the microphone(s) 1320 may be used to determine that a particular activity (e.g., a meeting or conversation) is taking place. The data from the microphone(s) 1320 may be used to modulate a sampling frequency of an always-on camera, increasing the sampling rate, for example, when sound is detected.

In a particular embodiment, a mobile device may utilize any of the multiple cameras 1210 as an always-on camera. Audio directionality derived from microphone data may be used to determine which direction a sound is coming from. A corresponding camera likely facing the direction of the sound may then be designated as the always-on camera to capture images based on the direction of audio activity. The images captured by a camera facing the direction of audio activity are also likely to include visual information regarding speaker identity, emotions of the speaker, expressions of the speaker, a visual scene corresponding to the audio activity, and the like. The microphone(s) 1320 may include one or more low-power microphone activity detectors to determine audio directionality.

Audio directionality and user state determination may be used in a scenario in which one or more of the mobile devices 1200 with multiple cameras 1210 is executing a life-logging application. In a meeting context, a user may place one or more of the mobile devices 1200 on a table, at which point the contextual determination engine 1380 may use the microphone(s) 1320 and/or other components to determine a user state (e.g., "in a meeting"), and leverage audio directionality information of the microphones(s) 1320 to determine which camera 1210 to sample from and/or how to modulate (e.g., increase or decrease) a camera's sampling rate, based on the user state. When a user is working in his or her office, the contextual determination engine may utilize audio data (e.g., using audio environment clustering and/or other audio analysis techniques) to determine this user state (e.g., "working in office"), and reduce the sampling rate or turn off an always-on camera, based on the user state, until a change in audio ambience is detected.

The contextual determination engine 1380 may also use data from the motion/orientation detector(s) 1330 to determine contextual information, such as an activity in which the user may be engaged (e.g., walking, running, in transit, etc.). Data from the motion/orientation detector(s) 1330 may be compared against motion model(s) 1390, which may model different activities and/or other states of a user, to make the determination. If, for example, sensed motion is within a threshold likeness of modeled motion of a certain activity (i.e., the sensed motion is similar to the modeled motion within a threshold), the contextual determination engine 1380 may determine that the user is engaged in that activity. In some embodiments, data may be processed by a classifier, such as an absolute motion classifier or a relative or full motion classifier, or the data may be processed by a pedometer module or function.

The contextual determination engine 1380 may modulate the sampling rate of an always-on camera based on a speed, motion, and/or determined context of a user (e.g., a user state) and/or mobile device 1200. For example, if the contextual determination engine 1380 determines that a user is engaged in certain activities that involve a relatively high amount of movement, such as running or jumping, the contextual determination engine 1380 may adjust the sampling rate of an always-on camera accordingly. For example, in response to detecting user movements, the contextual determination engine 1380 may reduce or suspend sampling from the always-on camera.

Similarly, the contextual determination engine 1380 may determine that a user is traveling at a certain speed by estimating the speed from the motion/orientation detector(s) 1330 and/or from the location information (which can be determined using, for example, the satellite positioning receiver(s) 1350, a wireless communication interface 1340 capable of providing positioning and/or speed information, and the like). If the speed is above a certain threshold, the contextual determination engine 1380 may reduce or suspend sampling from the always-on camera to reduce the likelihood of capturing blurred images. Additionally or alternatively, speed may be used in a determination of a user state, which may then be used to determine how sampling of the always-on camera may be modulated.

The contextual determination engine 1380 may also use orientation information from the motion/orientation detector(s) 1330 to determine whether to modulate the sampling rate of an always-on camera and/or designate a camera for always-on functionality based on sensed orientation and/or motion when combined with one or more other components. For example, the contextual determination engine 1380 may suppress image capture of an always-on camera if the previous image taken by the always-on camera is determined to be uninformative for a certain use-case (e.g., pointing towards the sky or ceiling), and one or more of the mobile devices 1200 and/or the always-on camera has been at absolute rest since the time of capturing the previous image. Geo-fencing and place of relevance (POR)-based triggers may also be used in contextual determinations that may impact the sampling rate of an always-on camera.

Figure 14:
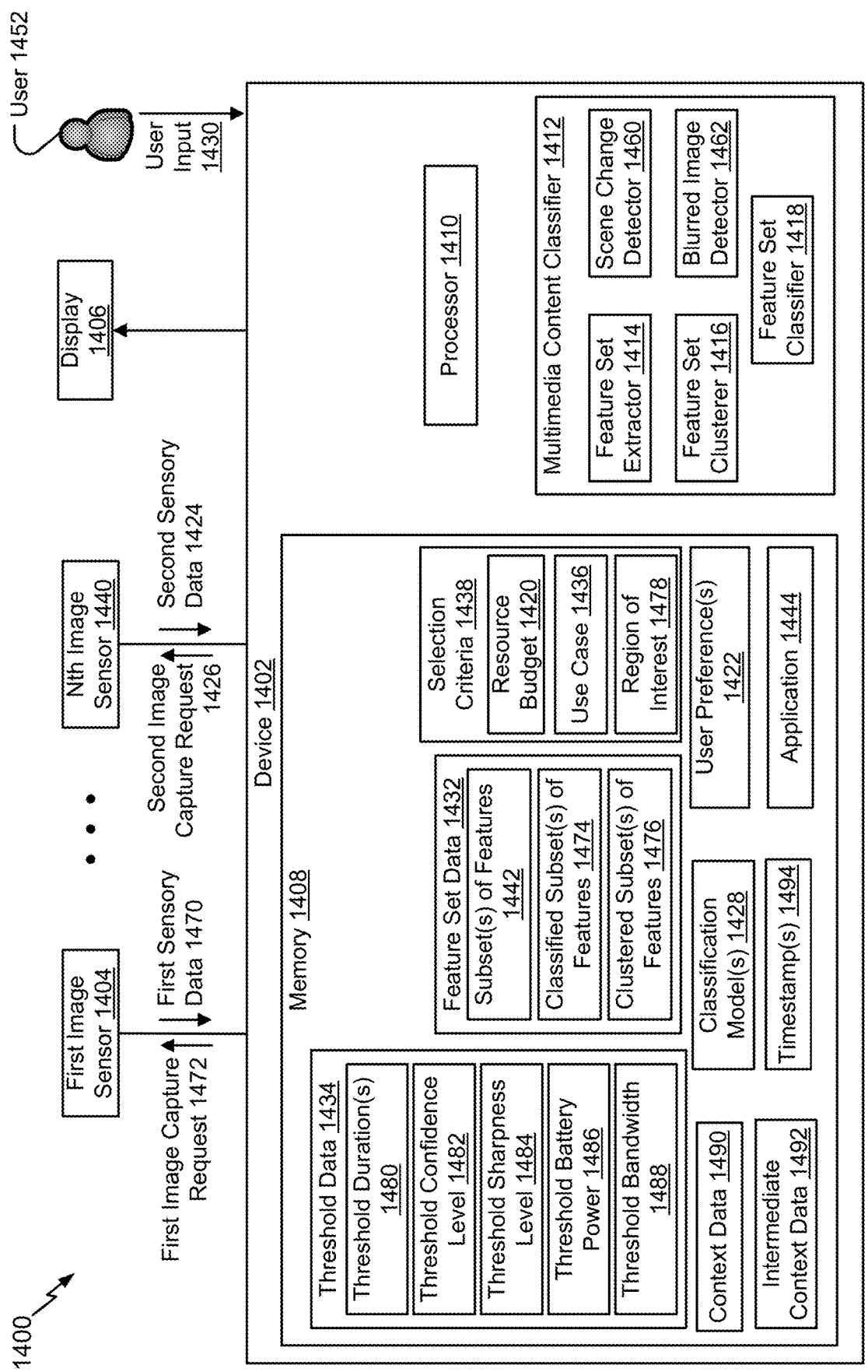
FIG. 14 is a block diagram of a particular illustrative embodiment of a system to identify a context of an image.

Referring to FIG. 14, a particular illustrative embodiment of a system operable to identify a context of an image is disclosed and generally designated 1400. The system 1400 may include a device 1402. The device 1402 may include a processor 1410, a multimedia content classifier 1412, and a memory 1408. The multimedia content classifier 1412 may include a feature set extractor 1414, a feature set clusterer 1416, a feature set classifier 1418, a scene change detector 1460, a blurred image detector 1462, or any combination thereof. In a particular embodiment, one or more components of the multimedia content classifier 1412 may be part of or integrated into the first processing device 304, the statistics processing device 108, the second processing device 310 of FIG. 3, the change detection circuit 414, the application processor 418 of FIG. 4, the selection circuit 506, the application processor 518, the signal analyzer 512, the change detection circuit 514 of FIG. 5, the one or more additional processors 622 of FIG. 6, the second application processor 706, the M$^{th}$ application processor 708, the object detector 850, the object identifier 852, the activity classifier 854, the user interface 856, the activation analyzer 814, the deactivation analyzer 816, the system controller 806 of FIG. 8, the VFE-Lite 904, the LPCVSS 906, the LPASS 908, the APSS 910, the one or more other processors 912 of FIG. 9, the contextual determination engine 1380 of FIG. 13, or a combination thereof.

The memory 1408 may include threshold data 1434, selection criteria 1438, classification model(s) 1428, user preference(s) 1422, timestamp(s) 1494, feature set data 1432, context data 1490, intermediate context data 1492, an application 1444, or any combination thereof. In a particular embodiment, at least a portion of the memory 1408 may correspond to the memory 306 of FIG. 3, the memory 420 of FIG. 4, the memory 520 of FIG. 5, the DDR 914 of FIG. 9, or a combination thereof. As used herein, a "context" of an image may include information inferred or determined from the image and/or feature(s) extracted therefrom. For example, a context of an image may include a specific location, a specific person, a specific object, a specific activity, or any combination thereof. To illustrate, a context of an image of a particular person attending a meeting in a particular conference room may include the particular person (e.g., "John"), the activity of attending the meeting (e.g., "attended group meeting"), the particular conference room (e.g., "Room 2.134"), objects in the conference room (e.g., "whiteboard"), or any combination thereof.

The threshold data 1434 may include one or more threshold duration(s) 1480, a threshold confidence level 1482, a threshold sharpness level 1484, a threshold battery power 1486, a threshold bandwidth 1488, or any combination thereof. The selection criteria 1438 may include a resource budget 1420 (e.g., a threshold number of homogeneous or heterogeneous processor cores to be activated), a use case 1436, a region of interest 1478, or any combination thereof. In a particular embodiment, the device 1402 may receive one or more values corresponding to the threshold data 1434, the selection criteria 1438, or both, via user input 1430 from a user 1452. In a particular embodiment, the multimedia content classifier 1412 may generate one or more values corresponding to the threshold data 1434 based on corresponding values associated with one or more images. For example, the multimedia content classifier 1412 may determine the threshold sharpness level 1484 based on an average sharpness of a number of previously processed and/or captured images.

The device 1402 may be coupled to, or in communication with, one or more image sensors and a display 1406. The one or more image sensors may include a first image sensor 1404, an Nth image sensor 1440, or a combination of image sensors. In a particular embodiment, the device 1402 may be a mobile device that is configured to capture an image via the first image sensor 1404, the Nth image sensor 1440, or from a combination of image sensors. In a particular embodiment, the first image sensor 1404, the Nth image sensor 1440, or one or more other sensors, may be integrated into a camera of the mobile device. The one or more image sensors may correspond to the camera 302 of FIG. 3, the sensor 402 of FIG. 4, the sensor 502 of FIG. 5, the sensor 602 of FIG. 6, the sensors 802 of FIG. 8, the cameras 1210 of FIG. 12, the one or more other sensors 1360, or a combination thereof.

The device 1402 may include fewer or more components than illustrated in FIG. 14. For example, the device 1402 may include more than one processor, may include more than one memory, or both. The device 1402 may include a networked or distributed computing system. In a particular illustrative embodiment, the device 1402 may include a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof. Such devices may include a user interface, e.g., a touch screen, voice recognition capability, or other user interface capabilities.

During operation, the device 1402 may receive sensory data (e.g., first sensory data 1470) from an image sensor (e.g., the first image sensor 1404). The first sensory data 1470 may be related to an image. For example, the first image sensor 1404 may capture the image and may send the first sensory data 1470 related to the image to the device 1402. The first image sensor 1404 may generate the first sensory data 1470 based on various triggers, as further described with reference to FIGS. 19 and 27. For example, the first image sensor 1404 may periodically capture images at a data sampling interval (e.g., once every minute) and may periodically send the sensory data (e.g., the first sensory data 1470) related to the images to the device 1402. The first image sensor 1404 may capture the images based on a determination that a threshold image capture duration (e.g., the threshold duration(s) 1480) is satisfied. For example, the threshold image capture duration may indicate a particular data sampling interval (e.g., 1 minute) between capturing images. The threshold image capture duration may be satisfied when the particular data sampling interval elapses after capturing a previous image.

As another example, the first image sensor 1404 may generate the first sensory data 370 based on a determination that an available bandwidth at the device 1402 satisfies a threshold bandwidth (e.g., the threshold bandwidth 1488), that an available battery power satisfies a threshold battery power (e.g., the threshold battery power 1486), or both. As a further example, the first image sensor 1404 may generate the first sensory data 1470 based on a user preference (e.g., the user preference(s) 1422), based on user input (e.g., the user input 1430), or any combination thereof.

As another example, the first image sensor 1404 may generate the first sensory data 1470 based on an image capture request (e.g., a first image capture request 1472) received from the device 1402. To illustrate, in response to determining that one or more of the various triggers is activated, the multimedia content classifier 1412 may send the first image capture request 1472 to the first image sensor 1404. The multimedia content classifier 1412 may receive the first sensory data 1470 from the first image sensor 1404.

The feature set extractor 1414 may extract a first subset of features (e.g., subset(s) of features 1442) of the image from the first sensory data 1470. For example, the feature set extractor 1414 may compute one or more visual descriptors of the image. In a particular embodiment, the feature set extractor 1414 may extract the first subset of features of the image based on determining that an extraction criterion is satisfied. For example, the extraction criterion may be satisfied if the first sensory data 1470 indicates a change in the image relative to a previous image. To illustrate, the extraction criterion may be satisfied if a difference between first image statistics corresponding to the first sensory data 1470 and second image statistics corresponding to the previous image satisfy a change threshold, as described herein. It will be appreciated that refraining from extracting the first subset of features based on determining that the first sensory data 1470 does not satisfy the extraction criterion may conserve resources of the device 1402. For example, the image may be similar to the previous image and may be disregarded (e.g., processing of the image may be skipped) and the resources of the device 1402 may be used to process a next image. In a particular embodiment, the memory 1408 may be external to the multimedia content classifier 1412, the memory 1408 may store the first sensory data 1470, and extracting the first subset of features may include accessing the memory 1408.

In a particular embodiment, the feature set extractor 1414 may select the first subset of features based on a selection criteria (e.g., the selection criteria 1438), as further described with reference to FIGS. 18-21. The selection criteria 1438 may include a resource budget (e.g., the resource budget 1420), a use case (e.g., the use case 1436), a region of interest (e.g., the region of interest 1478), or any combination thereof. In a particular embodiment, the feature set extractor 1414 may extract fewer than all features that the feature set extractor 1414 is capable of extracting from the first sensory data 1470. Each extracted feature may have or be associated with a corresponding confidence level. Alternatively, or in addition, an aggregate confidence level may be determined (e.g., by averaging) from multiple extracted features. If the multimedia content classifier 1412 determines, based on an analysis criterion (e.g., confidence level(s)) associated with the first subset of features, that more features are to be extracted, the feature set extractor 1414 may subsequently extract more features. Various conditions may trigger extraction of additional features. In one embodiment, additional features are extracted if a confidence level of any extracted feature is less than a threshold confidence level. In another embodiment, additional features are extracted if the aggregated confidence level is less than the threshold confidence level. Other conditions may also be used in determining whether additional features are to be extracted. It will be appreciated that initially extracting fewer features may conserve resources of the device 1402 because the multimedia content classifier 1412 may determine that more features are not to be extracted.

In a particular embodiment, the feature set extractor 1414 may be a part of or integrated into the second processing device 310. For example, the feature set extractor 1414 may extract the first subset of features based on an extraction criterion being satisfied. The extraction criterion may be based on the first sensory data 1470. For example, the first processing device 304 of FIG. 3 may generate first image statistics corresponding to the first frame 102 of FIG. 1 and may generate second image statistics corresponding to the second frame 104 of FIG. 1. In this embodiment, the first sensory data 1470 may correspond to the second frame 104.

The first image statistics and the second image statistics may be generated based on application-specific processing. The application-specific processing may include determining whether sensory data (e.g., the first sensory data 1470 and/or second sensory data corresponding to the first frame 102) indicates that a particular object (e.g., a traffic stop sign) is in a corresponding image, indicates that an alert event is triggered (e.g., a particular gesture is detected), indicates that an object of a particular color is in the image, or a combination thereof. The application-specific processing may include at least one of activity recognition, person recognition, object recognition, location recognition, or gesture recognition.

In a particular embodiment, the memory 1408 may store a mapping between various application processing types and corresponding types of statistics. For example, the particular application processing type corresponding to detecting the particular object (e.g., the traffic stop sign) may map to a particular statistics type corresponding to a color histogram of a particular color (e.g., red). The second processing device 310 may provide configuration data to the first processing device 304 indicating the particular statistic type based on the particular application processing type and the mapping. The first processing device 304 may generate the first image statistics and the second image statistics corresponding to the particular statistic type. For example, the first image statistics may include a first count of pixels of the particular color (e.g., red) in a first color histogram corresponding to the second frame 104 and the second image statistics may include a second count of pixels of the particular color (e.g., red) in a second color corresponding to the first frame 102.

The statistics processing device 108 of FIG. 1 may provide the first sensory data 1470 to the second processing device 310 in response to determining that the extraction criterion is satisfied. For example, the statistics processing device 108 may provide the first sensory data 1470 to the second processing device 310 (e.g., the feature set extractor 1414) in response to determining that a change amount between the first image statistics (e.g., the first count of pixels) and the second image statistics (e.g., the second count of pixels) satisfies a change threshold. In a particular embodiment, the extraction criterion may be satisfied when the first sensory data 1470 indicates a scene change. For example, the statistics processing device 108 may include the scene change detector 1460. The statistics processing device 108 may determine that the extraction criterion is satisfied based on the scene change detector 1460 determining that the first sensory data 1470 indicates a scene change, as further described with reference to FIG. 22. In a particular embodiment, the extraction criterion may be satisfied when the first sensory data 1470 indicates that a sharpness of the image satisfies a threshold sharpness level (e.g., the threshold sharpness level 1484 of the threshold data 1434), as further described with reference to FIG. 23. For example, the statistics processing device 108 may include the blurred image detector 1462 configured to determine whether the sharpness of the image satisfies the threshold sharpness level.

The statistics processing device 108 may refrain from providing the first sensory data 1470 to the feature set extractor 1414 in response to determining that the change amount does not satisfy the change threshold. The feature set extractor 1414 may extract the first subset of features in response to receiving the first sensory data 1470. Determining whether the extraction criterion is satisfied may user fewer resources of the device 1402 than extracting the first subset of features. It will be appreciated that initially determining whether the extraction criterion is satisfied may conserve resources of the device 1402 because the statistics processing device 108 may determine that the change amount between the first frame 102 and the second frame 104 is insufficient (e.g., is lower than the change threshold) to extract features of the second frame 104.

In an alternate embodiment, the feature set extractor 1414 may be a part of or integrated into the first processing device 304 of FIG. 3. For example, the feature set extractor 1414 at the first processing device 304 may extract the first subset of features from the first sensory data 1470. The first processing device 304 may determine the first image statistics based on the first subset of features. The first processing device 304 may provide the first image statistics to the statistics processing device 108 of FIG. 1. The statistics processing device 108 may determine whether the extraction criterion is satisfied based on the first image statistics and second image statistics of a second image, as described herein. The statistics processing device 108 may provide the first sensory data 1470 to the second processing device 310 of FIG. 3 based on determining that the extraction criterion is satisfied.

In yet another embodiment, the feature set extractor 1414 at the first processing device 304 may extract the first subset of features from the first sensory data 1470. The first processing device 304 may determine a confidence level associated with extracting the first subset of features and may provide the confidence level to the statistics processing device 108 of FIG. 1. The statistics processing device 108 may determine whether the extraction criterion is satisfied based on determining whether the confidence level satisfies the threshold confidence level 1482. The statistics processing device 108 may provide the first sensory data 1470, the first subset of features, or both, to the feature set clusterer 1416 based on determining that the confidence level satisfies the threshold confidence level 1482. The statistic processing device 108 may alternatively provide the first sensory data 1470 to the feature set extractor 1414 to extract additional features based on determining that the confidence level fails to satisfy the threshold confidence level 1482. In a particular embodiment, the second processing device 310 of FIG. 3 may include the feature set clusterer 1416 and may include the feature set extractor 1414. For example, each of the first processing device 304 and the second processing device 310 may include a version of the feature set extractor 1414.

In a particular embodiment, the features of the image may include a moving picture experts group 7 (MPEG-7) visual descriptor, a generalized search tree (GIST) descriptor, a census transform histogram (CENTRIST) visual descriptor, a bag-of-words descriptor, a visually locally aggregated descriptor, a spatial pyramid matching descriptor, or a combination thereof. The MPEG-7 visual descriptor may include one or more of a scalable color descriptor (SCD), a color structure descriptor (CSD), a group of frame (GOF) descriptor, a group of pictures (GOP) descriptor, a dominant color descriptor (DCD), a color layout descriptor (CLD), a texture browsing descriptor (TBD), a homogeneous texture descriptor (HTD), an edge histogram descriptor (EHD), a contour-based shape descriptor, a region-based shape descriptor, a camera motion descriptor (CMD), a motion trajectory descriptor (MTD), a parametric motion descriptor (PMD), or a motion activity descriptor (MAD). One or more of these descriptors may extract color, texture, motion, edge, shape, and/or scene information from the captured image. The feature set extractor may determine a confidence level associated with each of the first subset of features. For example, each MPEG-7 visual descriptor may have an associated confidence level. The feature set extractor 1414 may store the first subset of features (e.g., the subset(s) of features 342) in the memory 1408.

In a particular embodiment, when the first image sensor 1404 continuously captures images at a given data sampling interval (e.g., once every minute), sensory data (e.g., the first sensory data 1470) may remain substantially the same for many consecutive images. For example, the device 1402 may be a mobile device of the user 1452. The user 1452 may place the device 1402 on top of a desk at work with the first image sensor 1404 capturing substantially similar images (e.g., of a ceiling). In such an example, the feature set clusterer 1416 may generate a first clustered subset of features (e.g., clustered subset(s) of features 1476) by combining subsets of features of images captured over a particular duration. For example, the feature set clusterer 1416 may generate the first clustered subset of features (e.g., the clustered subset(s) of features 1476) by combining the first subset of features related to the image and another subset of features (e.g., the subset(s) of features 1442) related to a second image based on a first timestamp being within a threshold cluster duration (e.g., the threshold duration(s) 1480) of a second timestamp. The first timestamp (e.g., the timestamp(s) 1494) may be associated with the image and the second timestamp (e.g., the timestamp(s) 1494) may be associated with the second image. For example, the first timestamp may indicate when the first image sensor 1404 captured the image or when the device 1402 received the first sensory data 1470. Similarly, the second timestamp may indicate when the first image sensor 1404 captured the second image or when the device 1402 received sensory data related to the second image. The clustered subset(s) of features 1476 may thus represent temporally clustered common features (e.g., features of the ceiling during the time the user sat at his/her desk).

The feature set clusterer 1416 may generate the first clustered subset of features (e.g., clustered subset(s) of features 1476) by combining the first subset of features (e.g., the edge histogram descriptor, a census transform, or gabor filtering results) of the image and another subset of features (e.g., a second edge histogram descriptor, a census transform, or gabor filtering results) of the second image based on the first timestamp (e.g., 10:00 AM on Jul. 10, 2013) and the second timestamp (e.g., 10:03 AM on Jul. 10, 2013) being within the threshold cluster duration (e.g., five minutes). The first clustered subset of features may include the first subset of features, the other subset of features, or both. The first clustered subset of features may indicate a corresponding time duration (e.g., 10:00 AM to 10:04 AM on Jul. 10, 2013). Subsequent analysis of the first clustered subset of features may use fewer resources of the device 302 compared to analyzing the first subset of features and the second subset of features individually. The feature set clusterer 1416 may store the first clustered subset of features (e.g., the clustered subset(s) of features 1476) in the memory 1408.

The feature set classifier 1418 may generate a first classified subset of features (e.g., classified subset(s) of features 1474) by classifying the first clustered subset of features (e.g., the clustered subset(s) of features 1476) based on a first classification model (e.g., the classification model(s) 1428). The first classification model may indicate that the first clustered subset of features corresponds to a specific location, a specific person, a specific object, a specific activity, or any combination thereof. The first classification model may also indicate confidence levels associated with the correspondence. As a result, the feature set classifier 1418 may generate the first classified subset of features indicating that the first clustered subset of features corresponds to the location, the person, the object, the activity, or any combination thereof. The first classified subset of features may also indicate the associated confidence levels. For example, the first classified subset of features may indicate that the first clustered subset of features corresponds to a particular type of location (e.g., indoors) with a particular confidence level (e.g., low). In a particular embodiment, the first classified subset of features may also indicate an associated time duration. For example, the first classified subset of features may indicate a time duration (e.g., 10:00 AM-10:04 AM on Jul. 10, 2013) associated with the first clustered subset of features, the first timestamp, the second timestamp, or any combination thereof. To illustrate, the first classified subset of features may indicate with a "low" confidence level (e.g., a confidence level of 20% which is less than a "low" confidence level threshold of 25%) that the "context" is indoors during 10:00 AM-10:04 AM on Jul. 10, 2013. The feature set classifier 1418 may store the first classified subset of features (e.g., the classified subset(s) of features 1474) in the memory 308.

The multimedia content classifier 1412 may determine whether confidence levels of the first subset of features satisfy a threshold confidence level (e.g., the threshold confidence level 1482). In a particular embodiment, the multimedia content classifier 1412 may determine that the confidence levels of the first subset of features do not satisfy the threshold confidence level 1482 in response to determining that confidence levels of intermediate context data (e.g., intermediate context data 1492) do not satisfy the threshold confidence level 1482. The intermediate context data 1492 may correspond to a partial context of the image. For example, the intermediate context data 1492 may correspond to the first subset of features (e.g., the subset(s) of features 1442), the first clustered subset of features (e.g., the clustered subset(s) of features 1476), or the first classified subset of features (e.g., the classified subset(s) of features 1474).

For example, the first subset of features may include an edge histogram descriptor or a census transform of the image and associated confidence levels. The multimedia content classifier 1412 may determine that one or more of the associated confidence levels do not satisfy the threshold confidence level 1482. As a result, the multimedia content classifier 1412 may determine that the confidence levels of the first subset of features, and hence the intermediate context data 1492, do not satisfy the threshold confidence level 1482.

As another example, the feature set clusterer 1416 may determine that confidence levels associated with the first clustered subset of features (e.g., the clustered subset(s) of features 1476) do not satisfy the threshold confidence level 1482. To illustrate, the feature set clusterer 1416 may determine a particular (e.g., low) confidence level for features of the first clustered subset of features that are related to one and not both of the image and the second image. As another example, the feature set clusterer 1416 may determine the particular confidence level based on a function (e.g., average) of the confidence levels of the features associated with the first image and with the second image. A particular feature of the first subset of features may have a first confidence level (e.g., low). The particular feature of the other subset of features may have a second confidence level (e.g., high). The feature set clusterer 1416 may determine that the particular confidence level is an average (e.g., medium) of the first confidence level and the second confidence level. The multimedia content classifier 1412 may determine that the particular confidence level does not satisfy the threshold confidence level 1482. As a result, the multimedia content classifier 1412 may determine that the confidence levels associated with the first clustered subset of features, and hence the intermediate context data 1492, do not satisfy the threshold confidence level 1482.

As a further example, the multimedia content classifier 1412 may determine that confidence levels associated with the first classified subset of features (e.g., the classified subset(s) of features 1474) do not satisfy the threshold confidence level 1482. To illustrate, the first classified subset of features may indicate that the first clustered subset of features corresponds to the particular type of location (e.g., indoors) with a particular confidence level that does not satisfy the threshold confidence level 1482. As a result, the multimedia content classifier 1412 may determine that the confidence levels associated with the first classified subset of features, and hence the intermediate context data 1492, do not satisfy the threshold confidence level 1482.

In response to the determination that the confidence levels of the intermediate context data 1492 do not satisfy the threshold confidence level 1482, the feature set extractor 1414 may extract a second subset of features (e.g., the subset(s) of features 1442). For example, the feature set extractor 1414 may extract additional features (e.g., the second subset of features) in response to determining that confidence level(s) associated with the first subset of features, the first clustered subset of features, or the first classified subset of features do not satisfy the threshold confidence level 1482.

In a particular embodiment, the second subset of features (e.g., the subset(s) of features 1442) may be related to the image and may be extracted from the first sensory data 1470. For example, the feature set extractor 1414 may use histogram equalization to expand a grey level range of the image prior to re-computing the edge histogram descriptor of the image. The recomputed edge histogram descriptor (i.e., the second subset of features) may have higher associated confidence levels than the previously computed edge histogram descriptor. As another example, the feature set extractor 1414 may extract a second visual descriptor (i.e., the second subset of features) of the image that was not previously extracted (e.g., a color descriptor, a texture descriptor, a GIST descriptor, a CENTRIST descriptor, or any combination thereof). The second visual descriptor may have higher associated confidence levels than the previously extracted visual descriptor.

In a particular embodiment, the second subset of features (e.g., the subset(s) of features 1442) may be related to another image. For example, the multimedia content classifier 1412 may send a request (e.g., a second image capture request 1426) for second sensory data (e.g., second sensory data 1424) to another image sensor (e.g., the Nth image sensor 1440) in response to determining that the confidence levels of the first subset of features do not satisfy the threshold confidence level 1482. In response to the second image capture request 1426, the Nth image sensor 1440 may capture the other image and may send the second sensory data 1424 related to the other image to the device 1402.

In a particular embodiment, the image may correspond to a first setting of the first image sensor 1404 and the other image may correspond to a second setting of the Nth image sensor 1440. The first setting may include a zoom setting, a resolution setting, an angle setting, a location, or any combination thereof. The first setting may be distinct from the second setting. For example, the second setting may correspond to a higher zoom than the first setting, a higher resolution than the first setting, a different angle than the first setting, a different location than the first setting, or any combination thereof. Using the second subset of features (e.g., the subset(s) of features 1442) may increase one or more confidence levels associated with the first clustered subset of features, the first classified subset of features, or both.

In a particular embodiment, the first image sensor 1404 may be integrated into a first device, the Nth image sensor 1440 may be integrated into a second device, and the first device may be distinct from the second device. For example, the first image sensor 1404 may be integrated into a camera and the Nth image sensor 1440 may be integrated into another camera.

The feature set extractor 1414 may extract the second subset of features (e.g., the subset(s) of features 1442) from the second sensory data 1424. In a particular embodiment, the feature set extractor 1414 may extract the second subset of features based on determining that an extraction criterion is satisfied. For example, the multimedia content classifier 1412 (e.g., the first processing device 304 of FIG. 3) may determine first image statistics based on the first sensory data 1470 and may determine second image statistics based on the second sensory data 1424. The multimedia content classifier 1412 (e.g., the statistics processing device 108 of FIG. 1) may provide the second sensory data 1424 to the feature set extractor 1414 (e.g., at the second processing device 310) to extract the second subset of features based on determining that a change amount corresponding to a difference between the first image statistics and the second image statistics satisfies a change threshold. The multimedia content classifier 1412 (e.g., the statistics processing device 108 of FIG. 1) may discard the second sensory data 1424 (e.g., refrain from providing the second sensory data 1424 to the second processing device 310) based on determining that the change amount fails to satisfy the change threshold.

In a particular embodiment, the feature set extractor 1414 may select the second subset of features based on the selection criteria 1438, as further described with reference to FIGS. 18-21. The feature set extractor 1414 may store the second subset of features (e.g., the subset(s) of features 1442) in the memory 1408. Extracting the first subset of features may use fewer resources (e.g., memory, power, processor execution cycles) of the device 1402 than extracting the second subset of features.

The feature set clusterer 1416 may generate a second clustered subset of features (e.g., the clustered subset(s) of features 1476) by clustering the second subset of features (e.g., the subset(s) of features 1442) based on the first timestamp associated with the image, the second timestamp associated with the second image, another timestamp associated with the other image, or any combination thereof. For example, the second clustered subset of features may include the first clustered subset of features, the second subset of features, another subset of features of the second image corresponding to the second subset of features, or any combination thereof. In a particular embodiment, the second clustered subset of features may include a combination of the edge histogram descriptor of the image and the second edge histogram descriptor of the second image, a combination of a GIST descriptor of the first image and a second GIST descriptor of the second image, and a combination of a CENTRIST descriptor of the first image and a second CENTRIST descriptor of the second image.

The feature set classifier 1418 may generate context data (e.g., the context data 1490) indicating a context of the image based at least in part on the second subset of features. The context of the image may include a location, a person, an activity, or any combination thereof. For example, the feature set classifier 1418 may generate the context data 1490 by classifying the first clustered subset of features, the second clustered subset of features, or both, based on a second classification model (e.g., the classification model(s) 1428. For example, the second classification model may indicate that the first clustered subset of features, the second clustered subset of features, or both, correspond to a particular room of a particular building. The second classification model may indicate confidence levels associated with the correspondence. Based on the second classification model, the feature set classifier 1418 may generate the context data 1490 indicating that the context of the image corresponds to the particular room. The context data 1490 may indicate the associated confidence levels. For example, the context data 1490 may indicate a particular confidence level (e.g., high) associated with the context of the image corresponding to the particular room. In a particular embodiment, the context data 1490 may also indicate an associated time duration. For example, the context data 1490 may indicate that the device 1402 was in the particular room (e.g., where the user 1452 works) for a time duration (e.g., 10:00 AM-10:04 AM on Jul. 10, 2013). The time duration may be associated with a clustered subset of features (e.g., the first clustered subset of features, the second clustered subset of features, or both), the first timestamp, the second timestamp, the other timestamp, or any combination thereof.

Thus, in the foregoing example, whereas the first classified subset of features indicates a "low" confidence level (e.g., 25%) associated with the context "indoors," the context data 1490 indicates a higher confidence level (e.g., 85%) of a more refined context (e.g., "at work"). It will be appreciated that in certain use cases, the lower confidence level and the less refined context generated from the first subset of features may be sufficient. In such situations, resources may be conserved by outputting the less refined context and refraining from extracting the second subset of features. In situations where the lower confidence level and the less refined context, are insufficient, additional resources may be used to extract the second subset of features to generate the more refined context having the higher confidence level.

The multimedia content classifier 1412 may output (or make accessible) the context data 1490 to an application (e.g., the application 1444). In a particular embodiment, the application 1444 may include a context extraction engine, a context aware engine, or both. The application 1444 may include a computer vision application. For example, the application 1444 may include a life tagging application, a macro geo-fencing application, a micro geo-fencing application, a motion activity detection application, a text detection application, an object detection application, a gesture detection application, or any combination thereof. For example, the multimedia content classifier 1412 may output the context data 1490 to the life tagging application. Based on the context data 1490, the life tagging application may infer that the user 1452 was in the particular room (e.g., at work) during the time duration (e.g., 10:00 AM-10:04 AM on Jul. 10, 2013).

In a particular embodiment, the feature set extractor 1414 may extract the first subset of features (e.g., the subset(s) of features 1442) in response to a scene change detector (e.g., the scene change detector 1460) detecting that the first sensory data 1470 indicates a scene change, as further described with reference to FIG. 22. For example, features of an image that represents the same scene as a previously analyzed image may not be extracted, thereby conserving the resources of the device 1402.

In a particular embodiment, the feature set extractor 1414 may extract the first subset of features (e.g., the subset(s) of features 1442) in response to a blurred image detector (e.g., the blurred image detector 1462) determining that the first sensory data 1470 indicates that a sharpness of the image satisfies a threshold sharpness level (e.g., a threshold sharpness level 1484 of the threshold data 1434), as further described with reference to FIG. 23. For example, features of an image that is too blurred to satisfy the threshold sharpness level 1484 may not be useful in identifying a context of the image and may not be extracted for analysis, thereby conserving the resources of the device 1402.

Thus, the system 1400 may enable image context identification with an efficient use of the resources of the device 1402. For example, features of an image may be extracted when the image does not correspond to a previously extracted image, a blurred image, or both. Moreover, partial features of the image may be initially extracted with additional features extracted if the partial features do not satisfy a threshold confidence level. The device 1402 may be enabled to analyze a greater number of images while using fewer resources.

Figure 15:
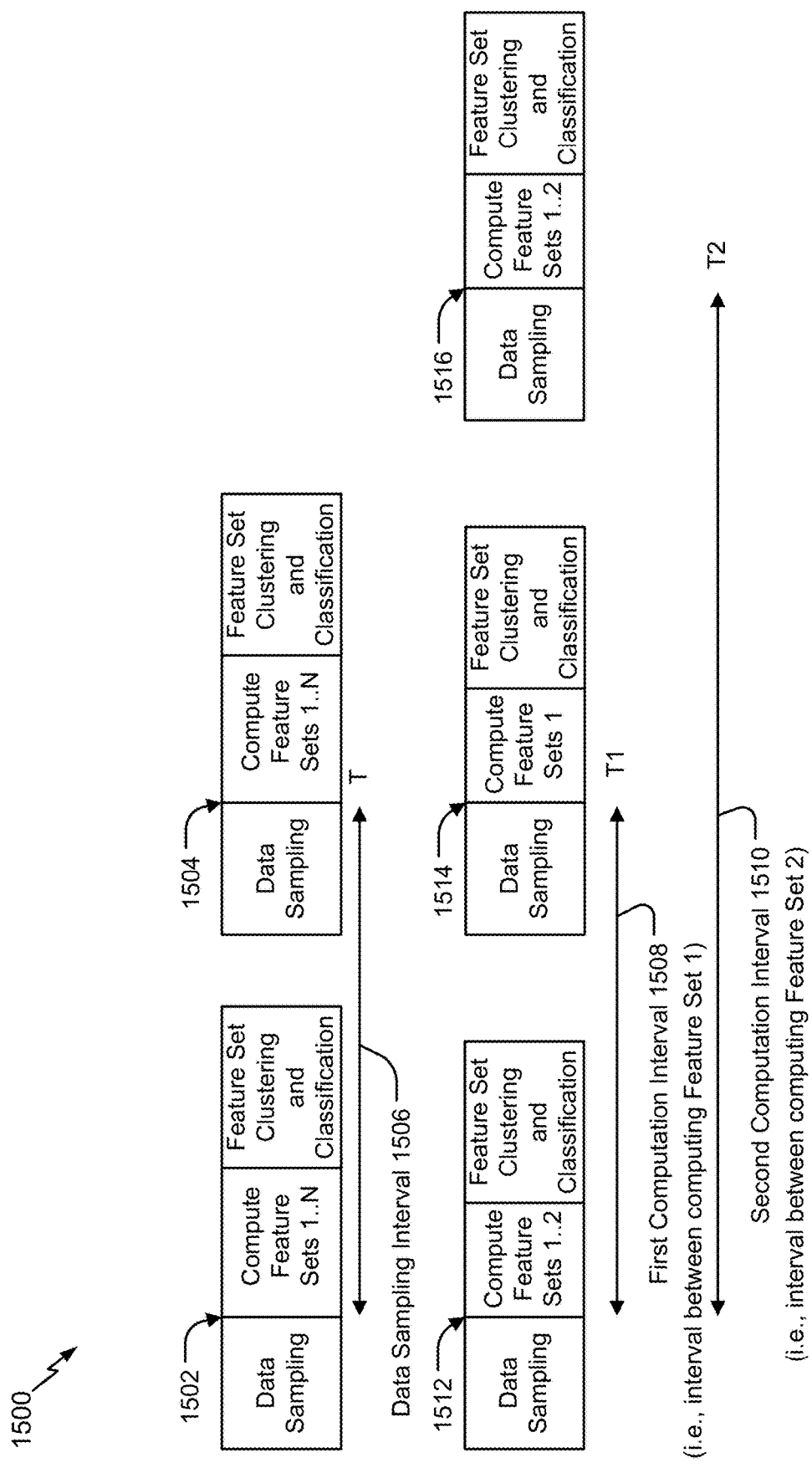
FIG. 15 illustrates computation intervals associated with extracting subsets of features of images.

Referring to FIG. 15, a particular illustrative embodiment of computation intervals associated with extracting subsets of features of images is disclosed and generally designated 1500.

The device 1402 of FIG. 14 may periodically receive sensory data (e.g., the first sensory data 1470) from an image sensor (e.g., the first image sensor 1404) at a data sampling interval (e.g., a data sampling interval 1506). A particular number (e.g., N=two) of features may be extractable by the feature set extractor 1414 from the sensory data. For example, the device 1402 may periodically receive the first sensory data 1470 at a time 1502 and at a time 1504 (i.e., at the data sampling interval 1506). As another example, the device 1402 may receive the first sensory data 1470 at a time 1512, at a time 1514, and at a time 1516. In a particular embodiment, the feature set extractor 1414 may extract all (e.g., N) features during each data sampling interval.

In another particular embodiment, the number of features extracted may be based on an extraction criterion, an analysis criterion (e.g., confidence levels), or both, associated with the sensory data (e.g., the extracted features). For example, the feature set extractor 1414 may extract a first subset of features and a second subset of features at the time 1512 in response to confidence levels associated with the first subset of features not satisfying a threshold confidence level (e.g., the threshold confidence level 1482), as further described in reference to FIG. 14. Hence, the feature set extractor 1414 may extract a first number (e.g., two) features at the time 1512. In a particular embodiment, the feature set extractor 1414 may extract the first subset of features and the second subset of features at the time 1512 based at least in part on determining that an extraction criterion is satisfied, as described with reference to FIG. 14.

Subsequently, the device 1402 may receive the first sensory data 1470 at time 1514. The feature set extractor 1414 may extract the first subset of features and may not extract the second subset of features at time 1514 in response to determining that the confidence levels associated with the first subset of features satisfy the threshold confidence level 1482, as further described with reference to FIG. 14. Hence, the feature set extractor 1414 may extract fewer (e.g., one) feature(s) at the time 1514. In a particular embodiment, the feature set extractor 1414 may extract the first subset of features at the time 1514 based at least in part on determining that an extraction criterion is satisfied, as described with reference to FIG. 14.

The device 1402 may subsequently receive the first sensory data 1470 at time 1516. The feature set extractor 1414 may extract the first subset of features and the second subset of features at time 1516 in response to confidence levels associated with the first subset of features not satisfying the threshold confidence level 1482. Hence, the feature set extractor 1414 may extract more (e.g., two) features at the time 1516 than at the time 1514. In a particular embodiment, the feature set extractor 1414 may extract the first subset of features and the second subset of features at the time 1516 based at least in part on determining that an extraction criterion is satisfied, as described with reference to FIG. 14.

Thus, as shown in FIG. 15, the first subset of features may be extracted at times 1512, 1514, and 1516 at a first computation interval 1508. The first computation interval 1508 may be approximately equal to the data sampling interval 1506. The second subset of features may be extracted at times 1512 and 1516 at a second computation interval 1510. The second computation interval 1510 may be greater than the data sampling interval 1506.

Thus, the feature set extractor 1414 may extract fewer features more frequently and may extract more features less frequently and as needed, thereby conserving resources of the device 1402.

Figure 16:
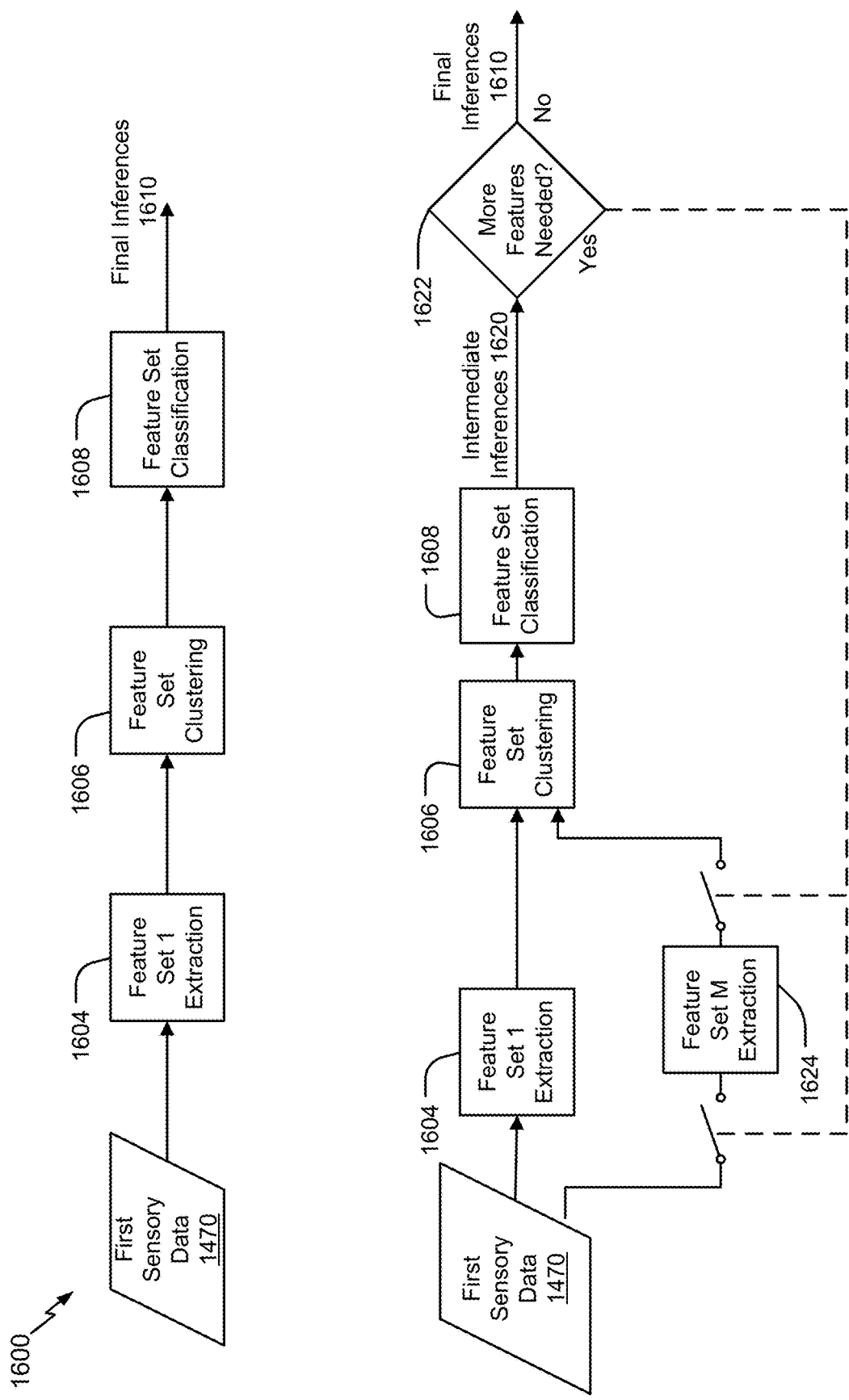
FIG. 16 is a diagram of another particular embodiment of a system to identify a context of an image.

Referring to FIG. 16, a particular illustrative embodiment of a system operable to identify a context of an image is disclosed and generally designated 1600. One or more of the operations of the system 1600 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

The system 1600 may include feature set 1 extraction, at 1604. The operation 504 may correspond to the feature set extractor 1414 of FIG. 14 extracting the first subset of features, as further described with reference to FIG. 14. The system 1600 may include feature set M extraction, at 1624. The operation 1624 may correspond to the feature set extractor 1414 of FIG. 14 extracting the second subset of features, as further described with reference to FIG. 14. The system 1600 may include feature set clustering, at 1606. The operation 1606 may correspond to operation of the feature set clusterer 1416 of FIG. 14. The system 1600 may include feature set classification, at 1608. The operation 1608 may correspond to the operation of the feature set classifier 1418 of FIG. 14.

The system 1600 may generate intermediate inferences 1620. The intermediate inferences 1620 may correspond to the classified subset(s) of features 1474 of FIG. 14. The system 1600 may generate final inferences 1610. The final inferences 1610 may correspond to the context data 1490 of FIG. 14.

In a particular embodiment, which and how many features are to be extracted may depend on device capability. For example, a device with a memory that does not satisfy a first memory threshold, a processor speed that does not satisfy a first processor speed threshold, or both, may correspond to a low-tier device. A device with a memory that satisfies the first memory threshold and does not satisfy a second memory threshold, a processor speed that satisfies the first processor speed threshold and does not satisfy a second processor speed threshold, or both, may correspond to a mid-tier device. A device that satisfies both memory thresholds, a processor speed that satisfies both speed thresholds, may correspond to a high-tier device.

In a particular embodiment, the system 1600 may refrain from determining whether more features are to be extracted for a low-tier device. In this embodiment, the first classified subset of features may be treated as final inferences 1610. Analyzing more features of the first sensory data 1470 may not be practical with the resource (e.g., memory or processor speed) limitations of the low-tier device. For example, analyzing the additional features of the first sensory data 1470 using the low-tier device may take longer than a threshold analysis duration.

The system 1600 may determine whether more features are needed, at 1622. For example, the system 1600 may determine whether a second subset of features is to be extracted based on a capability (e.g., processor speed, memory speed, or both) of the device 1402, extraction criterion, analysis criterion (e.g., a confidence level), or a combination thereof. For example, the system 1600 may determine whether additional features (e.g., a second subset of features) are to be extracted for a mid-tier device or a high-tier device based on confidence levels associated with the classified subset(s) of features 1474, as further described with reference to FIG. 14.

In a particular embodiment, the feature set extractor 1414 may select a particular number of features to be included in the second subset of features based on a capability of the device 1402. For example, the feature set extractor 1414 may extract fewer additional features for a mid-tier device than for a high-tier device.

Thus, more features may be extracted from sensory data at a higher-tier device than at a lower-tier device. Fewer resources of the lower-tier device may be used to generate image context data, while image context data with higher associated confidence levels may be generated for the higher-tier device.

Figure 17:
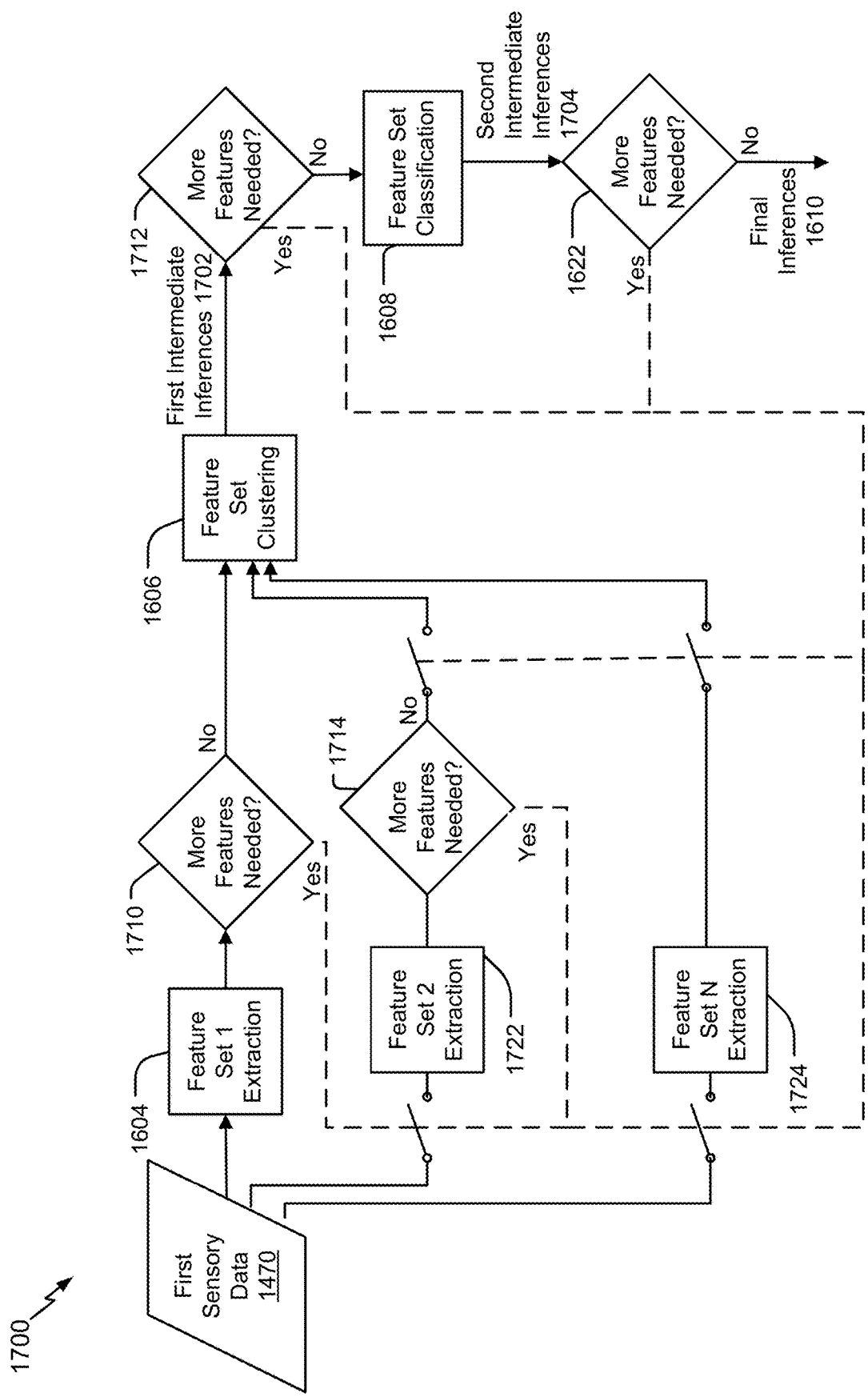
FIG. 17 is a diagram of another particular embodiment of a system to identify a context of an image.

Referring to FIG. 17, a particular illustrative embodiment of a system operable to identify a context of an image is disclosed and is generally designated 1700. One or more operations of the system 1700 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 1700 may operate in a similar manner as corresponding components of the system 1600 of FIG. 16. The system 1700 may generate first intermediate inferences 1702. The first intermediate inferences 1702 may correspond to the clustered subset(s) of features 1476 of FIG. 14. The system 1700 may generate second intermediate inferences 1704. The second intermediate inferences 1704 may correspond to the classified subset(s) of features 1474 of FIG. 14.

The system 1700 may perform one or more feature extractions (e.g., feature set 1 extraction 1604, feature set 2 extraction 1722, feature set N extraction 1724, or any combination thereof). The system 1700 may perform feature set clustering 1606 and may perform feature set classification 1608.

Subsequent to performing each of the one or more feature set extractions (e.g., feature set 1 extraction 1604, feature set 2 extraction 1622, or feature set N extraction 1624), the feature set clustering 1606, and the feature set classification 1608, the system 1700 may determine whether more features are needed, e.g., at 1710, 1712, 1714, or 1622. For example, the multimedia content classifier 1412 may determine whether additional features are to be extracted based on an analysis criterion (e.g., a confidence level), an extraction criterion, or both, as further described with reference to FIG. 14.

Thus, the system 1700 may enable image context identification. Additional features may be extracted at various stages of the analysis (e.g., after extracting other features, after clustering, or after classification) until a threshold confidence level is achieved.

Figure 18:
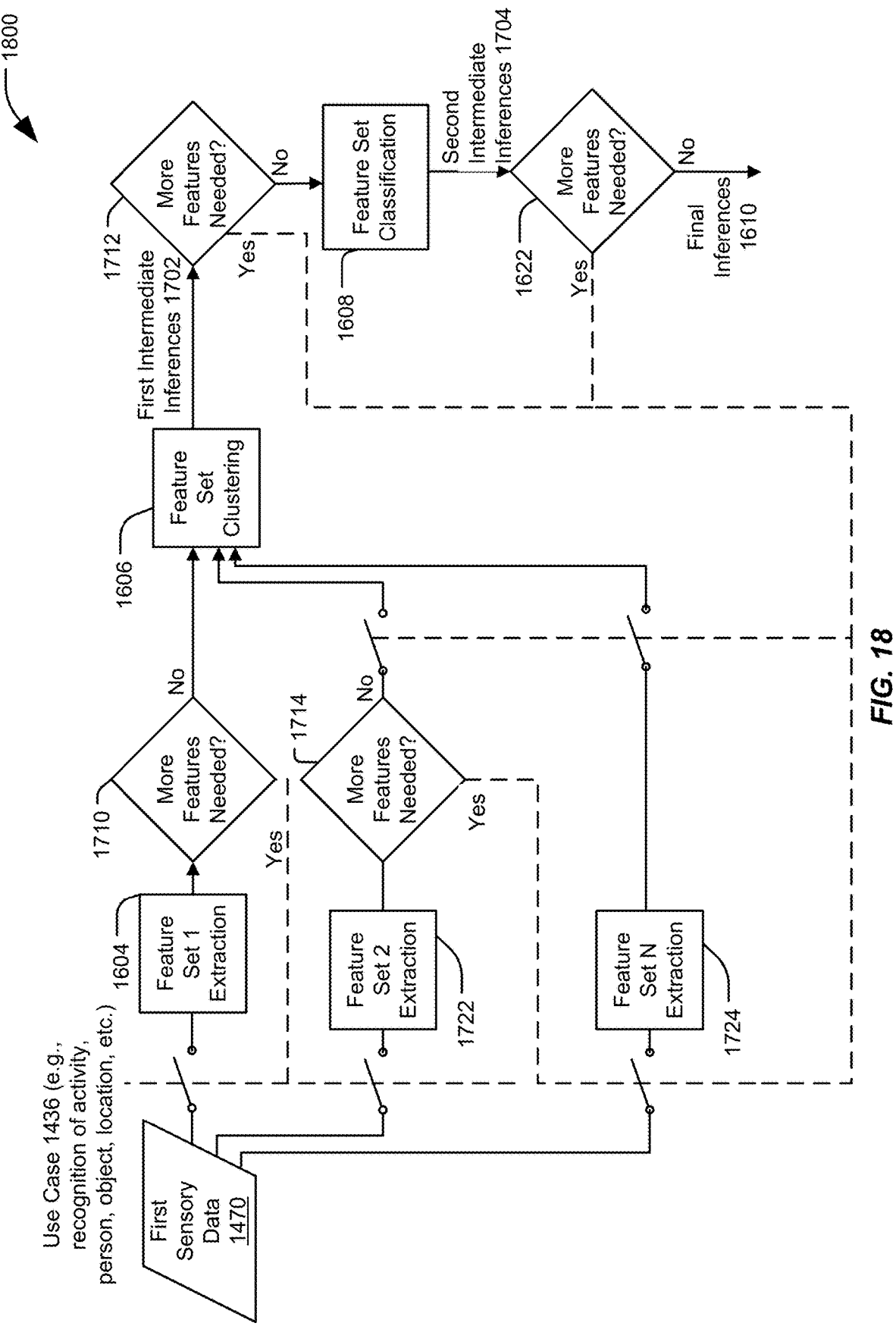
FIG. 18 is a diagram of another particular embodiment of a system to identify a context of an image.

Referring to FIG. 18, a particular illustrative embodiment of a system operable to identify a context of an image is disclosed and generally designated 1800. One or more operations of the system 1800 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 1800 may operate in a similar manner as corresponding components of the system 1700 of FIG. 17. The system 1800 may select a subset of features to extract from sensory data (e.g., the first sensory data 1470 of FIG. 14) based on a use case 1436. The use case 1436 may include activity recognition, person recognition, object recognition, location recognition, gesture recognition, emotion recognition, eye gaze detection, health monitoring (e.g., physical condition recognition), or any combination thereof. In a particular embodiment, the use case 1436 may correspond to application-specific processing. For example, the first processing device 304 of FIG. 3 may generate image statistics, as described with reference to FIG. 14, based on the use case 1436.

An example of activities that may be recognized includes watching television, playing a game, reading, writing, looking at screen, giving a presentation, in a meeting, working alone, meeting people, eating, shopping, cooking, commuting, etc. An example of persons that may be recognized includes a particular individual (e.g., "John Smith"), a type of person (e.g., a police officer, a fire fighter, a pilot, a flight attendant, or a doctor), or any combination thereof.

An example of objects includes a street sign, a face, a hand, a finger, a thumb print, a toy, a key, a phone, a weapon, a car, a license plate, etc. An example of locations that may be recognized includes a particular building (e.g., the state capitol building of a particular state), a type of building (e.g., a museum, a school, a hospital, or a playground), or any combination thereof. An example of gestures that may be recognized includes looking in a particular direction, pointing in a particular direction, swiping in a particular direction, hand movement, eye movement, or any combination thereof.

In a particular embodiment, a classification model (e.g., the classification model(s) 1428) may indicate that at least a first subset of features is to be analyzed for the use case 1436. For example, the use case 1436 may correspond to determining whether the context of the image corresponds to a particular type of location (e.g., "indoors"). The classification model may indicate that at least a CENTRIST descriptor and a GIST descriptor may be analyzed to determine whether a context of an image corresponds to the particular location. Based on the use case 1436 and the classification model, the feature set extractor 1414 may extract the first subset of features (e.g., the GIST and the CENTRIST descriptors) of the image from the first sensory data 1470. In a particular embodiment, the feature set extractor 1414 may extract the first subset of features based on determining that an extraction criterion is satisfied, as described with reference to FIG. 14.

In a particular embodiment, the classification model may indicate that a second subset of features is to be analyzed for the same or different use case 1436. For example, the second subset of features may include a scale-invariant response map of a pre-trained generic object detector, such as an object bank descriptor. In a particular embodiment, the classification model may indicate that the first subset of features is highly recommended and that the second subset of features may be helpful in analyzing the use case 1436. In this embodiment, the feature set extractor 1414 may extract the second subset of features based on an analysis criterion, an extraction criterion, or both. For example, the feature set extractor 1414 may extract the second subset of features in response to determining that an extraction criterion is satisfied, that confidence level associated with extracting the first subset of features does not satisfy a threshold confidence level (e.g., the threshold confidence level 1482), or both, as further described with reference to FIG. 14.

Thus, a subset of features suitable for analyzing a particular use case may be extracted from the sensory data. As a result, the efficiency with which the image context is identified may increase. For example, the feature set extractor 1414 may determine that a particular set of features is highly recommended for analyzing a particular use case. Extracting all of the highly recommended features during an initial feature extraction may be more efficient than performing clustering and classification after extracting each highly recommended feature and then extracting a next highly recommended feature based on the associated confidence levels. As another example, the feature set extractor 1414 may refrain from extracting additional features that are known to be unhelpful in analyzing the particular use case 1436, thereby conserving resources of the device 1402.

Figure 19:
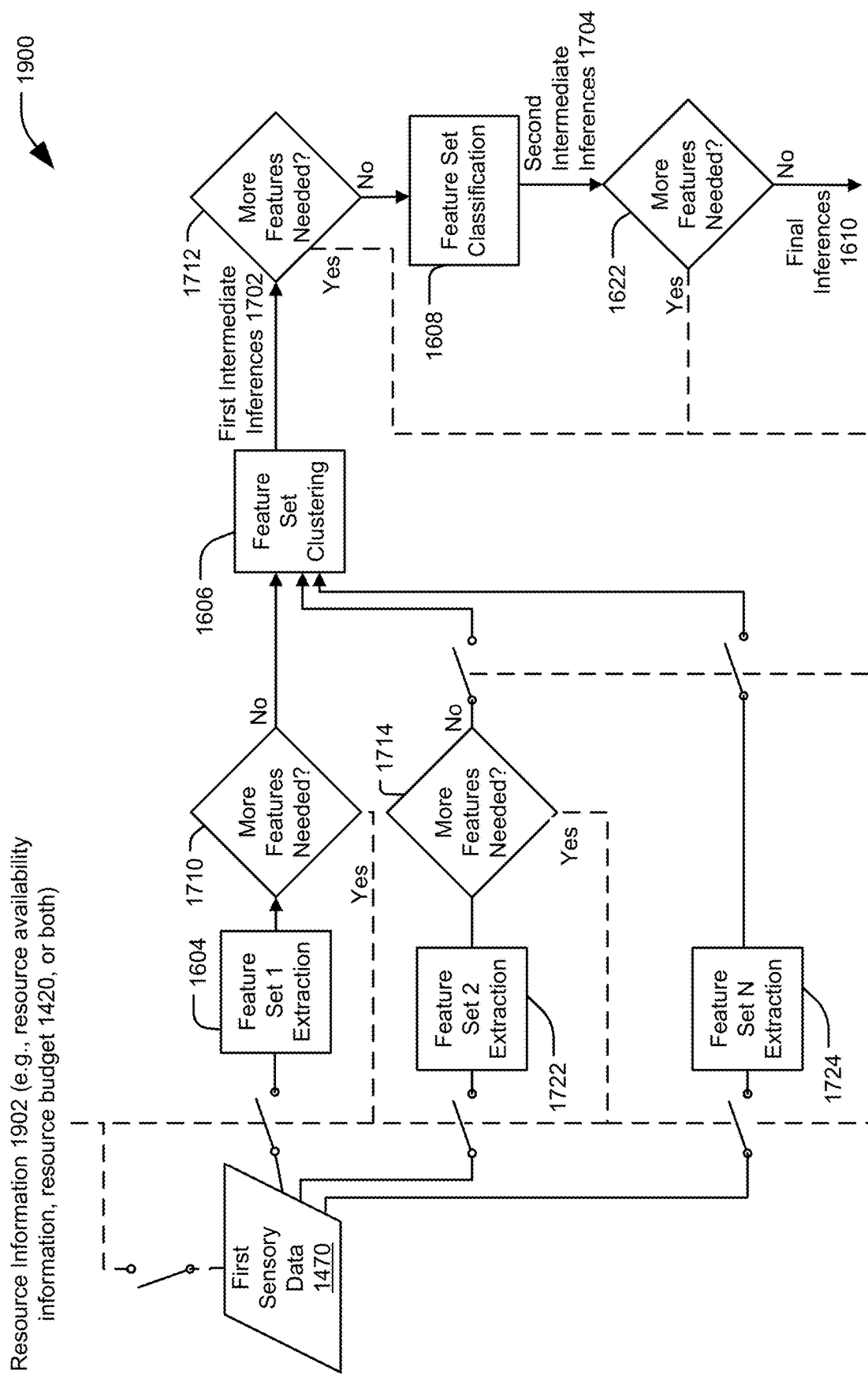
FIG. 19 is a diagram of another particular embodiment of a system to identify a context of an image.

Referring to FIG. 19, a particular illustrative embodiment of a system operable to identify a context of an image is disclosed and generally designated 1900. One or more operations of the system 1600 may be performed by the statistics processing device 108 of FIG. 1, the first processing device 304, the second processing device 310, the camera 302 of FIG. 3, the sensor 404, the change detection circuit 414, the application processor 418 of FIG. 4, the sensor 502, the selection circuit 506, the signal analyzer 512, the change detection circuit 514, the application processor 518 of FIG. 5, the sensor 602, the preprocessing circuit 604, the one or more additional processors 622, the second application processor 706, the $M^{th}$ application processor 708 of FIG. 7, the camera 842, the ambient light sensor 840, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the one or more cameras 1210 of FIG. 12, the contextual determination engine 1380 of FIG. 13, the device 1402 of FIG. 14, one or more image sensors of the device 1402 (e.g., the first image sensor 1404 or the Nth image sensor 1440), or any combination thereof.

Components of the system 1900 may operate in a similar manner as corresponding components of the system 1800 of FIG. 18. The system 1900 may select a subset of features to extract from sensory data (e.g., the first sensory data 1470 of FIG. 14) based on resource information (e.g., resource information 1902). The resource information 1902 may include resource availability information, a resource budget (e.g., the resource budget 1420 of FIG. 14), or both.

The resource budget 1420 may include a memory budget, a power budget, a number of instructions per time period (e.g., per second) budget, or any combination thereof. The resource availability information 1802 may include a memory availability, a power availability, a number of instructions per time period (e.g., per second) availability, or any combination thereof.

The resource availability information 1802 may differ from the resource budget 1420 in that the resource availability information 1802 may indicate what portion or amount of the resources of the device 1402 are available for use (e.g., by any application) and the resource budget 1420 may indicate what portion or amount of the resources of the device 1402 are permitted to be used by the multimedia content classifier 1412.

The resource availability information 1802 may indicate that a particular percentage (or a particular amount) of a resource is available. In a particular embodiment, the feature set extractor 1414 may not extract any features if the resource availability does not satisfy a threshold resource availability (e.g., a threshold battery power 1486, a threshold bandwidth 1488, a threshold memory, a threshold number of instructions per second, or any combination thereof).

In a particular embodiment, the multimedia content classifier 1412 may have access to a resource utilization estimate associated with an analysis of a particular subset of features. In this embodiment, the multimedia content classifier 1412 may select a particular subset of features when the resource availability is greater than the estimated resource utilization of analyzing the particular subset of features.

In a particular embodiment, the multimedia content classifier 1412 may determine whether to extract a subset of features (e.g., the first subset of features, the second subset of features, or both) from the first sensory data 1470 based on the resource budget 1420. For example, the feature set extractor 1414 may determine that a particular percentage (or a particular amount) of the resource budget 1420 is being utilized by the multimedia content classifier 1412. The feature set extractor 1414 may extract the subset of features when less than the entire resource budget 1420 is being utilized by the multimedia content classifier 1412.

In a particular embodiment, the resource budget 1420 may correspond to an extraction criterion. For example, the first processing device 304 of FIG. 3 may receive the resource budget 1420 and may generate first image statistics indicating the particular percentage (or the particular amount) of the resource budget 1420 being utilized (e.g., by the system 300). The statistics processing device 108 may provide the first sensory data 1470 to the second processing device 310 based on determining that less than the entire resource budget 1420 is being utilized.

In a particular embodiment, the multimedia content classifier 1412 may have access to an estimate of a resource utilization associated with an analysis (e.g., extraction, clustering, or classification) of a particular subset of features. For example, the estimated resource utilization may be generated by the multimedia content classifier 1412 based on a previous analysis of the particular subset of features for another image. In this embodiment, the multimedia content classifier 1412 may extract the particular subset of features when the remaining resource budget 1420 is more than the estimated resource utilization of analyzing the particular subset of features. In a particular embodiment, the first processing device 304 may generate first image statistics indicating the estimated resource utilization and the statistics processing device 108 may provide the first sensory data 1470 to the second processing device 310 based on determining that the remaining resource budget 1420 is more than the estimated resource utilization.

The resource budget 1420 may be based on user preferences (e.g., the user preference(s) 1422). For example, the user preference(s) 1422 may indicate that no background application is to take up more than a particular percentage (e.g., 20%) of resources.

In a particular embodiment, the system 1900 may also generate sensory data (e.g., the first sensory data 1470 of FIG. 14) based on the resource availability information, the resource budget 1420, or both. For example, the multimedia content classifier 1412 may send a request (e.g., the first image capture request 1472) to the first image sensor 1404 in response to determining that the resource availability information 1802 indicates that a particular resource is available, that less than the entire resource budget 1420 is being utilized by the multimedia content classifier 1412, or both.

Thus, the multimedia content classifier 1412 may perform image context identification based on current or future resource availability (e.g., the resource budget 1420, the resource availability information, or both). Sensory data may be generated when sufficient resources are available. Resources of the device 1402 may be conserved by the first image sensor 1404 refraining from generating the sensory data for analysis by the multimedia content classifier 1412 when sufficient resources are unavailable. Fewer resources of the device 1402 may be used for image context identification when the resource budget 1420 is more limited, while context data with higher associated confidence levels may be generated when the resource budget 1420 is larger. Furthermore, fewer resources of the device 1402 may be used for image context identification when limited resources are available, while context data with higher associated confidence levels may be generated when more resources are available. For example, if the resource availability information 1802 indicates that a remaining battery power of the device 1402 does not satisfy the threshold battery power 1486, the multimedia content classifier 1412 may analyze fewer images (e.g., may increase a data sampling interval), may extract fewer features from the first sensory data 1470, may refrain from extracting features from the first sensory data 1470, or a combination thereof.

Figure 20:
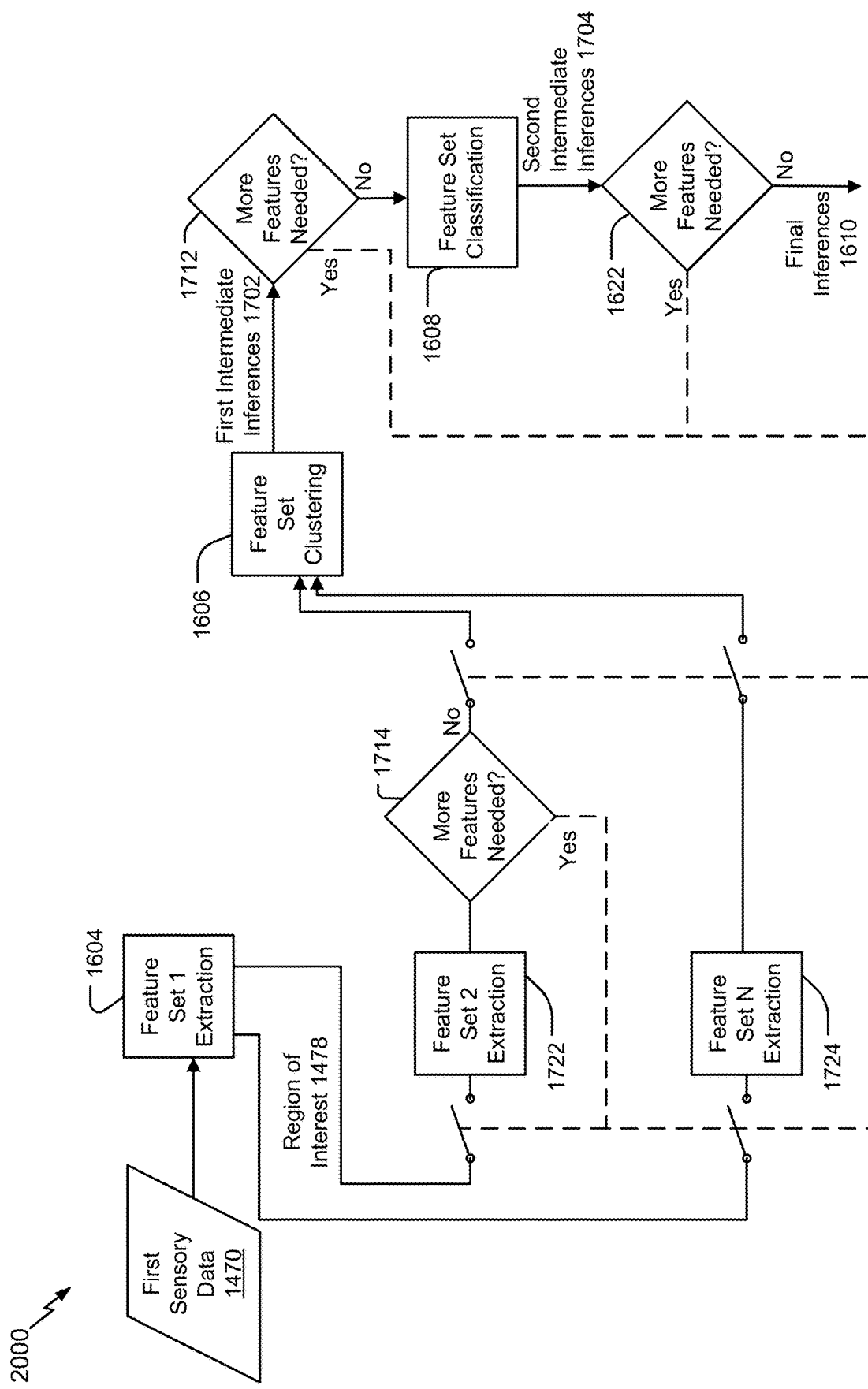
FIG. 20 is a diagram of another particular embodiment of a system to identify a context of an image.

Referring to FIG. 20, a diagram of another particular embodiment of a system operable to identify a context of an image is disclosed and generally designated 2000. One or more operations of the system 2000 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 2000 may operate in a similar manner as corresponding components of the system 1800 of FIG. 18. The system 2000 may extract or identify a region of interest (e.g., a region of interest 1478) during feature set 1 extraction 1604. The region of interest 1478 may correspond to a particular portion of the image. The region of interest 1478 may be determined based on a use case (e.g., the use case 1436 of FIG. 14), based on differences between the image and a prior image, or both. For example, the region of interest 1478 may correspond to faces when the use case 1436 includes person recognition and may correspond to objects when the use case 1436 includes activity recognition.

As another example, the use case 1436 may include object detection of a particular object (e.g., a car key). The user 1452 may have misplaced the car key and may request display of a first image that last included the car key. In a particular embodiment, the use case 1436 may correspond to application-specific processing. A first classification model (e.g., the classification model(s) 1428 of FIG. 14) may indicate particular values of a particular subset of features corresponding to the use case 1436. To illustrate, the first classification model may indicate particular values of an edge histogram descriptor corresponding to the particular object (e.g., the car key). The feature set extractor 1414 may extract the particular subset of features of the image from sensory data (e.g., the first sensory data 1470). The feature set extractor 1414 may determine that values of the particular subset of features of a particular portion of the image correspond to the particular values indicated by the first classification model. A portion of the first sensory data 1470 may correspond to the particular portion of the image. To illustrate, the particular portion of the image may include the particular object (e.g., the car key) or another object with a similar property (e.g., shape). The feature set extractor 1414 may generate the region of interest 1478 by copying the portion of the first sensory data 1470 corresponding to the particular portion of the image.

As another example, the feature set extractor 1414 may compare the first sensory data 1470 corresponding to the image to other sensory data corresponding to a prior image. For example, the image and the prior image may have been captured during a meeting. Based on the comparison, the feature set extractor 1414 may determine that a portion of the first sensory data 1470 is distinct from the other sensory data. The portion of the first sensory data 1470 may correspond to a particular portion of the image. For example, the particular portion of the image may correspond to a person that changed position during the meeting. The feature set extractor 1414 may generate the region of interest 1478 by copying the portion of the first sensory data 1470 corresponding to the particular portion of the image.

The system 2000 may perform feature extraction (e.g., feature set 2 extraction, feature set N extraction, or both) using the region of interest 1478. For example, the feature set extractor 1414 may extract a first subset of features from the region of interest 1478, as further described with reference to FIG. 14.

In a particular embodiment, the first processing device 304 of FIG. 3 may generate first image statistics indicating the region of interest 1478 or indicating an absence of the region of interest 1478 in the first sensory data 1470. The statistics processing device 108 may determine that an extraction criterion is satisfied based on determining that the first image statistics indicates the region of interest 1478 and may provide the portion of the first sensory data 1470 corresponding to the region of interest 1478 to the second processing device 310 based on determining that the extraction criterion is satisfied.

Thus, subsets of features of the region of interest 1478 of the image may be extracted, clustered, and classified to identify a context of the image. Analyzing (e.g., extracting additional features for) the region of interest 1478, as compared to the entire image, may conserve resources of the device 1402.

Figure 21:
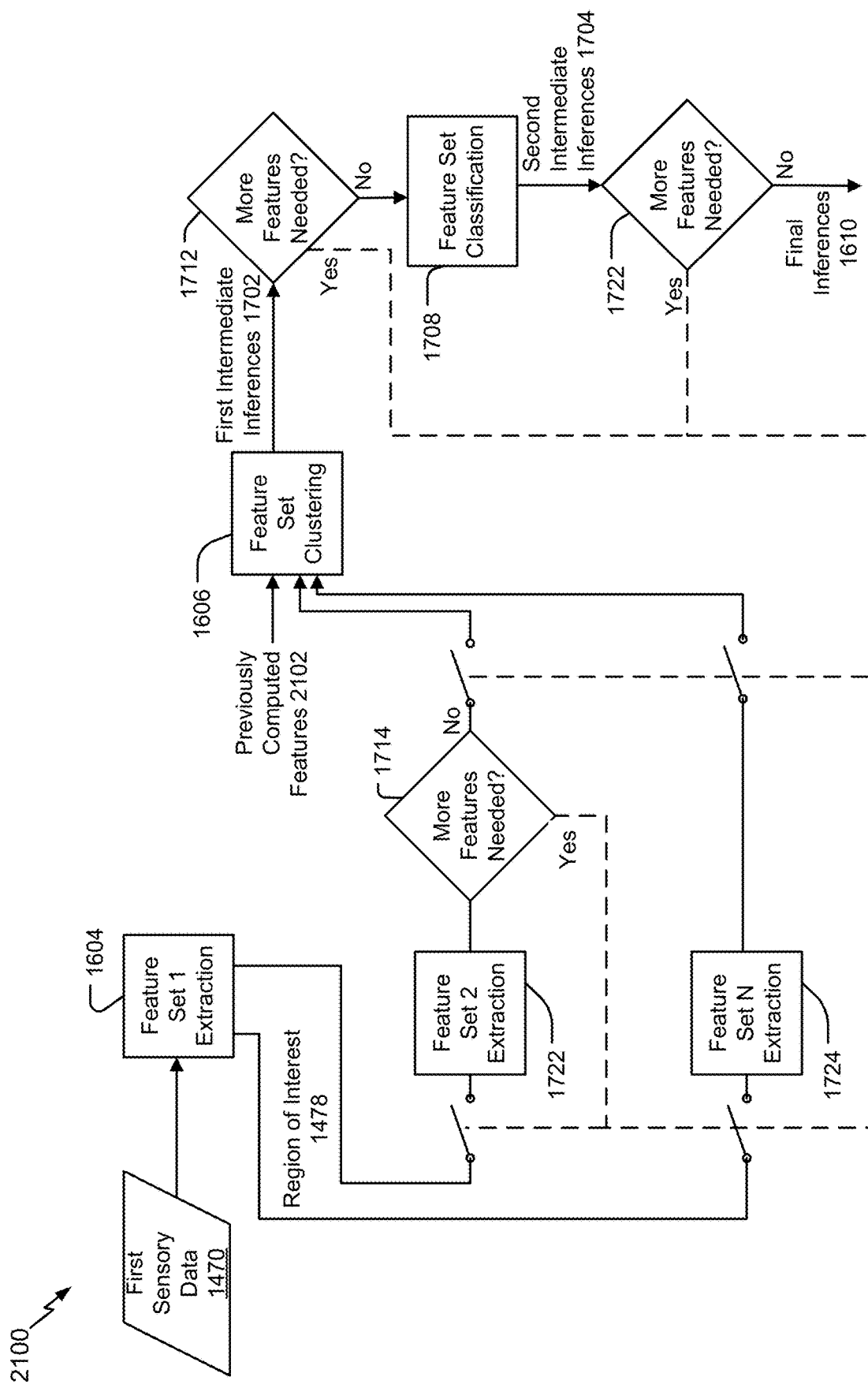
FIG. 21 is a diagram of another particular embodiment of a system to identify a context of an image.

Referring to FIG. 21, a particular illustrative embodiment of a system operable to identify a context of an image is disclosed and generally designated 2100. One or more operations of the system 2100 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 2100 may operate in a similar manner as corresponding components of the system 2000 of FIG. 20. The system 2100 may perform feature set clustering 1606 by combining a first subset of features (e.g., the subset(s) of features 1442) extracted from a region of interest (e.g., the region of interest 1478) with previously computed features (e.g., previously computed features 2102). For example, the feature set clusterer 1416 of FIG. 14 may cluster the first subset of features and the previously computed features 2102. To illustrate, the region of interest 1478 may correspond to a particular portion of the image that changed in comparison to a prior image and the previously computed features 2102 may correspond to a remaining portion of the image that remained unchanged in comparison to the prior image. For example, the previously computed features 2102 may have been previously extracted when analyzing the prior image. The feature set clusterer 1416 of FIG. 14 may cluster the first subset of features, the previously computed features 2102, and another subset of features of a second image, as further described with reference to FIG. 14.

Using the previously computed features 2102, as compared to extracting features corresponding to the entire image, may conserve resources of the device 1402. Moreover, clustering the previously computed features 2102 and the region of interest 1478 for classification may improve the classification analysis as compared to clustering the region of interest 1478 alone.

Figure 22:
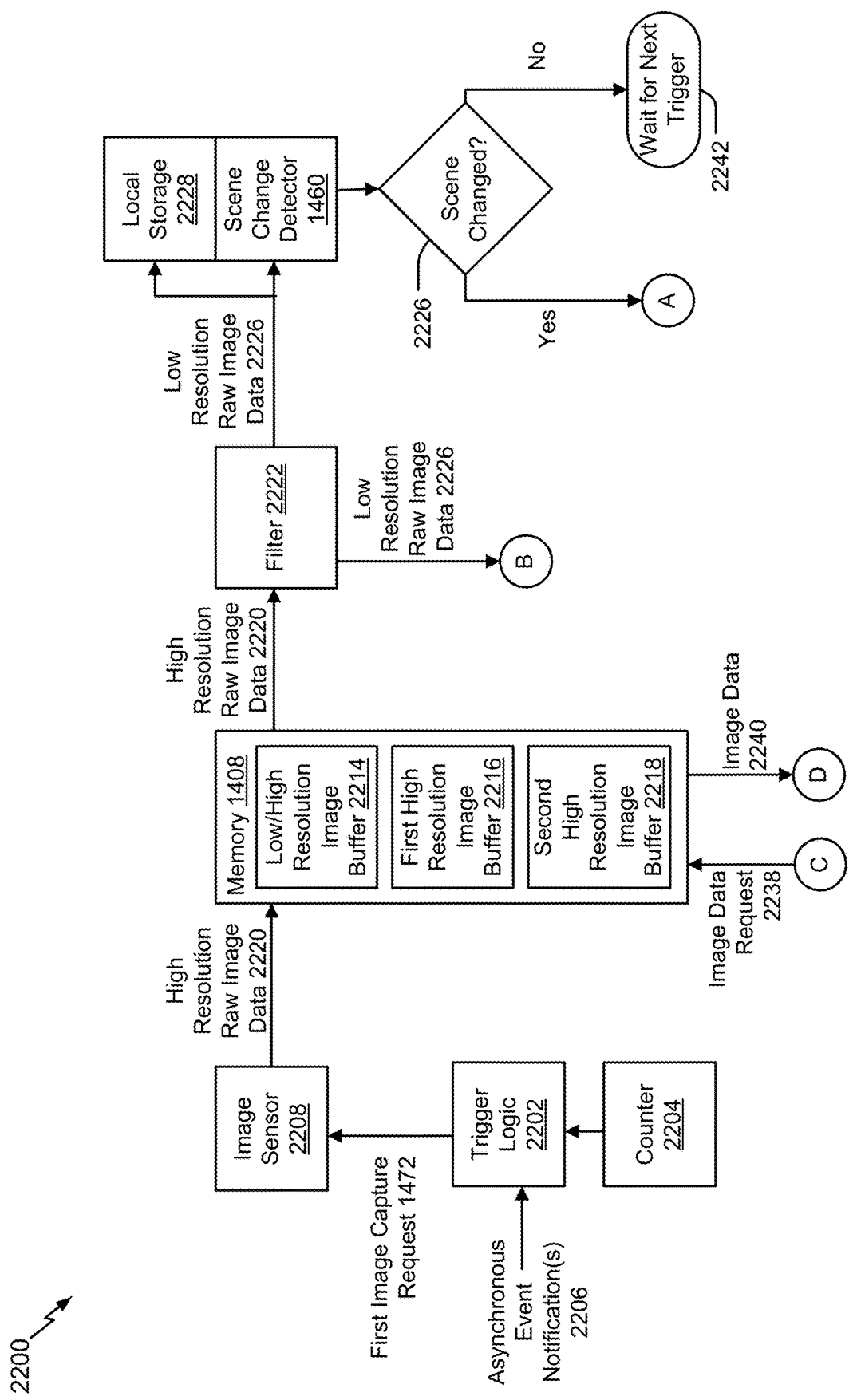
FIG. 22 is a diagram of another particular embodiment of a system to identify a context of an image.

Referring to FIG. 22, a diagram of a particular illustrative embodiment of a system operable to identify a context of an image is disclosed and generally designated 2200. One or more operations of the system 2200 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

The system 2200 may include an image sensor 2208 (e.g., one or more of the image sensors, such as the camera 302 of FIG. 3, the sensor 402 of FIG. 4, the sensor 502 of FIG. 5, the sensor 602 of FIG. 6, the camera 842 of FIG. 8, the one or more cameras 1210 of FIG. 12, the one or more other sensors 1360 of FIG. 13, the first image sensor 1404 or the Nth image sensor 1440 of FIG. 14) coupled to, or in communication with, the scene change detector 1460 via the memory 1408. In a particular embodiment, the memory 1408 may correspond to the memory 306 of FIG. 3.

The memory 1408 may include a low/high resolution image buffer 2214, a first high resolution image buffer 2216, a second high resolution image buffer 2218, or any combination thereof. Each of the image buffers may have a distinct memory size and may have a distinct memory access time. For example, the second high resolution image buffer 2218 may have a greater memory size and may have a greater memory access time than the first high resolution image buffer 2216 and the first high resolution image buffer 2216 may have a greater memory size and may have a greater memory access time than the low/high resolution image buffer 2214.

The memory 1408 may be coupled to, or in communication with the scene change detector 1460 via a filter 2222. The first image sensor 1404 may be coupled to, or in communication with, trigger logic 2202. The trigger logic 2202 may be coupled to, or in communication with, a counter 2204. The scene change detector 1460 may include, be coupled to, or be in communication with, a local storage 2228. In a particular embodiment, the system 2200 may correspond to an always-on power domain of the device 1402.

During operation, the trigger logic 2202 may send an image capture request (e.g., the first image capture request 1472) to the first image sensor 1404. In a particular embodiment, the trigger logic 2202 may send the first image capture request 1472 in response to one or more asynchronous event notifications (e.g., asynchronous event notification(s) 2206). The asynchronous event notification(s) 2206 may include a notification regarding resource availability, a user input, a user proximity, a radio frequency signal, an electro-magnetic signal, a mechanical signal, a micro-electromechanical system (MEMS) signal, other context information, or any combination thereof. For example, the asynchronous event notification(s) 2206 may include a notification regarding the resource availability. The trigger logic 2202 may send the first image capture request 1472 in response to the notification regarding the resource availability. To illustrate, the trigger logic 2202 may send the first image capture request 1472 in response to determining that the resource availability satisfies a resource budget (e.g., the resource budget 1420), a user preference (e.g., the user preference(s) 1422), or both.

As another example, the asynchronous event notification(s) 2206 may include a notification regarding the user input (e.g., the user input 1430). The user input 1430 may correspond to a user request to capture the image. The trigger logic 2202 may send the first image capture request 1472 in response to the notification regarding the user input 1430.

In a particular embodiment, the trigger logic 2202 may send the first image capture request 1472 in response to a value of a counter 2204. For example, the counter 2204 may indicate that a particular duration has elapsed since a previous image capture. The trigger logic 2202 may send the first image capture request 1472 to the first image sensor 1404 in response determining that the particular duration satisfies a threshold image capture duration (e.g., the threshold duration(s) 1480), as further described with reference to FIG. 14.

In response to receiving the first image capture request 1472, the first image sensor 1404 may send high resolution raw image data 2220 to the memory 1408. In a particular embodiment, the high resolution raw image data 2220 may correspond to the first sensory data 1470 of FIG. 14. The memory 1408 may store the high resolution raw image data 2220 in an image buffer (e.g., the low/high resolution image buffer 2214, the first high resolution image buffer 2216, the second high resolution image buffer 2218, or any combination thereof). The memory 1408 may send (or make accessible) the high resolution raw image data 2220 to the filter 2222.

The filter 2222 may generate low resolution raw image data 2226 from the high resolution raw image data 2220. For example, the low resolution raw image data 2226 may correspond to fewer image pixels than the high resolution raw image data 2220. In a particular embodiment, a value of the low resolution raw image data 2226 corresponding to a particular pixel may be generated from values of the high resolution raw image data 2220 corresponding to multiple (e.g., four) pixels. For example, the value corresponding to the particular pixel may be an average of the values corresponding to the multiple pixels.

The filter 2222 may send (or make accessible) the low resolution raw image data 2226 to the scene change detector 1460. The scene change detector 1460 may store the low resolution raw image data 2226 in the local storage 2228. In a particular embodiment, the filter 2222 may send (or make accessible) the low resolution raw image data 2226 to the local storage 2228. The scene change detector 1460 may compare the low resolution raw image data 2226 to other image data corresponding to a previously captured image. Based on the comparison, the scene change detector 1460 may determine whether the low resolution raw image data 2226 indicates a scene change, at 2226. For example, the scene change detector 1460 may divide the image and the previously captured image into blocks (e.g., 3×3 blocks). The scene change detector 1460 may determine a difference between a portion of the first sensory data 1470 (e.g., the low resolution raw image data 2226) associated with each block of the image with a portion of sensory data (e.g., the other image data) associated with a corresponding block of the previously captured image. For example, the scene change detector 1460 may determine a mean of the absolute difference between the portions of the image and the previously captured image. The scene change detector 1460 may compare the difference (e.g., the mean) to a threshold image difference to determine whether the first sensory data 1470 (e.g., the low resolution raw image data 2226) indicates a scene change.

In response to determining that the low resolution raw image data 2226 does not indicate a scene change, the system 2200 may wait for a next trigger, at 2242. For example, the multimedia content classifier 1412 of FIG. 14 may wait for the trigger logic 2202 to receive another asynchronous event notification 2206 or another value of the counter 2204.

In response to determining that the low resolution raw image data 2226 indicates a scene change, at 2226, the system 2200 may operate as further described with reference to FIG. 23. In a particular embodiment, the filter 2222 may be included in the first processing device 304 of FIG. 3 and the scene change detector 1460 may be included in the statistics processing device 108 of FIG. 1. For example, the low resolution raw image data 2226 may correspond to first image statistics. The scene change detector 1460 may determine that an extraction criterion is satisfied based on determining that the low resolution raw image data 2226 indicates the scene change.

In a particular embodiment, the memory 1408 may receive an image data request 2238, as further described with reference to FIG. 24. In response to the image data request 2238, the memory 1408 may output image data 2240, as further described with reference to FIG. 24. The image data 2240 may correspond to the high resolution raw image data 2220.

The filter 2222 may be used to generate low resolution image data when the first image sensor 1404 generates high resolution image data. The low resolution image data may be analyzed by the scene change detector 1460 to determine whether to continue with an analysis of the high resolution image data. Having the scene change detector 1460 analyze the low resolution image data, as compared to the high resolution image data, may conserve resources of the device 1402.

Figure 23:
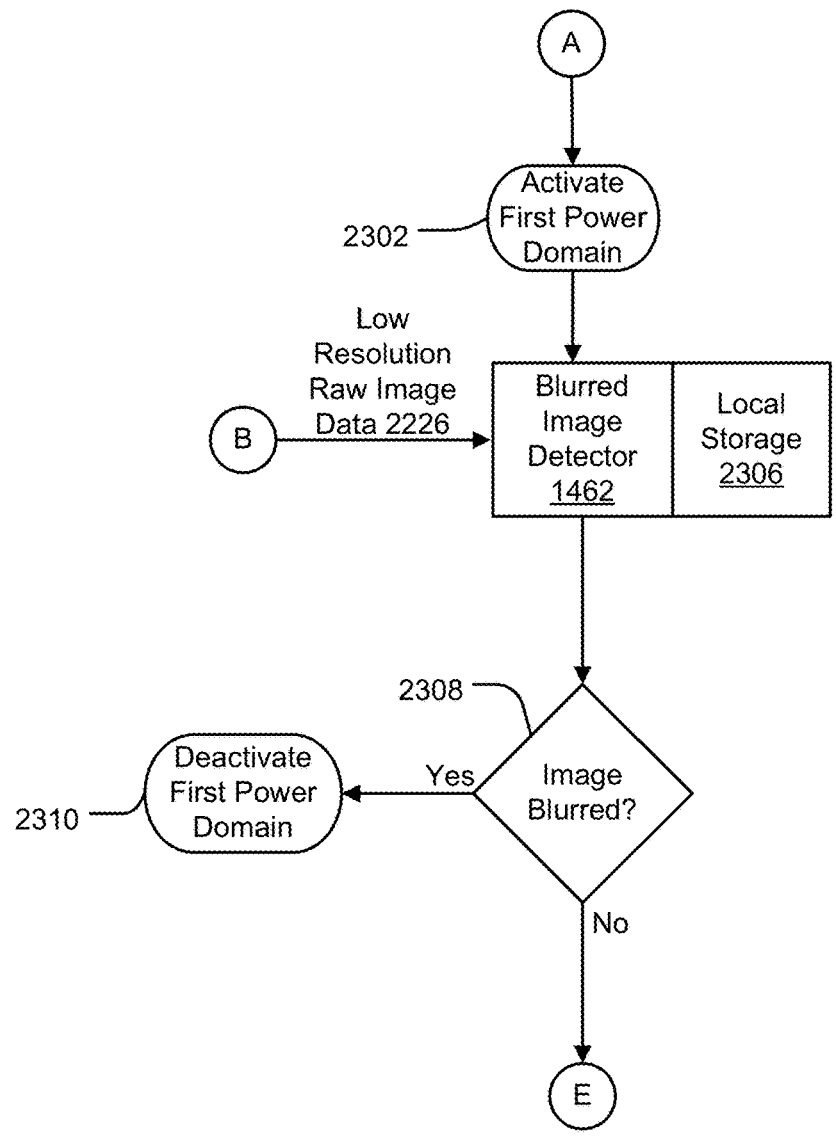
FIG. 23 is a diagram of another particular embodiment of a system to identify a context of an image and may be coupled to the system of FIG. 21.

Referring to FIG. 23, a particular illustrative embodiment of a system operable to identify a context of an image is disclosed and generally designated 2300. The system 2300 may be coupled to the system 2200 of FIG. 22. One or more operations of the system 2300 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

The system 2300 may include the blurred image detector 1462 of FIG. 14. The blurred image detector 1462 may include, be coupled to, or be in communication with, local storage 2306.

During operation, the system 2300 may activate a first power domain of the device 1402, at 2302. For example, the multimedia content classifier 1412 may activate the first power domain in response to the scene change detector 1460 determining that image data (e.g., the low resolution raw image data 2226) corresponds to a scene change, as further described with reference to FIG. 22. As another example, the statistics processing device 108 may activate a first power domain of the second processing device 310 based on determining that an extraction criterion is satisfied (e.g., a scene change is detected).

The blurred image detector 1462 may receive the low resolution raw image data 2226. For example, the blurred image detector 1462 may receive the low resolution raw image data 2226 from the filter 2222. The blurred image detector 1462 may store the low resolution raw image data 2226 in local storage 2306. The blurred image detector 1462 may determine whether the low resolution raw image data 2226 indicates that the image is blurred, at 2308. For example, the blurred image detector 1462 may determine whether the low resolution raw image data 2226 indicates that sharpness of the image satisfies a threshold sharpness level (e.g., the threshold sharpness level 1484). To illustrate, the blurred image detector 1462 may determine that the low resolution raw image data 2226 indicates a blurred image based on determining that the low resolution raw image data 2226 indicates that the sharpness of the image fails to satisfy the threshold sharpness level 1484. The blurred image detector 1462 may alternatively determine that the low resolution raw image data 2226 does not indicate a blurred image based on determining that the low resolution raw image data 2226 indicates that the sharpness of the image satisfies the threshold sharpness level 1484.

In response to the blurred image detector 1462 determining that the low resolution raw image data 2226 indicates that the image is blurred, at 2308, the system 2300 may deactivate the first power domain of the device 1402, at 2310. For example, the multimedia content classifier 1412 may deactivate the first power domain of the device 1402 in response to the blurred image detector 1462 determining that the low resolution raw image data 2226 indicates that the image is blurred. In a particular embodiment, the statistics processing device 108, the second processing device 310, or both, may include the blurred image detector 1462. The statistics processing device 108 or the second processing device 310 may deactivate the first power domain of the statistics processing device 108 based on the blurred image detector 1462 determining that the low resolution raw image data 2226 indicates that the image is blurred.

In response to the blurred image detector 1462 determining that the low resolution raw image data 2226 indicates that the image is not blurred, at 2308, the system 2300 may operate as described with reference to FIG. 26.

Thus, the first power domain of the device 1402 illustrated in FIG. 23 may remain deactivated when the image does not correspond to a scene change, conserving resources of the device 1402. Moreover, low resolution image data may be analyzed by the blurred image detector 1462 to determine whether to continue with an analysis of the high resolution image data. Having the blurred image detector 1462 analyze the low resolution image data, as compared to the high resolution image data, may also conserve resources of the device 1402.

Figure 24:
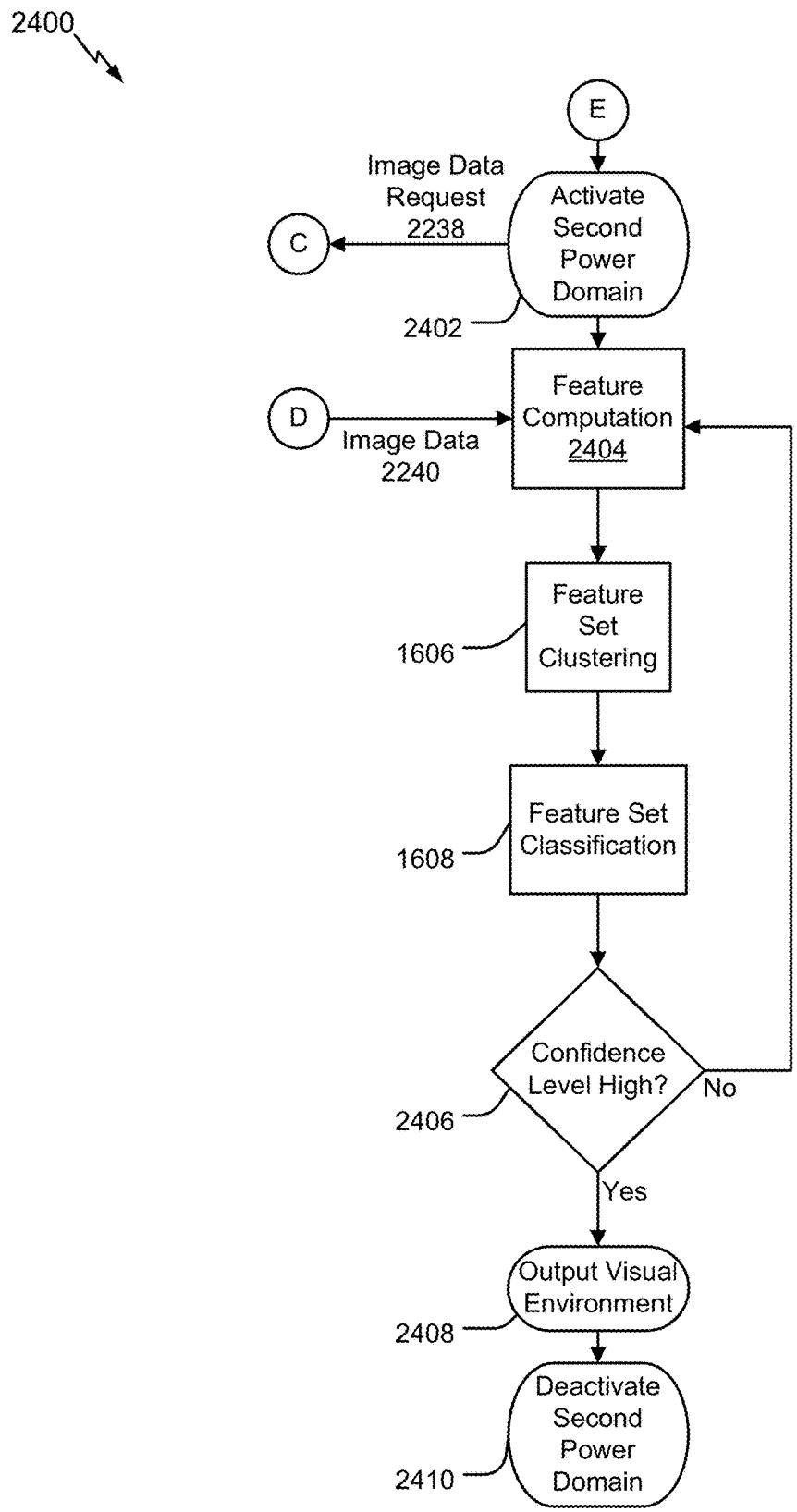
FIG. 24 is a diagram of another particular embodiment of a system to identify a context of an image and may be coupled to the system of FIG. 22, the system of FIG. 23, or both.

Referring to FIG. 24, a particular illustrative embodiment of a system operable to identify a context of an image is disclosed and generally designated 2400. The system 2400 may be coupled to, or in communication with, the system 2200 of FIG. 22, the system 2300 of FIG. 12, or both. One or more operations of the system 2400 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

During operation, the system 2400 may activate a second power domain of the device 1402, at 2402. For example, the multimedia content classifier 1412 may activate the second power domain in response to the blurred image detector 1462 determining that the low resolution raw image data 2226 indicates that the image is not blurred, as further described with reference to FIG. 23.

In a particular embodiment, the statistics processing device 108 of FIG. 1 or the second processing device 310 of FIG. 3 may activate a second power domain of the second processing device 310 based on the blurred image detector 1462 determining that the low resolution raw image data 2226 indicates that the image is not blurred, as further described with reference to FIG. 23.

The system 2400 may output an image data request (e.g., the image data request 2238 of FIG. 22), at 2402. For example, the multimedia content classifier 1412 may output the image data request 2238 to the memory 1408, as further described with reference to FIG. 22, in response to the blurred image detector 1462 determining that the low resolution raw image data 2226 indicates that the image is not blurred. In a particular embodiment, the second processing device 310 may output the image data request to the memory 306 based on the blurred image detector 1462 determining that the low resolution raw image data 2226 indicates that the image is not blurred.

The system 2400 may receive image data (e.g., the image data 2240) and may perform feature computation 2404. For example, the memory 1408 may output the image data 2240 to the multimedia content classifier 1412 in response to the image data request 2238), as further described with reference to FIG. 22. The image data 2240 may correspond to the high resolution raw image data 2220. The feature set extractor 1414 may extract a first subset of features from the high resolution raw image data 2220, as further described with reference to FIG. 14. In a particular embodiment, the second processing device 310 may perform application-specific processing on high resolution raw image data received from the memory 306. For example, the second processing device 310 may activate subsequent power domains corresponding to particular steps of the application-specific processing. To illustrate, the second power domain may correspond to the second application processor 706 of FIG. 7 and a subsequent power domain may correspond to the $M^{th}$ application processor 708.

The system 2400 may perform feature clustering 1606 and may perform feature set classification 1608, as further described with reference to FIG. 16. The system 2400 may determine whether confidence levels associated with the first subset of features are high, at 2406. In a particular embodiment, operation 1306 may correspond to operation 1622 of FIG. 16. For example, the multimedia content classifier 1412 may determine whether confidence levels associated with a first classified subset of features (e.g., the classified subset(s) of features 1474) satisfy a threshold confidence level (e.g., the threshold confidence level 1482), as further described with reference to FIG. 14.

In response to determining that the confidence level is not high (e.g., does not satisfy a numerical threshold (e.g., 75%) representing "high" confidence), at 2406, the system 2400 may perform additional feature (e.g., MPEG-7, GIST, CENTRIST, etc.) computation 2404. For example, the feature set extractor 1414 may extract a second subset of features from the image data 2240, as further described with reference to FIG. 24.

In response to determining that the confidence level is high, at 2406, the system 2400 may proceed to output visual environment data, at 2408. For example, the multimedia content classifier 1412 may generate context data (e.g., the context data 1490), as described with reference to FIG. 14. The multimedia content classifier 1412 may initiate display of the context data 1490 at the display 1406.

The system 2400 may deactivate the second power domain, at 2410. For example, the multimedia content classifier 1412 may deactivate the second power domain of the device 1402. In a particular embodiment, the second processing device 310 may deactivate the second power domain of the second processing device 310.

Thus, the second power domain of the device 1402, illustrated in FIG. 24, may remain deactivated when the image does not correspond to a scene change or when the image is blurred, thereby conserving resources of the device 1402.

Figure 25:
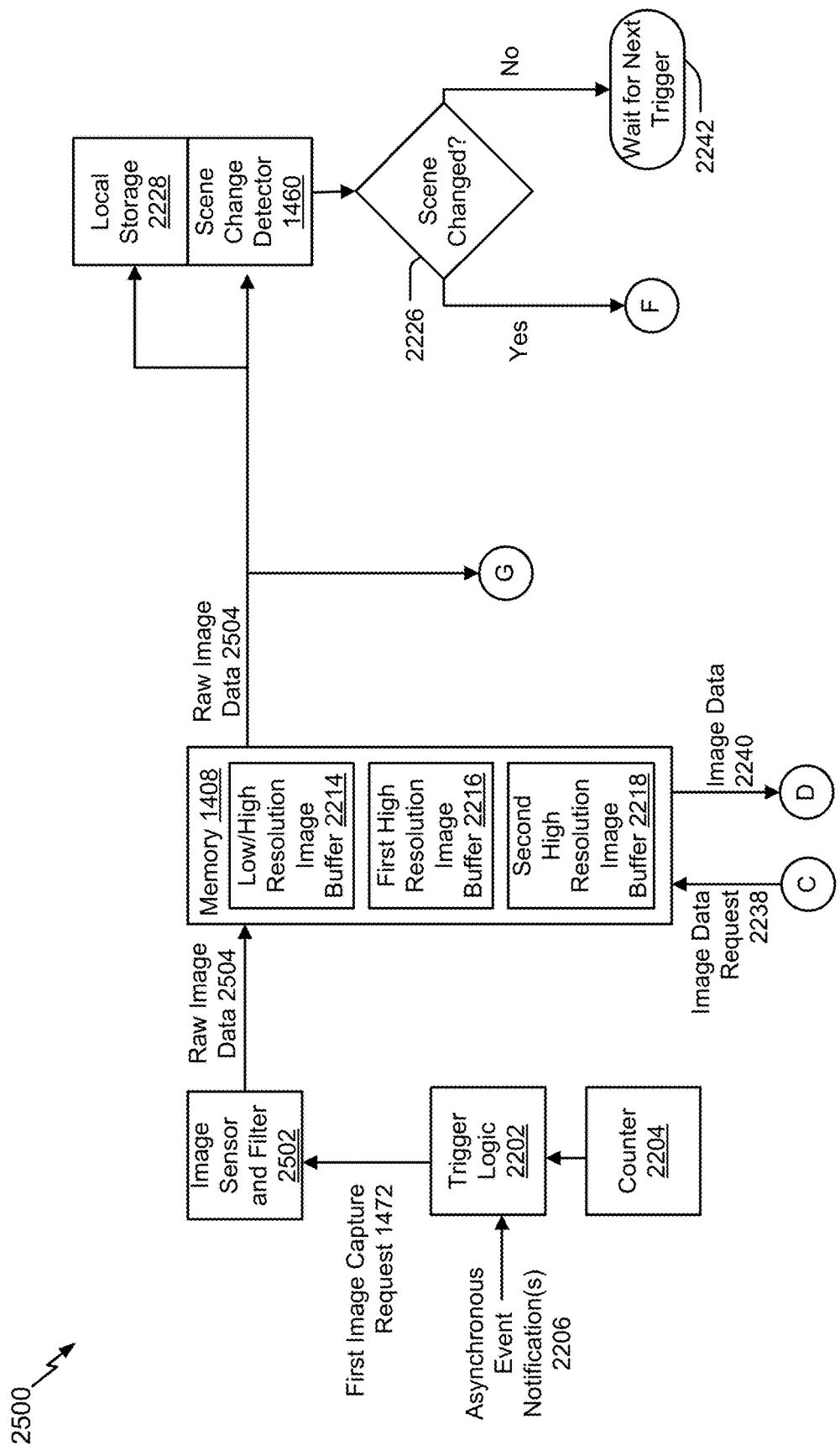
FIG. 25 is a diagram of another particular embodiment of a system to identify a context of an image and may be coupled to the system of FIG. 24.

Referring to FIG. 25, a particular illustrative embodiment of a system operable to identify a context of an image is disclosed and generally designated 2500. The system 2500 may be coupled to the system 2400 of FIG. 24. One or more operations of the system 2500 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 2500 may operate in a similar manner as corresponding components of the system 2200 of FIG. 22. The system 2500 may include an image sensor and filter 2502. The image sensor and filter 2502 may be a combination of an image sensor (e.g., one or more of the image sensors of device 1402 of FIG. 14, such as the first image sensor 1404, the Nth image sensor 1440 of FIG. 14, or both) and a filter (e.g., the filter 2222 of FIG. 22).

The image sensor and filter 2502 may generate raw image data 2504. The raw image data 2504 may correspond to the first sensory data 1470 of FIG. 14. The raw image data 2504 may include low resolution image data (e.g., the low resolution raw image data 2226), high resolution image data (e.g., the high resolution raw image data 2220), or both. In a particular embodiment, the first processing device 304 and the camera 302 of FIG. 3 may correspond to the image sensor and filter 2502 and the raw image data 2504 may correspond to first image statistics provided by the first processing device 304 of FIG. 3 to the statistics processing device 108.

In a particular embodiment, the image sensor and filter 2502 may generate the high resolution raw image data 2220 in response to the first image capture request 1472 indicating that high resolution image data is to be captured. For example, the multimedia content classifier 1412 may indicate a requested resolution in the first image capture request 1472. In a particular embodiment, the image sensor and filter 2502 may capture the low resolution raw image data 2226 using one or more of the image sensors of the device 1402 (e.g., the first image sensor 1404 or the Nth image sensor 1440) and may capture the high resolution raw image data 2220 using another of the image sensors of the device 1402 (e.g., the other of the first image sensor 1404 and the Nth image sensor 1440 or another image sensor).

The image data 2240 may correspond to the raw image data 2504. For example, the image data 2240 may include the low resolution raw image data 2226, the high resolution raw image data 2220, or both.

The memory 1408 may output the raw image data 2504, as further described with reference to FIG. 26. The memory 308 may output the raw image data 2504 to the scene change detector 1460. In a particular embodiment, the memory 1408 may output the raw image data 2504 to the local storage 2228. The scene change detector 1460 may determine whether the raw image data 2504 indicates a scene change, at 2226, as further described with reference to FIG. 14.

In response to the scene change detector 1460 determining that the raw image data 2504 indicates a scene change, the system 2500 may perform operations as further described with reference to FIG. 26.

Thus, the image sensor and filter 2502 may generate image data having various resolutions. Generating only the low resolution image data may conserve resources of the device 1402, while generating the high resolution image data may improve confidence levels associated with context data generated from the image data.

Figure 26:
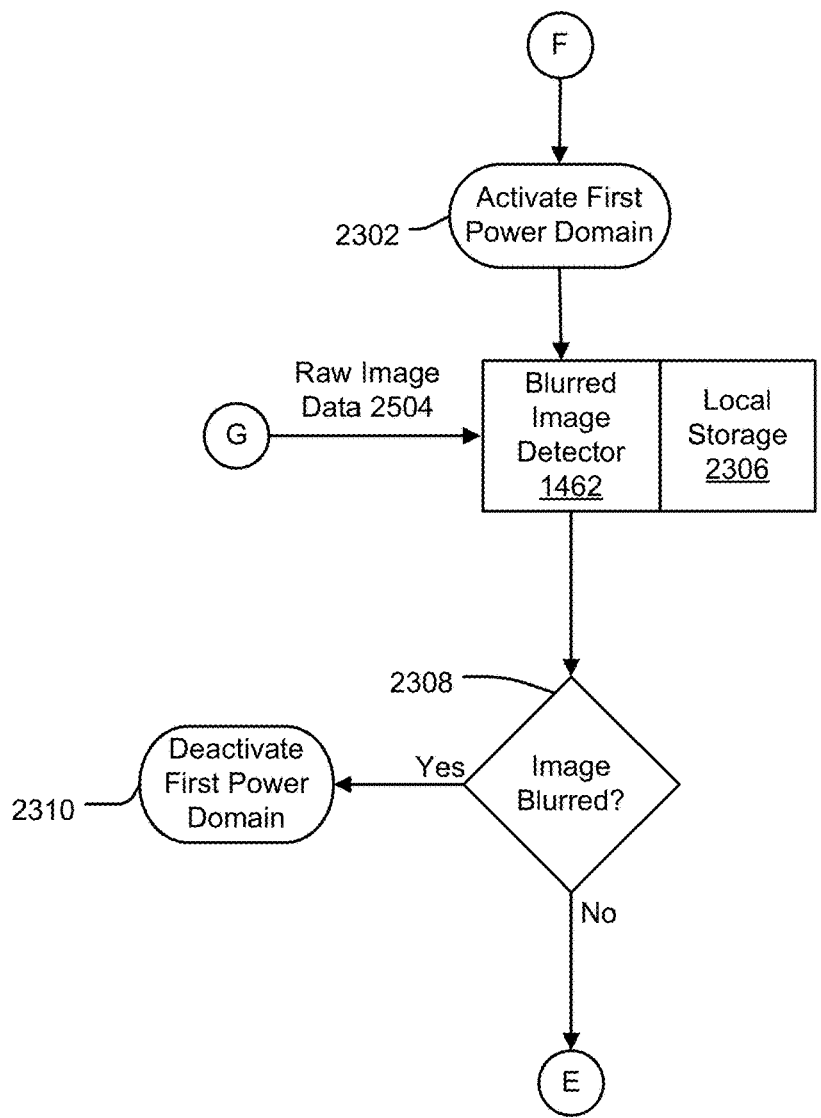
FIG. 26 is a diagram of another particular embodiment of a system to identify a context of an image and may be coupled to the system of FIG. 24, the system of FIG. 25, or both.

Referring to FIG. 26, a diagram particular illustrative embodiment of a system operable to identify a context of an image is disclosed and generally designated 2600. The system 2600 may be coupled to the system 2400 of FIG. 24, the system 2500 of FIG. 25, or both. One or more operations of the system 2600 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 2600 may operate in a similar manner as corresponding components of the system 2300 of FIG. 23. The blurred image detector 1462 may receive raw image data (e.g., the raw image data 2504) from the memory 1408, as further described with reference to FIG. 25. For example, the blurred image detector 1462 may receive the raw image data 2504 from the memory 1408.

In response to the blurred image detector 1462 determining that the raw image data 2504 indicates that the image is not blurred, at 2308, the system 2500 may perform operations as further described with reference to FIG. 24.

Thus, the first power domain of the device 1402 may remain deactivated when the image does not correspond to a scene change, conserving resources of the device 1402. Moreover, image data may be analyzed by the blurred image detector 1462 to determine whether to continue with an analysis (e.g., extraction, clustering, or classification) of the image data.

Figure 27:
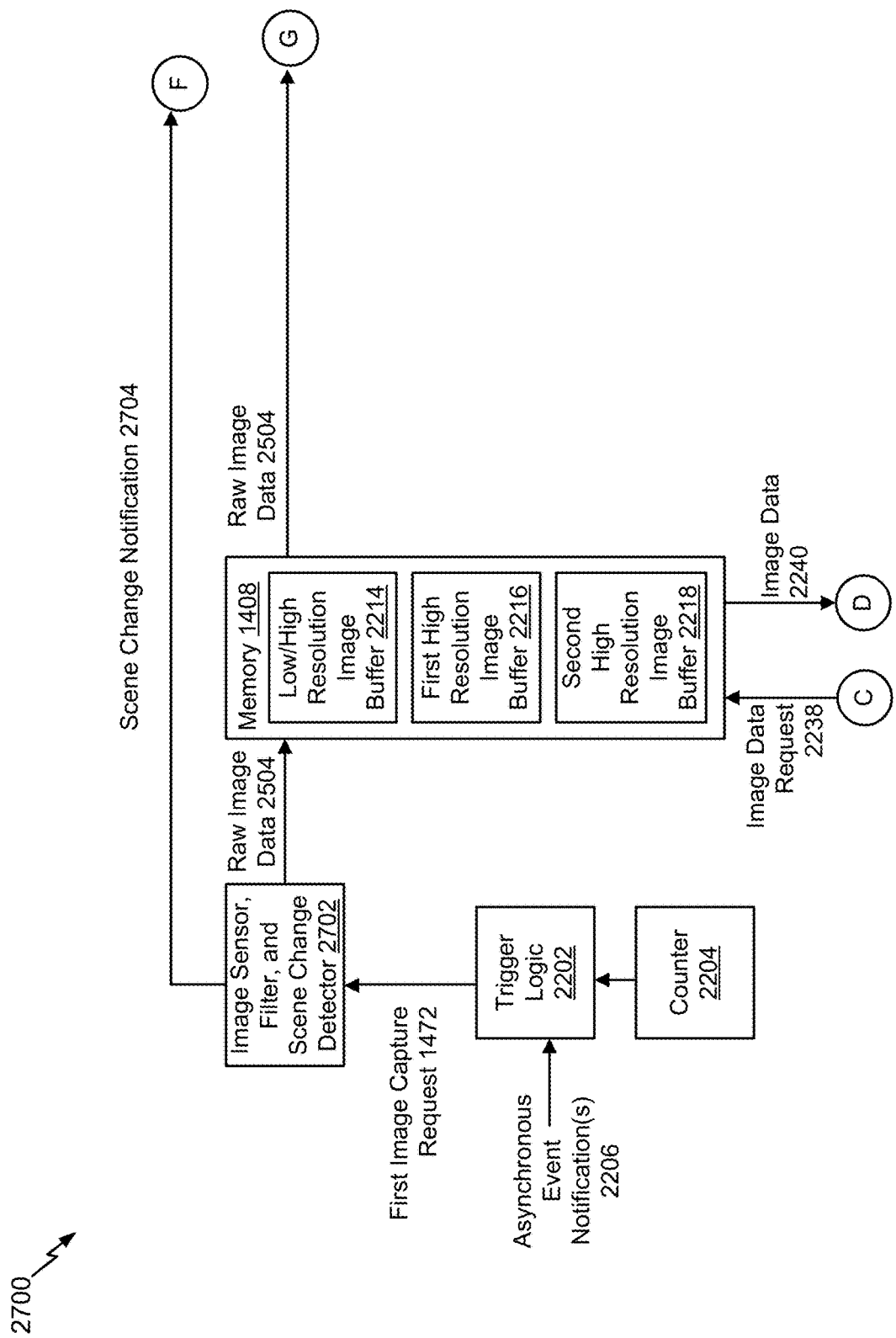
FIG. 27 is a diagram of another particular embodiment of a system to identify a context of an image and may be coupled to the system of FIG. 24, the system of FIG. 26, or both.

Referring to FIG. 27, a particular illustrative embodiment of a system operable to identify a context of an image is disclosed and generally designated 2700. The system 2700 may be coupled to the system 2400 of FIG. 24, the system 2600 of FIG. 26, or both. One or more operations of the system 2700 may be performed by the statistics processing device 108 of FIG. 1, the first processing device 304, the second processing device 310 of FIG. 3, the change detection circuit 414, the application processor 418 of FIG. 4, the selection circuit 506, the signal analyzer 512, the change detection circuit 514, the application processor 518 of FIG. 5, the preprocessing circuit 604, the one or more additional processors 622, the second application processor 706, the $M^{th}$ application processor 708 of FIG. 7, the activation analyzer 814, the deactivation analyzer 816, the object detector 850, the object identifier 852, the activity classifier 854, the system controller 806 of FIG. 8, the VFE-Lite 904, the LPCVSS 906, the LPASS 908, the AP SS 910, the one or more other processors 912 of FIG. 9, the contextual determination engine 1380 of FIG. 13, the device 1402 of FIG. 14, or a combination thereof.

Components of the system 2700 may operate in a similar manner as corresponding components of the system 2500 of FIG. 25. The system 2700 may include an image sensor, filter, and scene change detector 2702. The image sensor, filter, and scene change detector 2702 may be a combination of an image sensor (e.g., one or more image sensors of the device 1402 of FIG. 14, such as the first image sensor 1404, the Nth image sensor 1440, or both), a scene change detector (e.g., the scene change detector 1460 of FIG. 14), and a filter (e.g., the filter 2222 of FIG. 22).

In a particular embodiment, the camera 302, the first processing device 304 of FIG. 3, and the statistics processing device 108 of FIG. 1 may correspond to the image sensor, filter, and scene change detector 2702. The statistics processing device 108 may provide the scene change notification 2704 and the raw image data 2504 to the second processing device 310 of FIG. 3. The image sensor, filter, and scene change detector 2702 may generate raw image data 2504. The image sensor, filter, and scene change detector 2702 may also generate a scene change notification 2704. The image sensor, filter, and scene change detector 2702 may generate the scene change notification 2704 in response to determining that the image corresponds to a scene change, as further described with reference to FIG. 14. The image sensor, filter, and scene change detector 2702 may output the scene change notification 2704. For example, the system 2700 may perform operations as further described with reference to FIG. 26 in response to the scene change notification 2704.

Figure 28:
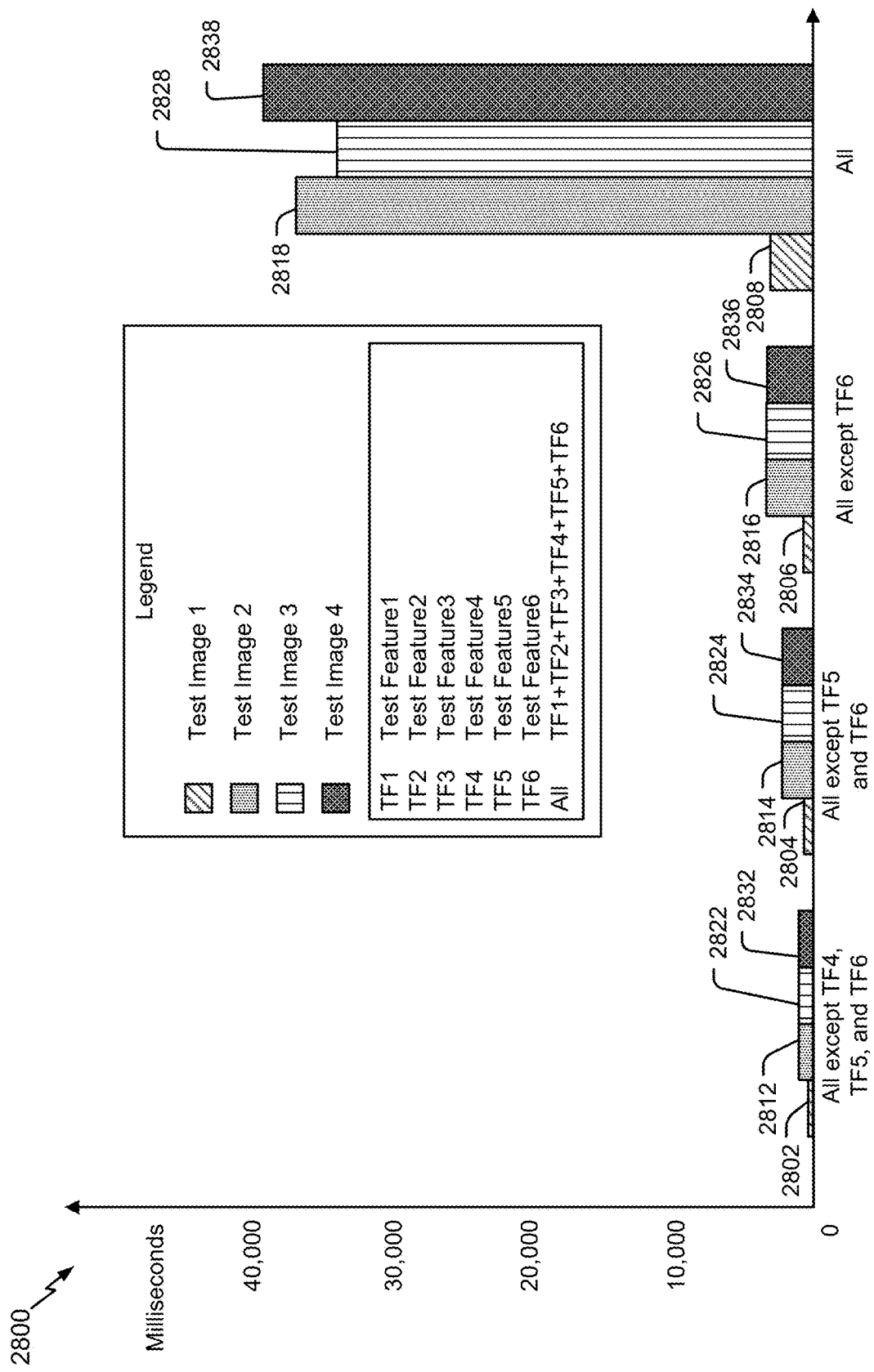
FIG. 28 is a bar chart illustrating an example of execution times associated with extracting various subsets of features of test images.

Referring to FIG. 28, a bar chart illustrating an example of execution times associated with extracting various subsets of features of test images is shown and generally designated 2800. In a particular embodiment, the various subsets of features may be extracted by the feature extractor 1414 of FIG. 14.

The bar chart 2800 illustrates execution times associated extracting various subsets of features from sensory data associated with each of multiple test images (e.g., test images 1-4). For example, each test image may have a 1080 progressive scan (1080p) resolution. A first subset of features includes a test feature1, a test feature2, and a test feature3. A second subset of features includes the first subset of features and a test feature4. A third subset of features includes the second subset of features and a test feature5. A fourth subset of features includes the third subset of features and a test feature6. In a particular embodiment, the test feature1 may correspond to a color layout descriptor, the test feature2 may correspond to a homogeneous texture descriptor, the test feature3 may correspond to an edge histogram descriptor, the test feature4 may correspond to color structure descriptor, the test feature5 may correspond to a scalable color descriptor, and the test feature6 may correspond to a dominant color descriptor.

The bar chart 2800 includes a bar 2802 corresponding to an execution time of a few hundred milliseconds associated with extracting the first subset of features from sensory data of the test image 1. The bar chart 2800 includes a bar 2812 corresponding to an execution time of approximately a second associated with extracting the first subset of features from sensory data of the test image 2. The bar chart 2800 includes a bar 2822 corresponding to an execution time of approximately a second associated with extracting the first subset of features from sensory data of the test image 3. The bar chart 2800 includes a bar 2832 corresponding to an execution time of approximately a second associated with extracting the first subset of features from sensory data of the test image 4.

The bar chart 2800 includes a bar 2804 corresponding to an execution time of extracting the second subset of features from sensory data of the test image 1 and is approximately twice the execution time of extracting the first subset of features from the sensory data of the test image 1. The bar chart 2800 includes a bar 2814 corresponding to an execution time of approximately 2 seconds associated with extracting the second subset of features from sensory data of the test image 2. The bar chart 2800 includes a bar 2824 corresponding to an execution time of approximately 2 seconds associated with extracting the second subset of features from sensory data of the test image 3. The bar chart 2800 includes a bar 2834 corresponding to an execution time of approximately 2 seconds associated with extracting the second subset of features from sensory data of the test image 4.

The bar chart 2800 includes a bar 2806 corresponding to an execution time of half a second associated with extracting the third subset of features from sensory data of the test image 1. The bar chart 2800 includes a bar 2816 corresponding to an execution time of approximately 3 seconds associated with extracting the third subset of features from sensory data of the test image 2. The bar chart 2800 includes a bar 2826 corresponding to an execution time of approximately 3 seconds associated with extracting the third subset of features from sensory data of the test image 3. The bar chart 2800 includes a bar 2836 corresponding to an execution time of approximately 3 seconds associated with extracting the third subset of features from sensory data of the test image 4.

The bar chart 2800 includes a bar 2808 corresponding to an execution time of approximately 3 seconds associated with extracting the fourth subset of features from sensory data of the test image 1. The bar chart 2800 includes a bar 2818 corresponding to an execution time of approximately 36 seconds associated with extracting the fourth subset of features from sensory data of the test image 2. The bar chart 2800 includes a bar 2828 corresponding to an execution time of approximately 33 seconds associated with extracting the fourth subset of features from sensory data of the test image 3. The bar chart 2800 includes a bar 2838 corresponding to an execution time of approximately 38 seconds associated with extracting the fourth subset of features from sensory data of the test image 4.

Thus, the execution times associated with extracting a subset of features varies based on the descriptors included in the subset. In particular, extracting the test feature6 from sensory data of test images 2-4 takes approximately 30 seconds. Thus, incrementally extracting subsets of features based on confidence levels may conserve resources of the device 1402 as some subsets of features may not be extracted for each image.

Figure 29:
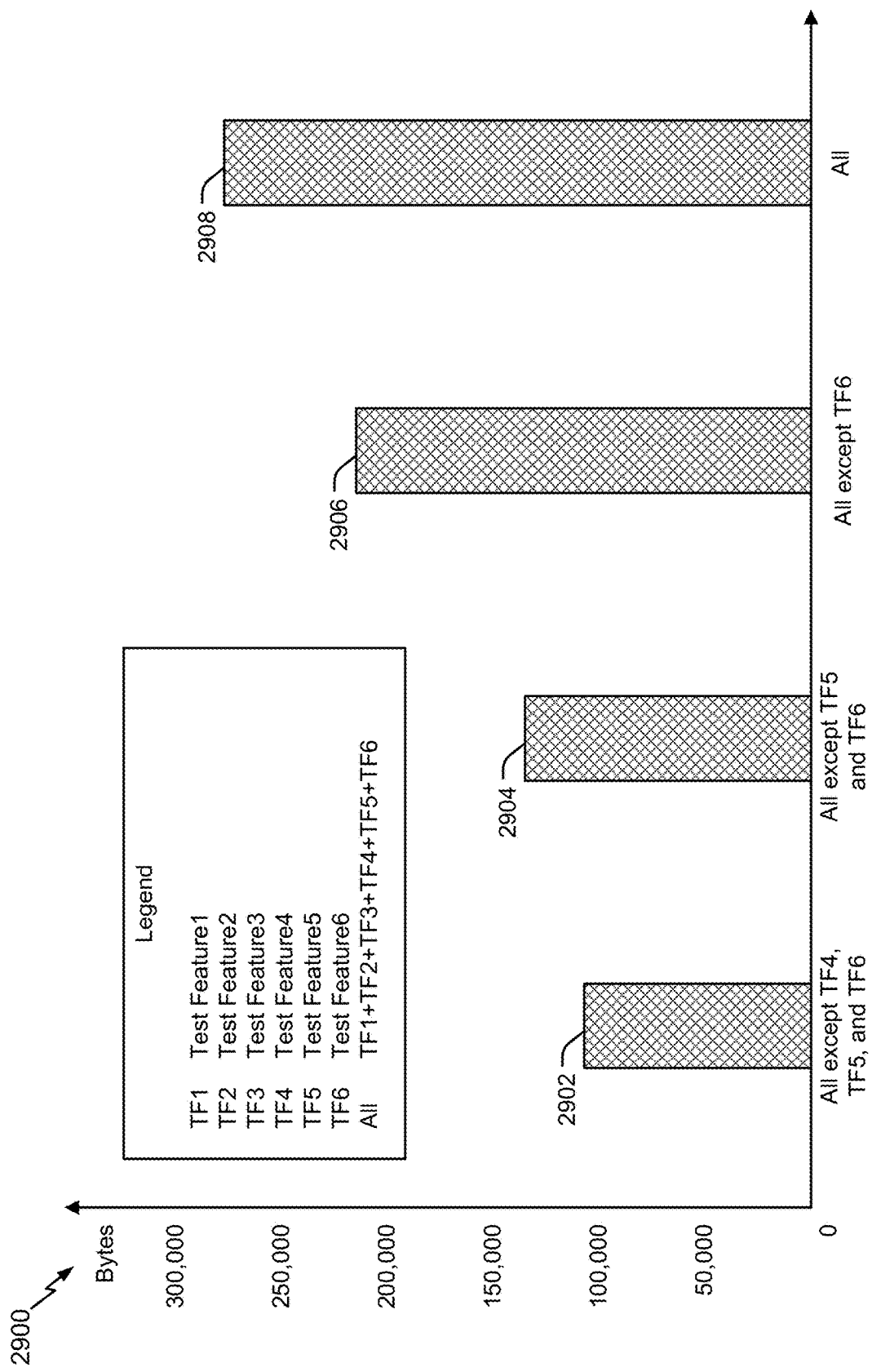
FIG. 29 is a bar chart illustrating an example of memory usage associated with extracting various subsets of features of test images.

Referring to FIG. 29, a bar chart illustrating an example of memory usage associated with extracting various subsets of features of the test images of FIG. 28 is shown and generally designated 2900. In a particular embodiment, the various subsets of features may be extracted by the feature set extractor 1414 of FIG. 14.

The bar chart 2900 includes a bar 2902 indicating a memory usage of approximately 100 kilobytes associated with extracting the first subset of features, a bar 2904 indicating a memory usage of approximately 140 kilobytes associated with extracting the second subset of features, a bar 2906 indicating a memory usage of approximately 200 kilobytes associated with extracting the third subset of features, and a bar 2908 indicating a memory usage of approximately 280 kilobytes associated with extracting the fourth subset of features. In a particular embodiment, the memory usage may indicate an amount of memory 308 used by the feature set extractor 1414.

Thus, the memory usage associated with extracting a subset of features varies based on the descriptors included in the subset. In particular, extracting test feature4, the test feature5, and test feature6 from sensory data increases the memory usage by approximately 180 kilobytes. Thus, incrementally extracting subsets of features based on confidence levels may conserve resources of the device 1402 as some subsets of features may not be extracted for each image.

Figure 30:
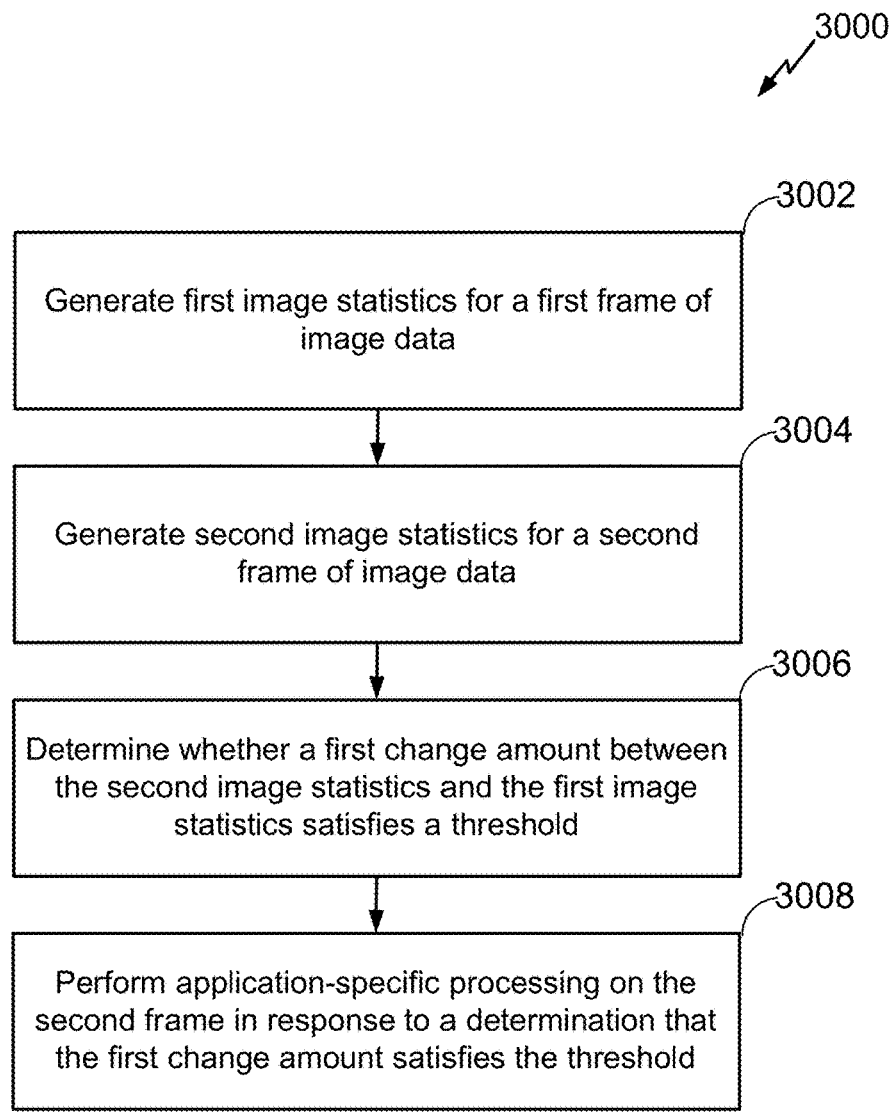
FIG. 30 is a flowchart of a particular embodiment of a method reducing power usage associated with computer vision applications based on image statistics.

Referring to FIG. 30, a flowchart of a particular embodiment of a method 3000 of reducing power usage associated with computer vision applications based on image statistics is shown. In an illustrative embodiment, the method 3000 may be performed using at least one of the systems, devices, and techniques described with respect FIGS. 1-29.

The method 3000 includes generating first image statistics for a first frame of image data, at 3002. For example, in FIG. 3, the camera 302 may capture the first frame 102 of FIG. 1 at the first time and the first processing device 304 may generate the first image statistics for the first frame 102. The first processing device 304 may provide the first image statistics to the memory 306.

Second image statistics may be generated for a second frame of image data, at 3004. For example, in FIG. 3, after capturing the first frame 102, the camera 302 may capture the second frame 104 of FIG. 1 at the second time, and the first processing device 304 may generate the second image statistics for the second frame 104. The first processing device 304 may provide the second image statistics to the memory 306. Additionally, the first processing device 304 may provide the second frame 104 and the second image statistics to the statistics processing device 108.

A determination of whether a first change amount between the second image statistics and the first image statistics satisfies a threshold may be made, at 3006. For example, in FIG. 3, the statistics processing device 108 may compare the second image statistics to the first image statistics to determine whether to provide the second frame 104 to the second processing device 310 for application-specific processing on the second frame 104. For example, the statistics processing device 108 may determine whether a first change amount between the second image statistics and the first image statistics satisfies a threshold.

Application-specific processing on the second frame may be performed in response to a determination that the first change amount satisfies the threshold, at 3008. For example, in FIG. 3, if the change amount satisfies the threshold, the statistics processing device 108 may provide the second frame 104 to the second processing device 310 for application-specific processing on the second frame 104.

In a particular embodiment, the method 3000 may include bypassing or forgoing the application-specific processing on the second frame in response to a determination that the first change amount does not satisfy the threshold. For example, in FIG. 3, if the change amount does not satisfy the threshold, the statistics processing device 108 may determine to conserve power and bypass application-specific processing of the second frame 104.

In a particular embodiment, the method 3000 may include generating third image statistics for a third frame of image data after bypassing the application-specific processing of the second frame. For example, in FIG. 3, after capturing the second frame 104, the camera 302 may capture the third frame 106 at the third time, and the first processing device 304 may generate the third image statistics for the third frame 106. The first processing device 304 may provide the third image statistics to the memory 306. In this example, the method 3000 may include determining whether a second change amount between the third image statistics and the second image statistics satisfies the threshold. For example, in FIG. 3, if the statistics processing device 108 determined to bypass or forgo application-specific processing on the second frame 104, the statistics processing device 108 may compare the second image statistics to the second image statistics (or the first image statistics) to determine whether to perform application-specific processing on the third frame 106.

In a particular embodiment, the method 3000 may include performing application-specific processing on the third frame in response to a determination that the second change amount satisfies the threshold. For example, in FIG. 3, if the second change amount satisfies the threshold, the statistics processing device 108 may provide the third frame 106 to the second processing device 310 for application-specific processing on the third frame 106.

Bypassing or forgoing application-specific processing on a particular frame that has similar image statistics to a previous frame may conserve power in electronic devices. For example, application-specific processing may utilize high-power devices within a processing system, such as a general purpose processor or a graphics processor. By using low-power devices (e.g., a digital signal processor, an application-specific integrated circuit, etc.), such as the statistics processing device 108 and the first processing device 304, to generate and/or evaluate statistics of each frame, a determination may be made that particular frames are substantially identical and that application-specific processing need only be performed on one of the identical frames. As a result, power may be conserved by forgoing application-specific processing on identical or similar frames.

Figure 31:
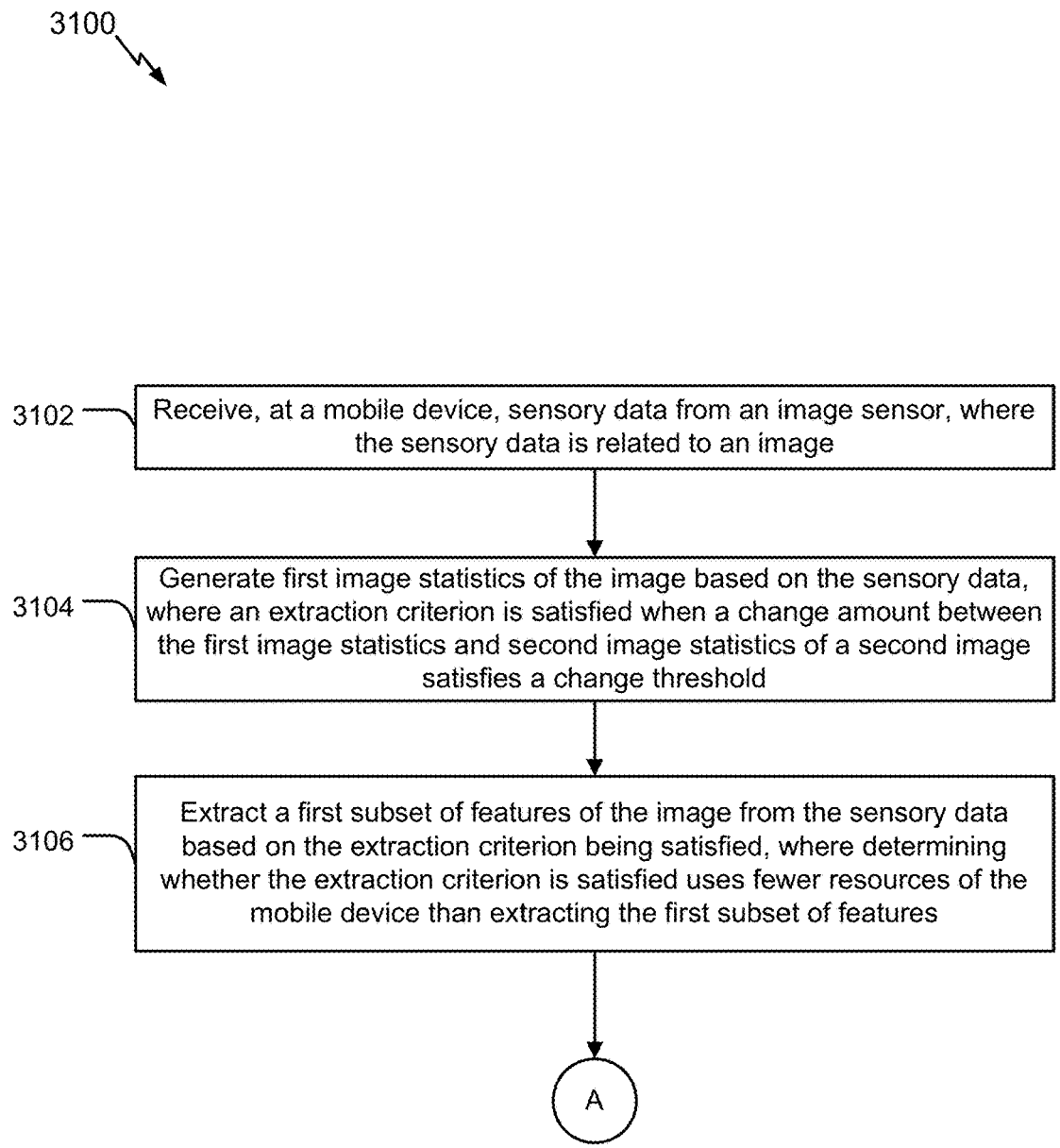
FIG. 31 is a flow chart illustrating a particular embodiment of a method of identifying a context of an image.

Referring to FIG. 31, a flow chart of a particular illustrative embodiment of a method of identifying a context of an image is shown and generally designated 3100. The method 3100 may be performed using at least one of the systems, devices, and techniques described with respect FIGS. 1-29.

The method 3100 may include receiving, at a mobile device, sensory data from an image sensor, at 3102. The sensory data may be related to an image. For example, the device 1402 of FIG. 14 may receive sensory data (e.g., the first sensory data 1470) from the first image sensor 1404. The first sensory data 1470 may be related to the second frame 104 of FIG. 1.

The method 1300 may also include generating first image statistics of the image based on the sensory data, at 1304. An extraction criterion may be satisfied when a change amount between the first image statistics and second image statistics of a second image satisfies a change threshold. For example, the statistics processing device 108 of FIG. 1 may generate first image statistics corresponding to the second frame 104 and may generate second image statistics corresponding to the first frame 102, as described with reference to FIG. 1. An extraction criterion may be satisfied when a change amount between the first image statistics and the second image statistics satisfies a change threshold, as further described with reference to FIG. 14.

The method 3100 may further include extracting a first subset of features of the image from the sensory data based on the extraction criterion being satisfied, at 3106. For example, the feature set extractor 1414 of FIG. 14 may extract a first subset of features (e.g., a first of the subset(s) of features 1442 of FIG. 14) from the first sensory data 1470 based on the extraction criterion being satisfied, as further described with reference to FIG. 14.

The method 3100 of FIG. 31 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 3100 of FIG. 31 can be performed by a processor that executes instructions.

Thus, the method 3100 may enable image context identification. Extracting subsets of features based on an extraction criterion may prevent extraction of features of an image in certain situations, thereby conserving resources of the device 1402.

Figure 32:
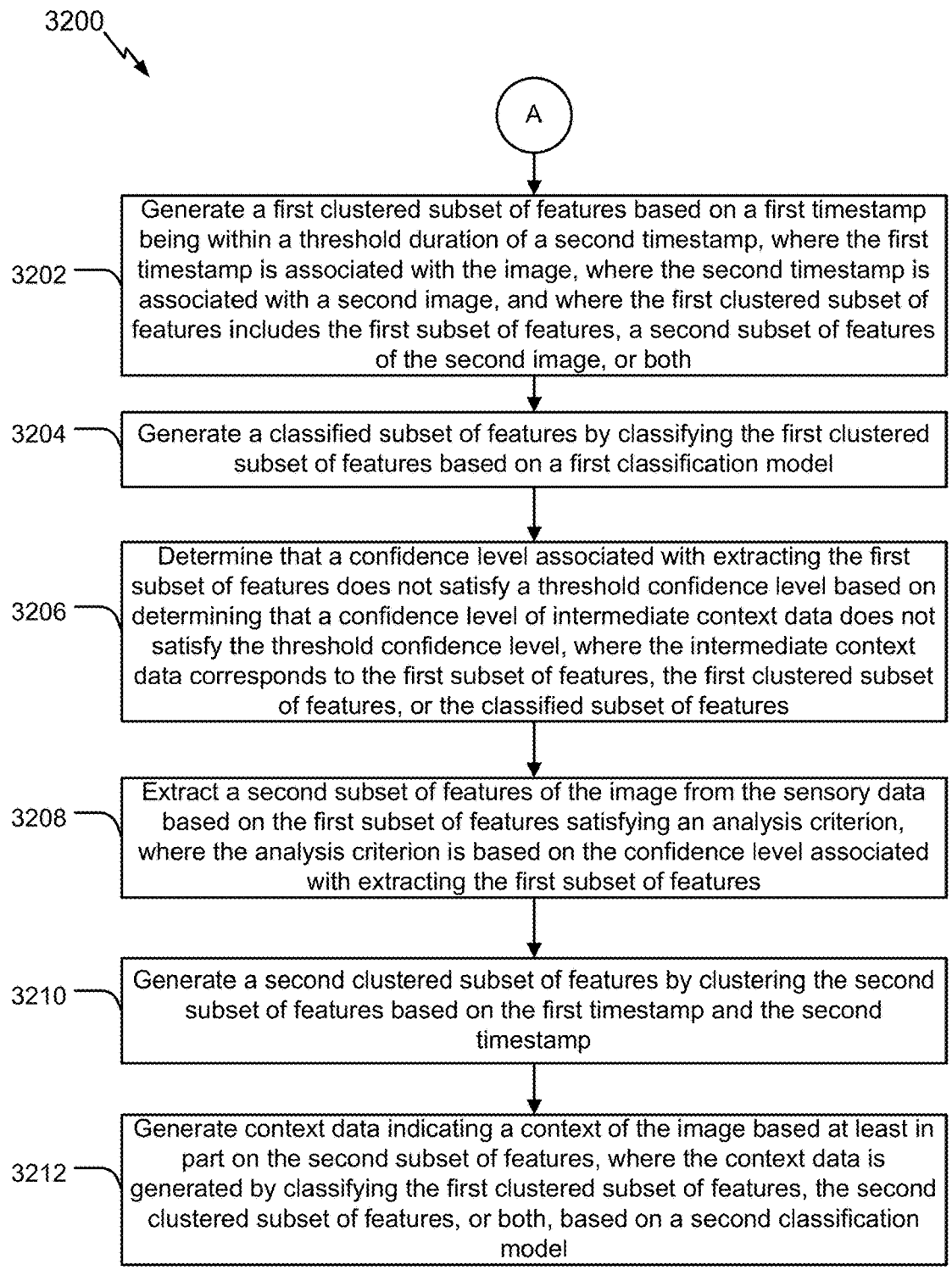
FIG. 32 is a flow chart illustrating another particular embodiment of a method of identifying a context of an image.

Referring to FIG. 32, a flow chart of a particular illustrative embodiment of a method of identifying a context of an image is shown and generally designated 3200. The method 3200 may be performed using at least one of the systems, devices, and techniques described with respect FIGS. 1-29. In a particular embodiment, the method 3200 may proceed from 3106 of FIG. 31.

The method 3200 may include generating a first clustered subset of features based on a first timestamp being within a threshold duration of a second timestamp, at 3202. The first timestamp is associated with the image (e.g., the second frame 104 of FIG. 1). The second timestamp is associated with a second image. The first clustered subset of features includes the first subset of features, a second subset of features of the second image, or both. For example, the feature set clusterer 1416 of FIG. 14 may generate a first clustered subset of features (e.g., the clustered subset(s) of features 1476 of FIG. 14) based on a first timestamp (e.g., a first of the timestamp(s) 1494) being within a threshold image capture duration (e.g., the threshold duration(s) 1480) of a second timestamp (e.g., a second of the timestamp(s) 1494), as further described with reference to FIG. 14.

The method 3200 may also include generating a classified subset of features by classifying the first clustered subset of features based on a first classification model, at 3204. For example, the feature set classifier 1418 of FIG. 14 may generate a classified subset of features (e.g., the classified subset(s) of features 1474) by classifying the first clustered subset of features based on a first classification model (e.g., a first of the classification model(s) 1428), as further described with reference to FIG. 14.

The method 3200 may further include determining that a confidence level associated with extracting the first subset of features does not satisfy a threshold confidence level based on determining that a confidence level of intermediate context data does not satisfy the threshold confidence level, at 3206. The intermediate context data may correspond to the first subset of features, the first clustered subset of features, or the classified subset of features. For example, the multimedia content classifier 1412 may determine that a confidence level associated with extracting the first subset of features does not satisfy the threshold confidence level 1482 based on determining that a confidence level of the intermediate context data 1492 does not satisfy the threshold confidence level 1482, as further described with reference to FIG. 14.

The method 3200 may also include extracting a second subset of features of the image from the sensory data based on the first subset of features satisfying an analysis criterion, at 3208. The analysis criterion is based on the confidence level associated with extracting the first subset of features. For example, the feature set extractor 1414 of FIG. 14 may extract a second subset of features (e.g., a second of the subset(s) of features 1442) from the first sensory data 1470 based on the first subset of features satisfying an analysis criterion, as further described with reference to FIG. 14. The analysis criterion may be based on the confidence level associated with extracting the first subset of features, as further described with reference to FIG. 14.

The method 3200 may further include generating a second clustered subset of features by clustering the second subset of features based on the first timestamp and the second timestamp, at 3210. For example, the feature set clusterer 1416 of FIG. 14 may generate a second clustered subset of features (e.g., a second of the clustered subset(s) of features 1476) by clustering the second subset of features based on the first timestamp and the second timestamp, as further described with reference to FIG. 14.

The method 3200 may also include generating context data indicating a context of the image based at least in part on the second subset of features, at 3212. The context data may be generated by classifying the first clustered subset of features, the second clustered subset of features, or both, based on a second classification model. For example, the multimedia content classifier 1412 may generate the context data 1490 indicating a context of the image based at least in part on the second subset of features, as further described with reference to FIG. 14.

The method 3200 of FIG. 32 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 3200 of FIG. 32 can be performed by a processor that executes instructions.

Thus, the method 3200 may enable image context identification. Analyzing (e.g., extracting, clustering, and classifying) subsets of features based on associated confidence levels may result in extraction of fewer than all features of an image, thereby conserving resources of the device 1402.

Figure 33:
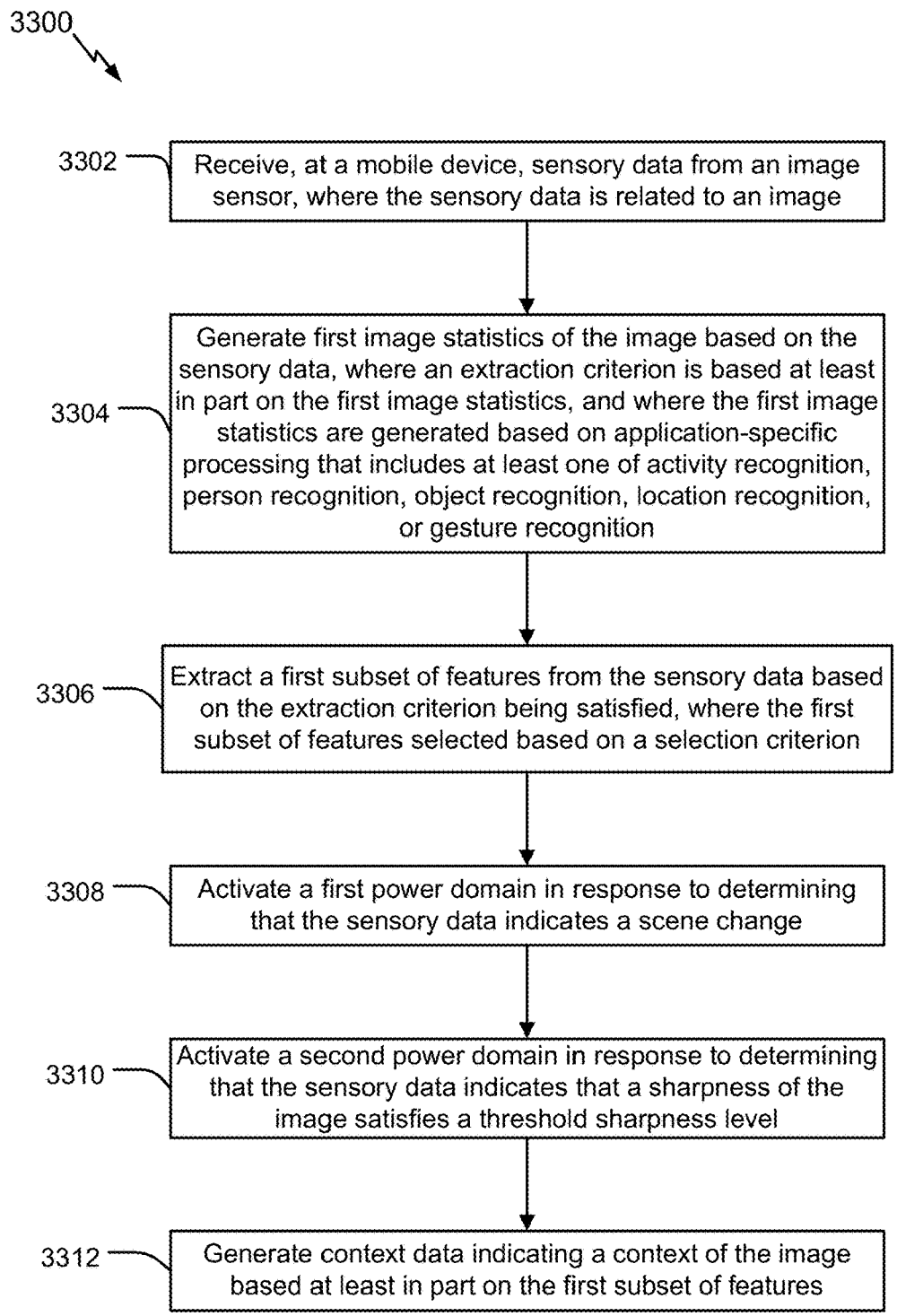
FIG. 33 is a flow chart illustrating another particular embodiment of a method of identifying a context of an image.

Referring to FIG. 33, a flow chart of a particular embodiment of a method of identifying a context of an image is shown and generally designated 3300. The method 3300 may be performed using at least one of the systems, devices, and techniques described with respect FIGS. 1-29.

The method 3300 may include receiving, at a mobile device, sensory data from an image sensor, at 3302. The sensory data is related to an image. For example, the device 1402 of FIG. 14 may receive sensory data (e.g., the first sensory data 1470) from the first image sensor 1404. The first sensory data 1470 may be related to the second frame 104 of FIG. 1.

The method 3300 may also include generating first image statistics of the image based on the sensory data. An extraction criterion is based at least in part on the first image statistics. The first image statistics are generated based on application-specific processing that includes at least one of activity recognition, person recognition, object recognition, location recognition, or gesture recognition. For example, the statistics processing device 108 of FIG. 3 may generate first image statistics of the second frame 104 based on the first sensory data 1470 and an extraction criterion may be based at least in part on the first image statistics, as described with reference to FIG. 14. The first image statistics may be generated based on application-specific processing that includes at least one of activity recognition, person recognition, objection recognition, location recognition, or gesture recognition, as described with reference to FIG. 14.

The method 3300 may further include extracting a first subset of features from the sensory data based on the extraction criterion being satisfied, at 3306. The first subset of features may be selected based on a selection criterion. For example, the feature set extractor 1414 of FIG. 14 may extract a first subset of features (e.g., the subset(s) of features 1442 of FIG. 14) from the first sensory data 1470 based on the extraction criterion being satisfied, as described with reference to FIG. 14. The feature set extractor 1414 may select the first subset of features based on a selection criterion (e.g., the selection criteria 1438 of FIG. 14), as further described with reference to FIG. 14.

The method 3300 may further include activating a first power domain in response to determining that the sensory data indicates a scene change, at 3308. For example, the multimedia content classifier 1412 of FIG. 14 may activate a first power domain of the device 1402 in response to determining that the first sensory data 1470 indicates a scene change, as further described with reference to FIG. 23.

The method 3300 may also include activating a second power domain in response to determining that the sensory data indicates that sharpness of the image satisfies a threshold sharpness level, at 3310. For example, the multimedia content classifier 1412 of FIG. 14 may activate a second power domain of the device 1402 in response to determining that the first sensory data 1470 indicates that a sharpness of the image satisfies the threshold sharpness level, as further described with reference to FIG. 24.

The method 3300 may further include generating context data indicating a context of the image based at least in part on the first subset of features, at 3312. For example, the multimedia content classifier 1412 of FIG. 14 may generate the context data 1490 indicating a context of the image based at least in part on the first subset of features, as further described with reference to FIG. 14.

The method 3300 of FIG. 33 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 3300 of FIG. 33 can be performed by a processor that executes instructions.

Thus, the method 3300 may enable image context identification. Analyzing subsets of features of an image in response to determining that the image corresponds to a scene change, that the image is not blurred, or both, may result in selective analysis of images, thereby conserving resources of the device 1402. Moreover, selectively activating the first power domain, the second power domain, or both, of the device 1402 may also conserve resources of the device 1402.

Figure 34:
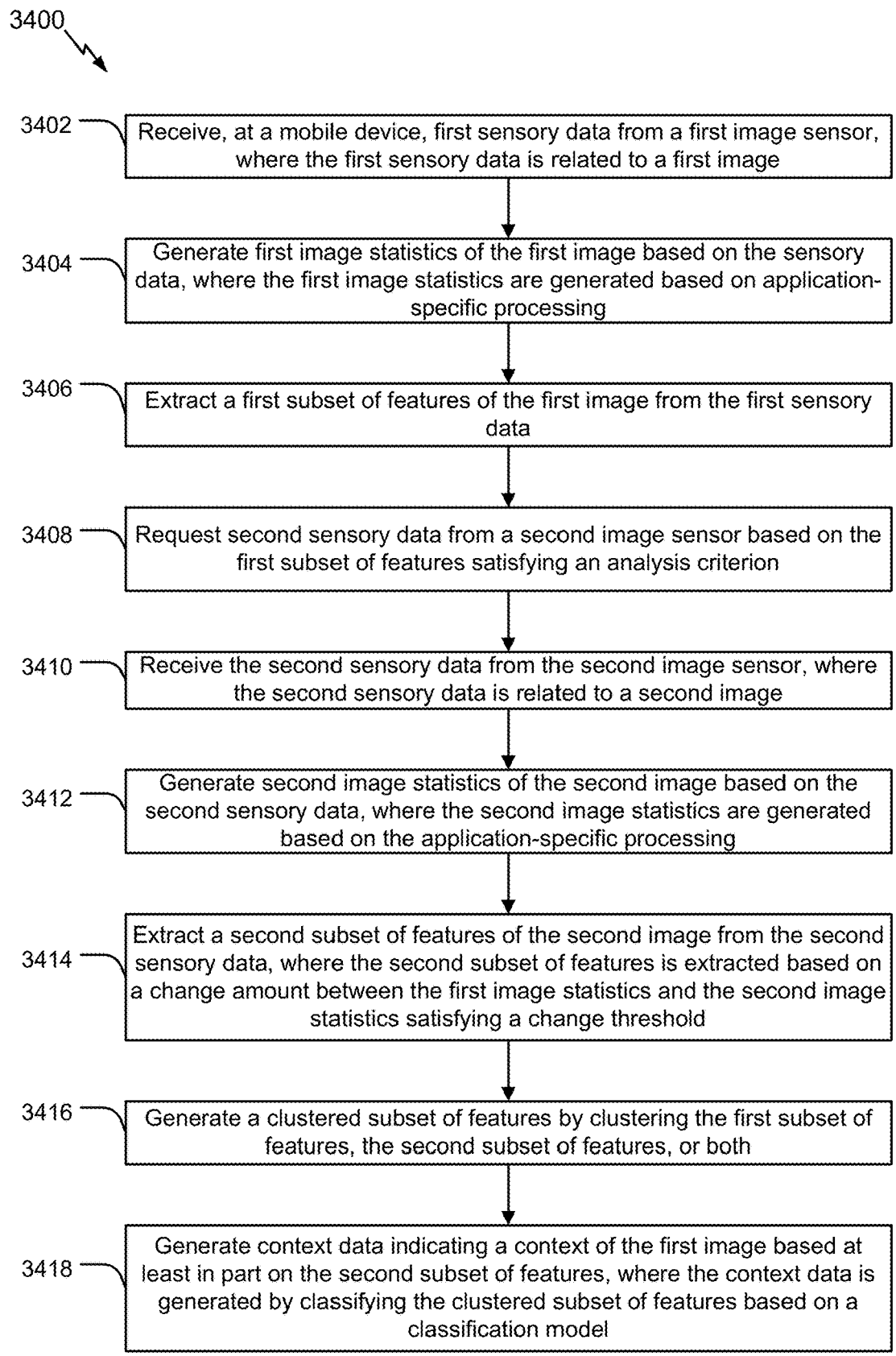
FIG. 34 is a flow chart illustrating another particular embodiment of a method of identifying a context of an image.

Referring to FIG. 34, a flow chart of a particular illustrative embodiment of a method of identifying a context of an image is shown and generally designated 3400.

The method 3400 may include receiving, at a mobile device, first sensory data from a first image sensor, at 3402. The first sensory data may be related to a first image. For example, the device 1402 of FIG. 14 may receive sensory data (e.g., the first sensory data 1470) from the first image sensor 1404. The first sensory data 1470 may be related to the first frame 102 of FIG. 1.

The method 3400 may also include generating first image statistics of the first image based on the sensory data, at 3404. The first image statistics are generated based on application-specific processing. For example, the statistics processing device 108 may generate first image statistics of the first frame 102 of FIG. 1 based on the first sensory data 1470, as described with reference to FIG. 14. The first image statistics may be generated based on application-specific processing, as described with reference to FIG. 14.

The method 3400 may further include extracting a first subset of features of the first image from the first sensory data, at 3406. For example, the feature set extractor 1414 of FIG. 14 may extract a first subset of features (e.g., a first of the subset(s) of features 1442 of FIG. 14) from the first sensory data 1470.

The method 3400 may also include requesting second sensory data from a second image sensor based on the first subset of features satisfying an analysis criterion, at 3408. For example, the multimedia content classifier 1412 of FIG. 14 may send a second image capture request (e.g., the second image capture request 1426) to the Nth image sensor 1440 in response to determining that a confidence level associated with extracting the first subset of features does not satisfy the threshold confidence level 1482, as further described with reference to FIG. 14.

The method 3400 may further include receiving the second sensory data from the second image sensor, at 3410. The second sensory data may be related to a second image. For example, the multimedia content classifier 1412 of FIG. 14 may receive second sensory data (e.g., the second sensory data 1424) from the Nth image sensor 1440. The second sensory data 1424 may be related to the second frame 104 of FIG. 1.

The method 3400 may also include generating second image statistics of the second image based on the second sensory data, at 3412. The second image statistics are generated based on the application-specific processing. For example, the statistics processing device 108 may generate second image statistics of the second frame 104 of FIG. 1 based on the second sensory data 1424, as described with reference to FIG. 14. The second image statistics may be generated based on application-specific processing, as described with reference to FIG. 14.

The method 3400 may further include extracting a second subset of features of the second image from the second sensory data, at 3414. The second subset of features is extracted based on a change amount between the first image statistics and the second image statistics satisfying a change threshold. For example, the feature set extractor 1414 may extract a second subset of features (e.g., a second of the subset(s) of features 1442) from the second sensory data 1424 based on a change amount between the first image statistics and the second image statistics satisfying a change threshold, as further described with reference to FIG. 14.

The method 3400 may also include generating a clustered subset of features by clustering the first subset of features, the second subset of features, or both, at 3416. For example, the feature set clusterer 1416 may generate a clustered subset of features (e.g., the clustered subset(s) of features 1476) by clustering the first subset of features, the second subset of features, or both, as further described with reference to FIG. 14.

The method 3400 may further include generating context data indicating a context of the first image based at least in part on the second subset of features, at 3418. The context data may be generated by classifying the clustered subset of features based on a classification model. For example, the multimedia content classifier 1412 of FIG. 14 may generate the context data 1490 based at least in part on the second subset of features, as further described with reference to FIG. 14.

The method 3400 of FIG. 34 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 3400 of FIG. 34 can be performed by a processor that executes instructions.

Thus, the method 3400 may enable image context identification. The multimedia content classifier 1412 may identify a context of an image based on analyzing sensory data from multiple image sensors when confidence levels associated with sensory data from a single image sensor do not satisfy a threshold confidence level. Analyzing sensory data from a single image sensor may conserve resources of the device 1402, while analyzing sensory data from multiple image sensors may increase confidence levels associated with the results of the analysis. Sensory data from a subsequent image may be analyzed when a change is detected between a previous image and the subsequent image. Resources of the device 1402 may be conserved by not analyzing the subsequent image when there is not a sufficient change (e.g., greater than the change threshold) from the previous image.

Figure 35:
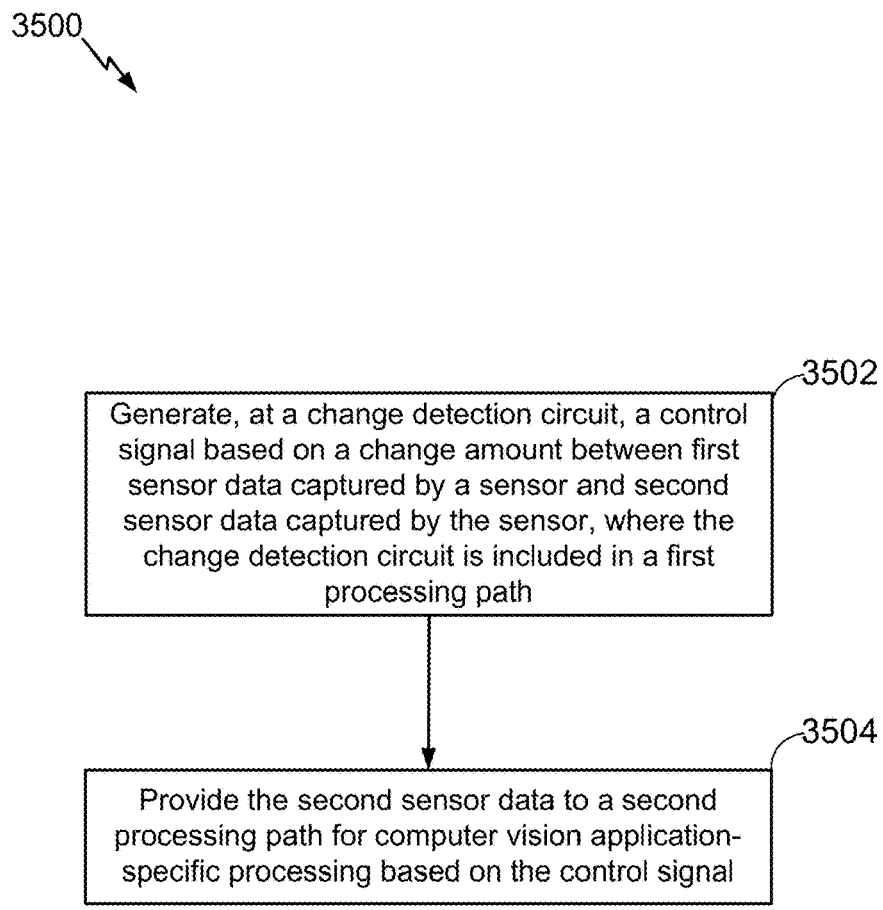
FIG. 35 is a flowchart of a particular embodiment of a method of reducing power usage associated with computer vision applications.

Referring to FIG. 35, a particular illustrative embodiment of a method 3500 of reducing power usage associated with computer vision applications is shown. The method 3500 may be performed using at least one of the systems, devices, and techniques described with respect FIGS. 1-29.

The method 3500 may include generating, at a change detection circuit, a control signal based on a change amount between first sensor data captured by a sensor and second sensor data captured by the sensor, at 3502. For example, referring to FIG. 4, the change detection circuit 414 may generate the control signal based on a change amount between the first sensor data 430 captured by the sensor 402 and the second sensor data 430 captured by the sensor 402. The change detection circuit 414 may be included in the first processing path 408.

The second sensor data may be provided to a second processing path for computer vision application-specific processing based on the control signal, at 3504. For example, referring to FIG. 4, the change detection circuit 414 may provide the second sensor data 430 to the application processor 418 of the second processing path 410 for computer vision application-specific processing based on the control signal indicating a difference between the first sensor data 430 and the second sensor data 430. In alternative embodiments (e.g., FIGS. 5-6), the control signal may be a feedback signal provided to selection circuit (e.g., a multiplexer) and the second sensor data may be provided to an application processor (e.g., the application processor 518) via the selection circuit.

The method 3500 may reduce power consumption by bypassing computer vision application-specific processing on a particular frame that is similar to a previous frame. For example, the change detection circuit 414 may indicate (via the control signal 416) whether to activate (e.g., wake up) the application processor 418 based on a comparison between a current frame and a previous frame. If the change detection circuit 414 determines that differences between the current frame and the previous frame do not satisfy a threshold (e.g., a change threshold), the change detection circuit 414 may determine to deactivate the application processor 418 (e.g., keep the application processor 418 in the sleep state) to conserve power Referring to FIG. 36, a diagram of an illustrative embodiment of a mobile device is depicted and generally designated 3600. The mobile device 3600 may include and/or be communicatively coupled with an always-on camera. In a particular embodiment, the mobile device 3600 may correspond to one or more of the mobile devices 1200 of FIG. 12. In an illustrative embodiment, the mobile device 3600 may operate according to the methods 3000-3500 of FIGS. 30-35, or any combination thereof.

It should be noted that FIG. 16 is to provide a generalized illustration of various components, any or all of which may be utilized as appropriate. Furthermore, the hardware and/or software components of the mobile device 3600 shown in FIG. 36 may be configured to implement one or more of the components illustrated in FIG. 13, such as the contextual determination engine 1380, sensors, and other components.

Figure 36:
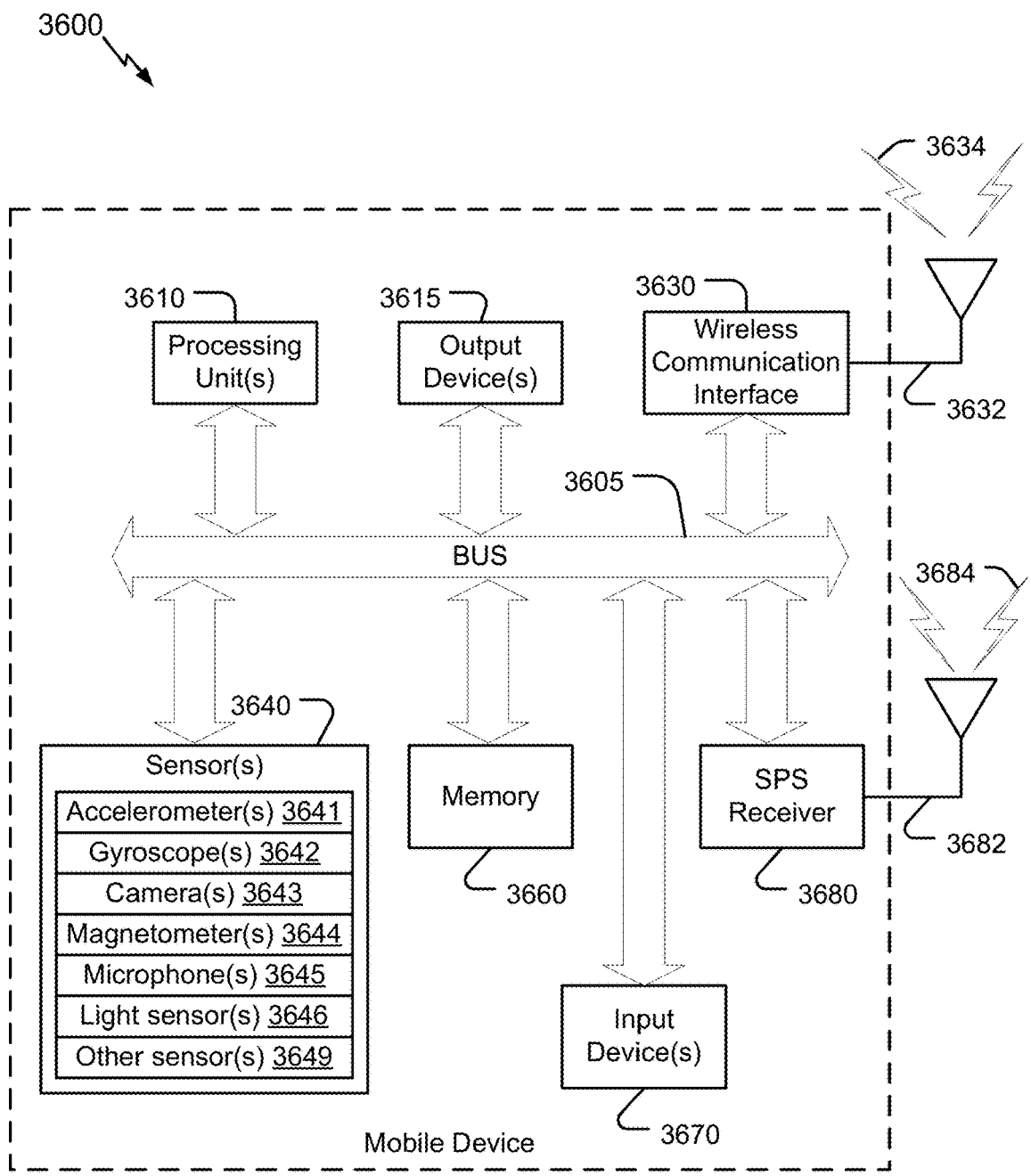
FIG. 36 is a diagram of an illustrative embodiment of a mobile device.

Components shown in FIG. 36 may be localized to a single mobile device and/or distributed among various networked devices, which may be disposed at different physical locations. For example, some embodiments may include distributed camera(s) 3643 and/or other sensors 3649 at various locations on or near a user's body. An always-on camera of an HMD (worn on a user's head), for instance, may be communicatively coupled with a mobile phone in the user's pocket, and components shown in FIG. 36 may be distributed among the HMD and the mobile phone in any of a variety of ways, depending on desired functionality.

The mobile device 3600 is shown including hardware elements that may be electrically coupled via a bus 3605 (or may otherwise be in communication, as appropriate). The hardware elements may include processing unit(s) 3610 which may include without limitation one or more general-purpose processors, one or more special-purpose processors (such as digital signal processors (DSPs), graphics acceleration processors, application specific integrated circuits (ASICs), and/or the like), and/or other processing structure or means, which may be configured to perform one or more of the methods described herein, including the methods 3000-3500 of FIGS. 30-35. The mobile device 3600 may also include one or more input devices 3670 (e.g., a touch screen, a touch pad, button(s), dial(s), switch(es), and/or the like) and one or more output devices 3615, which may include without limitation a display, light emitting diode (LED), speakers, and/or the like.

The mobile device 3600 may also include a wireless communication interface 3630, which may include without limitation a modem, a network card, an infrared communication device, a wireless communication device, and/or a chipset (such as a Bluetooth® (a registered trademark of Bluetooth SIG, Inc.) device, an IEEE 802.11 device, an IEEE 802.15.4 device, a WiFi device, a WiMax device, cellular communication facilities, etc.), and/or the like. Communication to and from the mobile device 3600 may also be implemented, in some embodiments, using various wireless communication networks. These networks may include, for example, a wide area wireless network (WWAN), a wireless local area network (WLAN), a wireless personal area network (WPAN), and the like. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may implement Long Term Evolution (LTE), LTE Advanced, and so on. LTE, LTE Advanced, GSM, and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth® (a registered trademark of Bluetooth SIG, Inc.) network, an IEEE 802.15x, or some other type of network. The techniques described herein may also be used for any combination of WWAN, WLAN and/or WPAN. The wireless communication interface 3630 may permit data to be exchanged directly with other sensors, systems, and/or any other electronic devices described herein. The communication may be carried out via one or more wireless communication antenna(s) 3632 that send and/or receive wireless signals 3634.

The wireless communication interface 3630 may also be utilized to determine a location of the mobile device 3600. For example, access points (including base stations and/or other systems used for wireless voice and/or data communication) may serve as independent sources of position data, e.g., through implementation of trilateration-based procedures based, for example, on round trip time (RTT) and/or received signal strength indication (RSSI) measurements. The access points may be part of a WLAN that operates in a building to perform communications over smaller geographic regions than a WWAN. Moreover, the access points may be part of a WiFi network (802.11x), cellular piconets and/or femtocells, a Bluetooth® (a registered trademark of Bluetooth SIG, Inc.) network, and the like. The access points may also form part of a Qualcomm indoor positioning system (QUIPS™).

The mobile device 3600 may further include sensor(s) 3640. As indicated herein, sensor(s) 3640, which may correspond to the sensors described in FIG. 2, may include sensors from which an orientation and/or motion of the mobile device 3600 may be determined, such as one or more accelerometer(s) 3641, gyroscope(s) 3642, magnetometer(s) 3644, and the like. The mobile device 3600 may further include other sensor(s) 1640, such as microphone(s) 1665, light sensor(s) 1646, proximity sensors, and other sensors, as described with reference to FIG. 13. Camera(s) 3643 may include any number of different cameras with different features (RGB, infrared, wide-angle, fisheye, high-resolution, etc.), any or all of which may be utilized as an always-on camera as described herein.

Embodiments of the mobile device 3600 may also include a satellite positioning system (SPS) receiver 3680 capable of receiving signals 3684 from one or more SPS using an SPS antenna 3682. The SPS receiver 3680 may correspond to the satellite positioning receiver(s) 1350 of FIG. 13, which may provide location information (e.g., coordinates) regarding the mobile device 3600, as well as information derived therefrom (speed, acceleration, etc.). Transmitted satellite signals 3684 may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

The mobile device 3600 may further include (and/or be in communication with) a memory 3660. The memory 3660 may include, without limitation, local and/or network accessible storage, a disk drive, a drive array, an optical storage device, a solid-state storage device, such as a random access memory ("RAM"), and/or a read-only memory ("ROM"), which may be programmable, flash-updateable, and/or the like. Such storage devices may be configured to implement any appropriate data stores, including, without limitation, various file systems, database structures, and/or the like.

The memory 3660 of the mobile device 3600 may also include software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the methods of FIGS. 30-35 may be implemented as code and/or instructions executable by the mobile device 3600 (and/or a processing unit within a mobile device 3600) (and/or another device of a positioning system). In an aspect, such code and/or instructions may be used to configure and/or adapt a general purpose computer (or other device) to perform one or more operations in accordance with the described methods.

Figure 37:
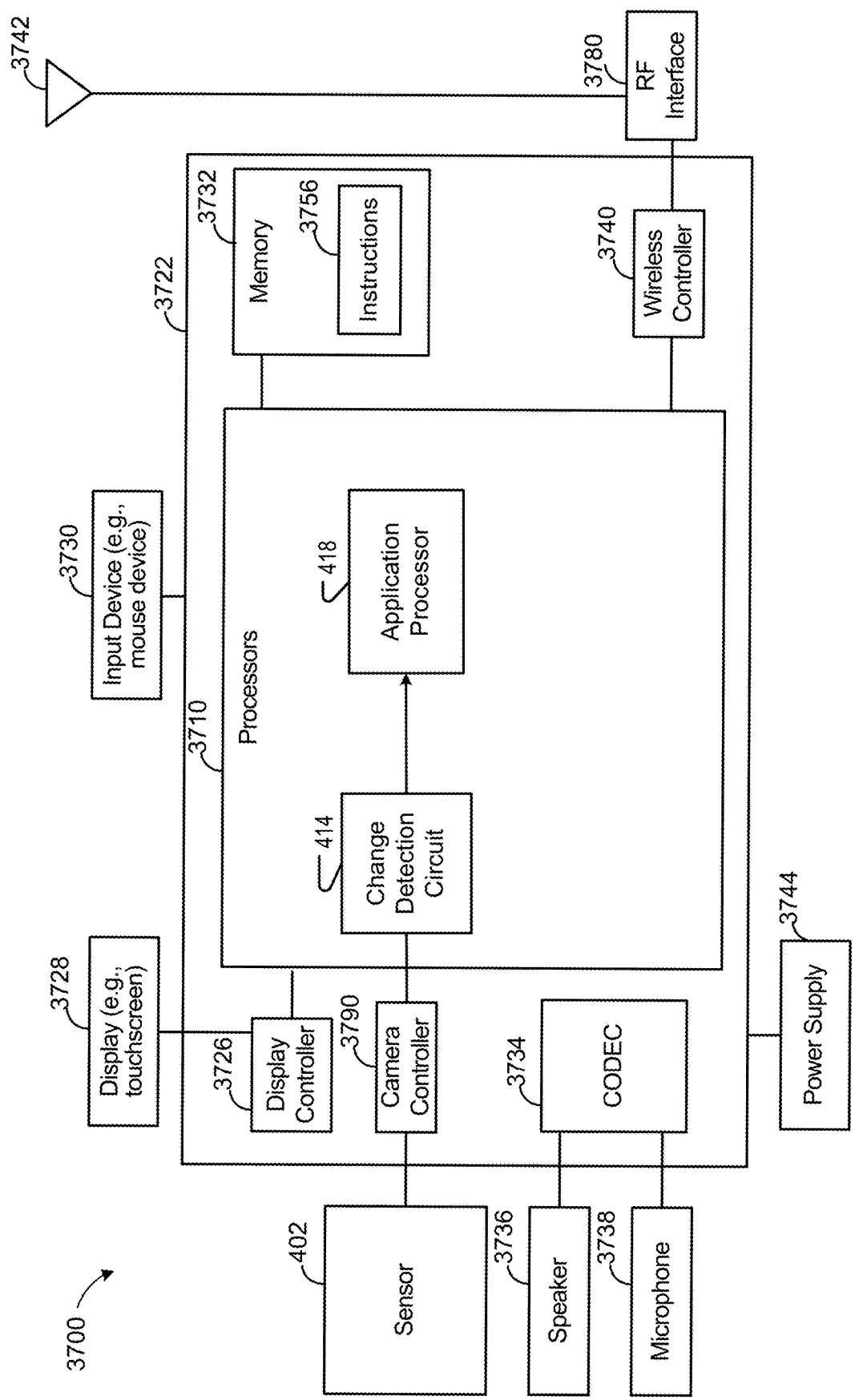
FIG. 37 is a block diagram of a wireless device including components operable to reduce power usage associated with computer vision applications.

Referring to FIG. 37, a block diagram of wireless device 3700 including components operable to reduce power usage associated with computer vision applications is shown. The device 3700 includes processors 3710 (e.g., the change detection circuit 414 and the application processor 418) operable reduce power usage associated with computer vision applications. The processors 3710 are coupled to a memory 3732. In a particular embodiment, the processors 3710 may include the processing system 300 of FIG. 3, the processing system 400 of FIG. 4, the processing system 500 of FIG. 5, the processing system 600 of FIG. 6, the processing system 800 of FIG. 8, or any combination thereof.

FIG. 37 also shows a display controller 3726 that is coupled to the processors 3710 and to a display 3728. A camera controller 3790 may be coupled to the processors 3710 and to the sensor 402. The sensor 402 may be configured to capture a video stream that includes image frames (e.g., images 102-106 of FIG. 1). A coder/decoder (CODEC) 3734 can also be coupled to the processors 3710. A speaker 3736 and a microphone 3738 can be coupled to the CODEC 3734. FIG. 37 also indicates that a wireless controller 3740 can be coupled to the processors 3710 and to a wireless antenna 3742 via a radio frequency (RF) interface 3780.

The memory 3732 may be a tangible non-transitory processor-readable storage medium that includes executable instructions 3756. The instructions 3756 may be executed by a processor, such as the processors 3710 or a device within the processors 3710 (e.g., the first processing device 304, the statistics generator 304, and/or the second processing device 310) to perform any of the methods 3000-3500 of FIGS. 30-35.

In a particular embodiment, the processors 3710, the display controller 3726, the memory 3732, the CODEC 3734, and the wireless controller 3740 are included in a system-in-package or system-on-chip device 3722. In a particular embodiment, an input device 3730 and a power supply 3744 are coupled to the system-on-chip device 3722. Moreover, in a particular embodiment, as illustrated in FIG. 37, the display 3728, the input device 3730, the camera 302, the speaker 3736, the microphone 3738, the wireless antenna 3742, and the power supply 3744 are external to the system-on-chip device 3722. However, each of the display 3728, the input device 3730, the camera 302, the speaker 3736, the microphone 3738, the wireless antenna 3742, and the power supply 3744 can be coupled to a component of the system-on-chip device 3722, such as an interface or a controller.

In conjunction with the described embodiments, an apparatus is disclosed that includes means for generating first image statistics for a first frame of image data and second image statistics for a second frame of image data. For example, the means for generating the images statistics may include the first processing device 304 of FIG. 3, the processors 3710 programmed to execute the instructions 3756 of FIG. 37, one or more other devices, circuits, modules, or instructions to generate image statistics, or any combination thereof.

The apparatus may also include means for determining whether a change amount between the second image statistics and the first image statistics satisfies a threshold. For example, the means for determining may include the statistics processing device 108 of FIG. 3, the processors 3710 programmed to execute the instructions 3756 of FIG. 37, one or more other devices, circuits, modules, or instructions to determine whether the first change amount between the second image statistics and the first image statistics satisfies the threshold, or any combination thereof.

The apparatus may also include means for performing application-specific processing on the second frame in response to a determination that the change amount satisfies the threshold. For example, the means for performing application-specific processing may include the second processing device 310 of FIG. 3, the processors 3710 programmed to execute the instructions 3756 of FIG. 37, one or more other devices, circuits, modules, or instructions to perform the application-specific processing, or any combination thereof.

In conjunction with the described embodiments, an apparatus is disclosed that includes means for generating a control signal based on a change amount between first sensor data captured by a sensor and second sensor data captured by the sensor. The means for generating the control signal may include the statistics processing device 108 of FIGS. 1-3, the change detection circuit 414 of FIG. 4, the change detection circuit 514 of FIGS. 5-6, the activation analyzer 814 of FIG. 8, the activation analyzer 816 of FIG. 8, one or more other devices, circuits, modules, or instructions to generate the control signal, or any combination thereof.

The apparatus may also include means for performing computer vision application-specific processing on the second sensor data based on the control signal. The means for performing the computer vision application-specific processing may include the second processing device 310 of FIG. 3, components in the second processing path 410 of FIG. 4, components in the second processing path 510 of FIG. 5, components in the second processing path 610 of FIG. 6, components in the second processing path 810 of FIG. 8, one or more other devices, circuits, modules, or instructions to perform the computer vision application-specific processing on the second sensor data, or any combination thereof.

Figure 38:
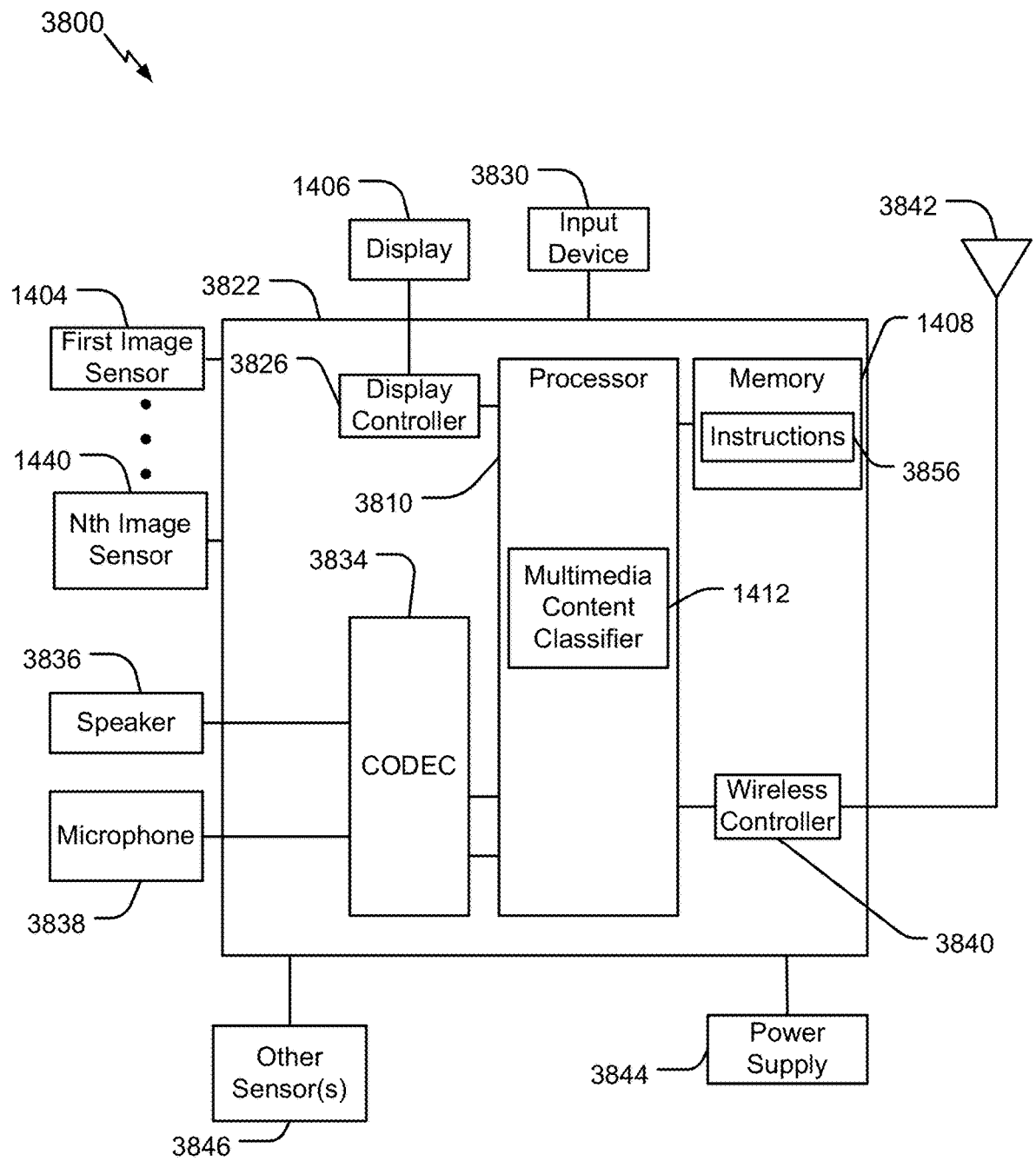
FIG. 38 is a block diagram of a particular illustrative embodiment of a device that is operable to identify a context of an image.

Referring to FIG. 38, a block diagram of a particular illustrative embodiment of a mobile device is depicted and generally designated 3800. In various embodiments, the device 3800 may have more or fewer components than illustrated in FIG. 38. The device 3800 may include, be included in, or correspond to the device 302 of FIG. 3. In an illustrative embodiment, the device 3800 may operate according to the methods of FIGS. 30-34, or any combination thereof.

In a particular embodiment, the device 3800 includes a processor 3810 (e.g., a central processing unit (CPU) or a digital signal processor (DSP)) coupled to the memory 1408 of FIG. 14, to a coder/decoder (CODEC) 3834, and to a wireless antenna 3842 via a wireless controller 3840. The processor 3810 may also be coupled to the display 1406 of FIG. 14 via a display controller 3826. A speaker 3836 and a microphone 3838 may be coupled to the CODEC 3834. The device 3800 may be coupled to the one or more image sensors of the device 1402 of FIG. 14. For example, the device 3800 may be coupled to the first image sensor 1404, the $N^{th}$ image sensor 1440 of FIG. 14, or both. The device 3800 may be coupled to one or more other sensors 3846. For example, the one or more other sensors 3846 may include a micro-electromechanical system (MEMS) sensor, an optical sensor, a magnetic sensor, or any combination thereof. The device 3800 may include the multimedia content classifier 1412 of FIG. 14. In a particular embodiment, the processor 3810 may correspond to the processor 1410 of FIG. 14. In a particular embodiment, The processor 3810 may include the multimedia content classifier 1412 of FIG. 14.

The multimedia content classifier 1412 may be used to implement a hardware embodiment of the image context identification techniques described herein. Alternatively, or in addition, a software embodiment (or combined software/hardware embodiment) may be implemented. For example, the memory 1408 may include instructions 3856. The instructions 3856 may correspond to the multimedia content classifier 1412. The instructions 3856 may be executable by the processor 3810 or another processing unit of the device 3800. For example, the memory 1408 may be a non-transient computer-readable medium or device storing the instructions 3856 that are executable by the processor 3810 to identify a context of an image by receiving sensory data, extract a first subset of features, determine that confidence levels associated with the first subset of features do not satisfy a threshold confidence level, extract a second subset of features in response to the determination, and generate context data indicating the context of the image based at least in part on the second subset of features.

In a particular embodiment, the processor 3810, the display controller 3826, the memory 1408, the CODEC 3834, and the wireless controller 3840 are included in a system-in-package or system-on-chip device 3822. In a particular embodiment, an input device 3830 and a power supply 3844 are coupled to the system-on-chip device 3822. Moreover, in a particular embodiment, as illustrated in FIG. 38, the display 1406, the input device 3830, the speaker 3836, the microphone 3838, the first image sensor 1404, the Nth image sensor 340, the wireless antenna 3842, and the power supply 3844 are external to the system-on-chip device 3822. However, each of the display 1406, the input device 3830, the speaker 3836, the microphone 3838, the first image sensor 1404, the Nth image sensor 1440, the wireless antenna 3842, and the power supply 3844 may be coupled to a component of the system-on-chip device 3822, such as an interface or a controller.

In conjunction with the described embodiments, a system is disclosed that may include means for receiving sensory data from an image sensor, such as the wireless antenna 3842, the multimedia content classifier 1412 of FIG. 14, the first processing device 304 of FIG. 3, one or more other devices or circuits configured to receive sensory data, or any combination thereof. The sensory data may be related to an image. The system may also include means for extracting a first subset of features from the sensory data, such as the first processing device 304, the second processing device 310 of FIG. 3, the feature set extractor 1414, the multimedia content classifier 1412, the processor 1410 of FIG. 14, the processor 3810 of FIG. 38, one or more other devices or circuits configured to extract a first subset of features, or any combination thereof. The first subset of features may be selected based on a selection criterion. The system may further include means for generating context data indicating a context of the image based at least in part on the first subset of features, such as the second processing device 310 of FIG. 3, the multimedia media content classifier 1412, the processor 1410 of FIG. 14, the processor 3810 of FIG. 38, one or more other devices or circuits configured to generate context data, or any combination thereof.

The system may also include means for determining whether an extraction criterion is satisfied based on the sensory data, such as the statistics processing device 108 of FIG. 1, the first processing device 304, the second processing device 310 of FIG. 3, the multimedia media content classifier 1412, the extractor 1414 of FIG. 14, the processor 3810 of FIG. 38, one or more other devices or circuits configured to determine whether the extraction criterion is satisfied based on the sensory data, or any combination thereof. The first subset of features may be extracted based on the extraction criterion being satisfied.

The system may also include means for activating a first power domain in response to determining that the sensory data indicates a scene change, such as the statistics processing device 108 of FIG. 1, the first processing device 304, the second processing device 310 of FIG. 3, the multimedia media content classifier 1412, the extractor 1414 of FIG. 14, the processor 3810 of FIG. 38, one or more other devices or circuits configured to activate the first power domain, or any combination thereof.

The system may further include means for activating a second power domain in response to determining that the sensory data indicates that a sharpness of the image satisfies a threshold sharpness level, such as the statistics processing device 108 of FIG. 1, the first processing device 304, the second processing device 310 of FIG. 3, the multimedia media content classifier 1412, the extractor 1414 of FIG. 14, the processor 3810 of FIG. 38, one or more other devices or circuits configured to activate the second power domain, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
generating, at second processing circuitry, an indication of a particular type of statistic that is relevant to a computer-vision application, the indication provided to first processing circuitry to detect changes in images that are associated with the particular type of statistic;
generating, at a change detection circuit included in the first processing circuitry, a control signal based on a change amount between first sensor data and second sensor data, wherein the change amount is associated with the particular type of statistic, wherein the first sensor data corresponds to a first set of pixel values associated with a first image captured by a sensor, and wherein the second sensor data corresponds to a second set of pixel values associated with a second image captured by the sensor;
providing the second sensor data to the second processing circuitry in response to the control signal indicating the change amount satisfies a threshold associated with the particular type of statistic; and
performing, at the second processing circuitry, the computer-vision application on at least one object in the second image, wherein the second processing circuitry consumes more power than the first processing circuitry, and wherein performing the computer-vision application comprises:
extracting, from a portion of the first image or the second image, a set of features associated with the at least one object, wherein the set of features is extracted from a particular portion of the second image;
generating a clustered set of features by clustering the set of features with features in the first image; and
generating context data indicating a context of the first image, the context data generated by classifying the clustered set of features based on a classification model.

2. The method of claim 1, further comprising providing, by an ambient light sensor prior to generation of the control signal, an indication of detected light, detected motion, or both, wherein the first sensor data and the second sensor data are captured by the sensor based on the indication from the ambient light sensor.

3. The method of claim 1, further comprising:
providing, at an ambient light sensor, an indication of detected light, detected motion, or both; and
capturing, at a camera of the sensor, the first sensor data and the second sensor data based on the indication from the ambient light sensor.

4. The method of claim 1, further comprising:
extracting first features from the first sensor data at the change detection circuit; and
extracting second features from the second sensor data at the change detection circuit, wherein the change amount is based on the first features and based on the second features.

5. The method of claim 1, further comprising determining a difference between first image statistics of the first sensor data and second image statistics of the second sensor data, wherein the change amount is based on the difference.

6. The method of claim 1, the second processing circuitry is deactivated in response to the control signal indicating the change amount fails to satisfy the threshold associated with the particular type of statistic and in response to a determination that a second change amount between the first sensor data and the second sensor data satisfies a second threshold associated with a second particular type of statistic.

7. The method of claim 1, further comprising providing the second sensor data to the second processing circuitry via a selection circuit responsive to the control signal.

8. The method of claim 1, wherein each feature of the set of features is associated with a confidence level; and further comprising:
in response to failure to satisfy a threshold confidence level based on the confidence levels of the features of the set of features, extracting from the first image, the second image, or both, a second set of features associated with the at least one object, each feature of the second set of features associated with a confidence level; and
in response to satisfaction of the threshold confidence level based on the confidence levels of the second set of features, generating the context data indicating the context.

9. The method of claim 1, wherein the computer-vision application comprises a security application, an environmental-use application, or an object detection and tracking application.

10. The method of claim 1, further comprising performing, at a second application processor included in the second processing circuitry, a second computer-vision application on the second image.

11. The method of claim 10, further comprising:
determining, at the second application processor, whether to discontinue performance of the computer-vision application on the second image at a first application processor included in the second processing circuitry; and
discontinuing performance of the computer-vision application on the second image at the first application processor based on the determination at the second application processor.

12. The method of claim 11, further comprising powering down the first application processor after discontinuing performance of the computer-vision application on the second image.

13. The method of claim 11, further comprising performing, at the second application processor, the computer-vision application on the second image.

14. The method of claim 1, further comprising sending, from a second application processor included in the second processing circuitry to a first application processor included in the second processing circuitry, an indication of a refusal to perform the computer-vision application on the second image.

15. The method of claim 14, further comprising sending, from the second application processor to the first application processor, an instruction to cause the first application processor to refrain from requesting the second application processor to perform the computer-vision application.

16. An apparatus comprising:
second processing circuitry configured to generate an indication of a particular type of statistic that is relevant to a computer-vision application, the indication provided to first processing circuitry to detect changes in images that are associated with the particular type of statistic;

a change detection circuit configured to generate a control signal based on a change amount between first sensor data and second sensor data, wherein the change amount is associated with the particular type of statistic, wherein the first sensor data corresponds to a first set of pixel values associated with a first image captured by a sensor, wherein the second sensor data corresponds to a second set of pixel values associated with a second image captured by the sensor, and wherein the change detection circuit is included in first processing circuitry; and a selection circuit configured to provide the second sensor data to the second processing circuitry in response to the control signal indicating the change amount satisfies a threshold associated with the particular type of statistic, wherein the second processing circuitry is configured to perform the computer-vision application on at least one object in the second image, and wherein the second processing circuitry consumes more power than the first processing circuitry, and wherein, to perform the computer-vision application, the second processing circuitry is configured to:

extract, from a portion of the first image or the second image, a set of features associated with the at least one object, wherein the set of features is extracted from a particular portion of the second image;

generating a clustered set of features by clustering the set of features with features in the first image; and generate context data indicating a context of the first image, the context data generated by classifying the clustered set of features based on a classification model.

17. The apparatus of claim 16, wherein the sensor comprises:

an ambient light sensor configured to provide an indication of detected light, detected motion, or both; and a camera configured to capture the first sensor data and the second sensor data based on the indication from the ambient light sensor.

18. The apparatus of claim 16, wherein the sensor comprises a camera configured to operate in a first mode and a second mode, wherein the camera is configured to detect light, motion, or both in the first mode, and wherein the camera is configured to capture the first sensor data and the second sensor data in the second mode.

19. The apparatus of claim 16, further comprising a system controller configured to activate the second processing circuitry based on the control signal, wherein the change detection circuit and the system controller are integrated in a mobile communication device.

20. The apparatus of claim 16, further comprising a memory included in the second processing circuitry, the memory configured to store the second sensor data.

21. An apparatus comprising:

means for generating an indication of a particular type of statistic that is relevant to a computer-vision application, the indication provided to first processing circuitry to detect changes in images that are associated with the particular type of statistic, the means for generating included in second processing circuitry;

means for generating a control signal based on a change amount between first sensor data and second sensor data, wherein the change amount is associated with the particular type of statistic, wherein the first sensor data corresponds to a first set of pixel values associated with a first image captured by a sensor, wherein the second sensor data corresponds to a second set of pixel values associated with a second image captured by the sensor, and wherein the means for generating the control signal is included in first processing circuitry;

means for providing the second sensor data to the second processing circuitry in response to the control signal indicating the change amount satisfies a threshold associated with the particular type of statistic; and means for performing the computer-vision application on at least one object in the second image, the means for performing included in the second processing circuitry, wherein the second processing circuitry consumes more power than the first processing circuitry, and wherein performing the computer-vision application comprises:

extracting, from a portion of the first image or the second image, a set of features associated with the at least one object, wherein the set of features is extracted from a particular portion of the second image;

generating a clustered set of features by clustering the set of features with features in the first image; and generating context data indicating a context of the first image, the context data generated by classifying the clustered set of features based on a classification model.

22. The apparatus of claim 21, wherein the means for generating the control signal includes a change detection circuit and a signal analyzer.

23. The apparatus of claim 21, wherein the means for performing the computer-vision application is integrated into a mobile communication device.

24. A non-transitory computer-readable medium comprising instructions that, when executed by a computer, cause the computer to:

generate, at second processing circuitry, an indication of a particular type of statistic that is relevant to a computer-vision application, the indication provided to first processing circuitry to detect changes in images that are associated with the particular type of statistic;

generate, at a change detection circuit included in the first processing circuitry, a control signal based on a change amount between first sensor data and second sensor data, wherein the change amount is associated with the particular type of statistic, wherein the first sensor data corresponds to a first set of pixel values associated with a first image captured by a sensor, and wherein the second sensor data corresponds to a second set of pixel values associated with a second image captured by the sensor;

provide the second sensor data to the second processing circuitry in response to the control signal indicating the change amount satisfies a threshold associated with the particular type of statistic, wherein the computer-vision application comprises object detection, object recognition, and object classification; and perform, at the second processing circuitry, the computer-vision application on at least one object in the second image, wherein the second processing circuitry consumes more power than the first processing circuitry, and wherein performing the computer-vision application comprises:

extracting, from a portion of the first image or the second image, a set of features associated with the at least one object, wherein the set of features is extracted from a particular portion of the second image;

generating a clustered set of features by clustering the set of features with features in the first image; and generating context data indicating a context of the first image, the context data generated by classifying the clustered set of features based on a classification model.

25. The apparatus of claim 16, wherein the second processing circuitry is deactivated in response to the control signal indicating the change amount fails to satisfy the threshold associated with the particular type of statistic and in response to a determination that a second change amount between the first sensor data and the second sensor data satisfies a second threshold associated with a second particular type of statistic.

26. The method of claim 1, wherein the set of features are extracted from a particular portion of the first image.

27. The method of claim 1, wherein the set of features are extracted from a particular portion of the second image.

* * * * *